US008936773B2

(12) United States Patent
Fernandez et al.

(10) Patent No.: US 8,936,773 B2
(45) Date of Patent: Jan. 20, 2015

(54) METHODS AND COMPOSITIONS USING CALCIUM CARBONATE AND STABILIZER

(75) Inventors: Miguel Fernandez, San Jose, CA (US); Irvin Chen, Santa Clara, CA (US); Patricia Tung Lee, Fremont, CA (US); Matthew Ginder-Vogel, Madison, WI (US)

(73) Assignee: Calera Corporation, Los Gatos, CA (US)

( * ) Notice: Subject to any disclaimer, the term of this patent is extended or adjusted under 35 U.S.C. 154(b) by 173 days.

(21) Appl. No.: 13/457,156

(22) Filed: Apr. 26, 2012

(65) Prior Publication Data
US 2013/0036948 A1   Feb. 14, 2013

Related U.S. Application Data

(60) Provisional application No. 61/480,018, filed on Apr. 28, 2011, provisional application No. 61/526,751, filed on Aug. 24, 2011, provisional application No. 61/534,972, filed on Sep. 15, 2011.

(51) Int. Cl.
| | | |
|---|---|---|
| C04B 14/00 | (2006.01) | |
| C04B 7/00 | (2006.01) | |
| C01F 5/24 | (2006.01) | |
| C01F 11/18 | (2006.01) | |
| B01D 53/48 | (2006.01) | |
| B01D 53/56 | (2006.01) | |

(Continued)

(52) U.S. Cl.
CPC .............. *C04B 14/28* (2013.01); *C01F 11/182* (2013.01); *C01F 11/183* (2013.01); *C04B 28/02* (2013.01); *C04B 28/28* (2013.01); *C01P 2006/37* (2013.01)

USPC ........... 423/430; 423/232; 423/637; 423/186; 106/738; 106/817

(58) Field of Classification Search
CPC ........ C04B 14/28; C04B 28/02; C04B 14/26; Y02C 10/14; C09C 1/021
USPC ......... 106/706, 738, 709, 714, 718, 817, 656, 106/815, 801, 717, 640, 705, 638; 423/430, 423/224, 232, 637, 186
See application file for complete search history.

(56) References Cited

U.S. PATENT DOCUMENTS

| 5,049,198 A | 9/1991 | Ribas |
| 6,264,740 B1 | 7/2001 | McNulty, Jr. |

(Continued)

FOREIGN PATENT DOCUMENTS

| EP | 2253600 A1 | 11/2010 |
| WO | WO 2008/018928 A2 | 2/2008 |

(Continued)

OTHER PUBLICATIONS

Fernandez-Diaz et al. (2009) The Carbonatation of Gypsum: Pathways and Pseudomorph Formation. American Mineralogist. 94: 1223-1234.

(Continued)

*Primary Examiner* — Kaj K Olsen
*Assistant Examiner* — Karam Hijji
(74) *Attorney, Agent, or Firm* — Vandana Bansal; Calera Corporation

(57) ABSTRACT

Provided herein are compositions, methods, and systems for a material containing metastable carbonate and stabilizer. Methods for making the compositions and using the compositions are also provided.

24 Claims, 17 Drawing Sheets

(51) Int. Cl.

| | | |
|---|---|---|
| C01B 17/16 | (2006.01) | |
| C01B 13/14 | (2006.01) | |
| C01F 5/02 | (2006.01) | |
| C01F 5/14 | (2006.01) | |
| C01F 11/02 | (2006.01) | |
| C01D 1/32 | (2006.01) | |
| C01D 3/16 | (2006.01) | |
| C01D 7/26 | (2006.01) | |
| C22B 26/10 | (2006.01) | |
| C04B 14/28 | (2006.01) | |
| C04B 28/02 | (2006.01) | |
| C04B 28/28 | (2006.01) | |

(56) References Cited

U.S. PATENT DOCUMENTS

| | | |
|---|---|---|
| 7,735,274 B2 | 6/2010 | Constantz et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,137,444 B2 | 3/2012 | Farsad et al. |
| 2005/0106110 A1* | 5/2005 | Liu .................................. 424/49 |
| 2009/0146436 A1* | 6/2009 | Lindgren et al. .............. 292/198 |
| 2009/0202410 A1 | 8/2009 | Kawatra et al. |
| 2010/0024686 A1* | 2/2010 | Constantz et al. ............ 106/817 |
| 2010/0051859 A1 | 3/2010 | House et al. |
| 2010/0084280 A1 | 4/2010 | Gilliam et al. |
| 2010/0135865 A1 | 6/2010 | Constantz et al. |
| 2010/0135882 A1 | 6/2010 | Constantz et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0258035 A1 | 10/2010 | Constantz et al. |
| 2010/0258506 A1 | 10/2010 | Berkowitz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad et al. |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0071309 A1 | 3/2011 | Constantz et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0132234 A1 | 6/2011 | Constantz et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2013/0195747 A1 | 8/2013 | Kendall et al. |

FOREIGN PATENT DOCUMENTS

| | | |
|---|---|---|
| WO | WO 2008/148055 A1 | 12/2008 |
| WO | WO 2009/006295 A2 | 1/2009 |
| WO | WO 2009/086460 A1 | 7/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

International search report and written opinion dated Dec. 14, 2012 for PCT/US2012/035232.

Romero et al. (2011) Hydrogen isotopic signatures of algal biomarkers as a proxy of hydroclimatic variability in Lake Isabel, Mexico. Goldschmidt Conference Abstract. Mineralogical Magazine. <www.minersoc.org>.

Roncal-Herrero et al. 2011. The role of inorganic additives in evaporitic carbonate precipitation. Goldschmidt Conference Abstract. Mineralogical Magazine. <www.minersoc.org>.

Zarga, et al. Study of calcium carbonate and sulfate coprecipitation. Chemical Engineering Science. Jun. 2013; 96(7):33-41.

Berner, R. A. "The role of magnesium in the crystal growth of calcite and aragonite from sea water" Geochimica et Cosmochimica Acta (1975) vol. 39, pp. 489-504.

Busenberg et al., "Kinetic and thermodynamic factors controlling the distribution of SO2/4 and Na+ in calcites and selected arogonites" Geochimica et Cosmochimica Acta (1985) vol. 49; pp. 713-725.

Constantz, B. (2009) "The Risk of Implementing New Regulations on Game-Changing Technology: Sequestering CO2 in the Built Environment" AGU, 90(22), Jt. Assem, Suppl., Abstract.

De Leeuw et al., "Surface Structure and Morphology of Calcium Carbonate Polymorphs Calcite, Aragonite, and Avaterite: An Atomistic Approach" J. Phys. Chem B (1998) 102, 2914-2922.

(56) References Cited

OTHER PUBLICATIONS

Fernandez-Diaz et al. "The role of sulfate groups in controlling CaCO3 polymorphism" Geochimica et Cosmochimica Acta (2010) 74: 6064-6076.

Gutjahr et al., "Studies of the growth and dissolution kinetics of the CaCO3 polymorphs calcite and aragonite II. The influence of divalent cation additives on the growth and dissolution rates" Journal of Crystal Growth (1996) 158: 310-315.

Kitamura, M., "Crystallization and Transformation Mechanism of Calcium Carbonate Polymorphs and the Effect of Magnesium Ion" Journal of Colloid and Interface Science (2001) 236, 318-327.

Kitano, Y. "The influence of organic material on the polymorphoc crystallization of calcium carbonate" Geochimica et Cosmochimica Acta (1965) vol. 29 pp. 29-41.

Kralj et al., "Vaterite growth and dissolution in aqueous solution III. Kinetics of transportation" Journal of Crystal Growth (1997) 177: 248-257.

Morse, J.W. "The surface chemistry of calcium carbonate minerals in natural waters: an overview" Marine Chemistry (1986) vol. 20: 91-112.

Park et al., "Effects of magnesium chloride and organic additives on the synthesis of aragonite precipitated calcium carbonate" Journal of Crystal Growth (2008) 310: 2593-2601.

Sawada, K. "The mechanisms of crystallization and transformation of calcium carbonates" Pure & Appl. Chem. (1997) vol. 69, No. 5; pp. 921-928.

Tang et al., "Crystallization of CaCO3, in the presence of sulfate and additives: experimental and molecular dynamics simulations studies" Manuscript; Journal of Colloid and Interface Science (2012);doi 10.1016/j.jcis.2012.02.069.

Xie et al., "The role of Mg2+ and Mg2+/amino acid in controlling polymorph and morphology of calcium carbonate crystal" Materials Chemistry and Physics 101 (2007) 82-92.

Yang et al., "A Computational Study of Mg2+ Dehydration in Aqueous Solution in the Presence of HS' and Other Monovalent Anions—Insights to Dolomite Formation" Manuscript; Geochimica et Cosmochimica Acta (2012) doi: 10.1016/j.gca.2012.03.018; 38 pp.

Combes, et al. Calcium carbonate-calcium phosphate mixed cement compositions for bone reconstruction. J Biomed Mater Res A. Nov. 2006;79(2):318-28.

Combes, et al. Preparation, physical-chemical characterisation and cytocompatibility of calcium carbonate cements. Biomaterials. Mar. 2006;27(9):1945-54. Epub Oct. 10, 2005.

International search report and written opinion dated Feb. 26, 2013 for PCT/US2012/049557.

* cited by examiner

METHODS AND COMPOSITIONS USING CALCIUM CARBONATE AND STABILIZER

CROSS-REFERENCE TO RELATED APPLICATIONS

This application claims priority to U.S. Provisional Application No. 61/480,018, filed Apr. 28, 2011; U.S. Provisional Application No. 61/526,751, filed Aug. 24, 2011; and U.S. Provisional Application No. 61/534,972, filed Sep. 15, 2011, all of which are incorporated herein by reference in their entireties.

GOVERNMENT SUPPORT

Work described herein was made in whole or in part with Government support under Award Number: DE-FE0002472 awarded by the Department of Energy. The Government has certain rights in this invention.

BACKGROUND

Calcium carbonates are used in numerous industries from papermaking, to adhesives production, to construction. Calcium carbonates that are formed as a result of a carbon dioxide sequestering process can be used in many of the aforementioned applications and in effect can serve two purposes: to sequester carbon dioxide and to function as a calcium carbonate material. One area where this dual purpose may be doubly beneficial to the environment is in construction materials, specifically cements and concretes. As the production of conventional cements may be one of the contributors to the emission of carbon dioxide into the atmosphere through the calcination of conventional cements as well as the energy needed to heat the kilns, reductions in the amount of conventional cements used can help to reduce the amount of carbon dioxide in the earth's atmosphere.

SUMMARY

In one aspect, there is provided a composition, comprising a metastable carbonate and a stabilizer. In some embodiments, the composition is a cementitious composition. In some embodiments, the cementitious composition is a hydraulic cement composition, supplementary cementitious material, self-cementing composition, or combination thereof. In some embodiments, the metastable carbonate is a calcium carbonate. In some embodiments, the metastable carbonate is selected from the group consisting of vaterite, amorphous calcium carbonate, aragonite, a precursor phase of vaterite, a precursor phase of aragonite, an intermediary phase that is less stable than calcite, polymorphic forms in between these polymorphs, and combination thereof. In some embodiments, the metastable carbonate comprises vaterite. In some embodiments, the metastable carbonate comprises at least 10% w/w vaterite. In some embodiments, the metastable carbonate comprises at least 10% w/w vaterite and at least 1% w/w amorphous calcium carbonate (ACC). In some embodiments, the metastable carbonate comprises between 10-99% w/w or between 10-100% w/w vaterite. In some embodiments, the metastable carbonate comprises at least 50% w/w vaterite. In some embodiments, the metastable carbonate comprises between 50-100% w/w vaterite. In some embodiments, the metastable carbonate comprises activated vaterite.

In some embodiments of the foregoing aspects and embodiments, the stabilizer includes, but not limited to, acid, ester, phosphate, sulfate, polyethylene oxide, polyalcohol, and combination thereof. In some embodiments, the acid is $C_1$-$C_{20}$ acid, sulfonic acid, or a phosphonic acid. In some embodiments, the $C_1$-$C_{20}$ acid includes, but not limited to, citric acid, malic acid, adipic acid, tannic acid, lactic acid, ascorbic acid, acetic acid, fumaric acid, and mixtures thereof. In some embodiments, the sulfonic acid is copolymer of 2-acrylamido-2-methyl propanesulfonic acid with acrylic acid. In some embodiments, the phosphonic includes, but not limited to, N-nitrilo tris(methylene phosphonic acid), 1,2-ethanediylbis(nitrilo di(methylene phosphonic acid)); 1,6-hexanediylbis(nitrilodi(methylene phosphonic acid)), amino tris(methylene phosphonic acid), polymethoxy polyphosphonic acid, ethylenediamine tetra(methylene phosphonic acid) (EDTMP), and combination thereof. In some embodiments, the acid further comprises hydroxyl and/or amino group. In some embodiments, the ester is an ester of a $C_1$-$C_{20}$ acid, a phosphonic acid, or a sulfonic acid. In some embodiments, the ester is an ester of a $C_1$-$C_{20}$ acid including, but not limited to, citric acid, malic acid, adipic acid, tannic acid, lactic acid, ascorbic acid, acetic acid, fumaric acid and mixtures thereof. In some embodiments, the sulfate is in sea water, an alkali metal sulfate, alkaline earth metal sulfate, lignosulfate, or combination thereof. In some embodiments, the sulfate is an alkali metal sulfate and/or alkaline earth metal sulfate. In some embodiments, the polyethylene oxide has a molecular weight of between 1,000 and 100,000. In some embodiments, the polyethylene oxide is of formula R-Ph-O($OCH_2CH_2$)$_m$OH where R is an alkyl group of from 5 to 30 carbon atoms, Ph is a phenyl group, and m is an integer having value between 5 to 50. In some embodiments, the polyethylene oxide is ethoxylated nonylphenyl comprising in a range of 20 to 30 moles of ethylene oxide. In some embodiments, the polyalcohol is a C10-C18 polyalcohol.

In some embodiments of the foregoing aspects and embodiments, the stabilizer is a calcium binding agent or a carbonate binding agent. In some embodiments, the stabilizer is incorporated in crystal lattice of the carbonate. In some embodiments, the stabilizer is present on the surface of the carbonate. In some embodiments, the stabilizer stabilizes the composition for up to 5 years. In some embodiments, the ratio of calcium to carbonate in the metastable carbonate is between 1:1 to 1.5:1. In some embodiments, the stabilizer is an alkali metal sulfate and the sulfate in the composition is at least 0.1 wt % or between 0.1-5 wt %. In some embodiments, more than 90% or between 90-99% of the sulfate in the composition is from the stabilizer. In some embodiments, the composition has a compressive strength in a range of 14-40 MPa or 20-40 MPa. In some embodiments, the composition has a carbon isotopic fractionation value ($\delta^{13}C$) of less than −12‰ or between −12‰ to −25‰. In some embodiments, the composition comprises vaterite in a range of 1% w/w to 99% w/w. In some embodiments, the composition comprises ACC in a range of 1% w/w to 99% w/w. In some embodiments, the composition is a particulate composition with an average particle size of 0.1-100 microns.

In some embodiments of the foregoing aspects and embodiments, the composition includes nitrogen oxide, sulfur oxide, mercury, metal, derivative of any of nitrogen oxide, sulfur oxide, mercury, and/or metal, or combination thereof. In some embodiments, the composition includes Portland cement clinker, aggregate, other supplementary cementitious material (SCM), or combination thereof. In some embodiments, the other supplementary cementitious material includes slag, fly ash, etc.

In one aspect, there is provided a formed building material, comprising: the composition provided herein or the set and hardened form thereof.

In one aspect, there is provided an aggregate, comprising: the composition provided herein or the set and hardened form thereof.

In one aspect, there is provided a package, comprising: the composition provided herein and a packaging material adapted to contain the composition.

In one aspect, there is provided a method for making a composition provided herein, comprising (a) contacting $CO_2$ from a $CO_2$ source with a proton removing agent to form a solution; and (b) contacting the solution with an alkaline earth-metal containing water under one or more conditions to make the composition. In some embodiments, the method further includes contacting the stabilizer with the solution before step (b). In some embodiments, the method further includes contacting the stabilizer with the alkaline earth-metal containing water before step (b). In some embodiments, the method further includes contacting the stabilizer with the solution simultaneously at step (b). In some embodiments, the method further includes contacting the stabilizer with the solution after step (b). In one aspect, there is provided a method for making a composition provided herein, comprising (a) contacting $CO_2$ from a $CO_2$ source with a proton removing agent to form a solution; and (b) contacting the solution with water comprising alkaline earth-metal and stabilizer under one or more conditions to make a composition comprising vaterite and stabilizer. In some embodiments, the stabilizer is added to the water comprising alkaline earth-metal before step (b). In some embodiments, the one or more conditions are selected from the group consisting of mixing, stirring, temperature, pH, precipitation, residence time of the precipitate, dewatering of precipitate, washing precipitate with water, ion ratio, concentration of additives, drying, milling, grinding, storing, aging, and curing. In some embodiments, the method further comprises activating the composition by nuclei activation, thermal activation, mechanical activation, chemical activation, or combination thereof. In some embodiments, the activation comprises adding one or more of aragonite seed, inorganic additive or organic additive. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly (n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, the method further comprises combining the composition with water and facilitating vaterite transformation to aragonite when the composition sets and hardens to form cement. In some embodiments, the facilitating the aragonite formation results in one or more of better linkage or bonding, higher tensile strength, or higher impact fracture toughness, after cementation of the composition. In some embodiments, the method further comprises pouring the composition in a mold after combining with water to form a formed building material. In some embodiments of the methods described herein, the activation of vaterite comprises ball milling of the composition. In another aspect, there is provided product formed by the methods of the invention.

In one aspect, there is provided a system for making a composition provided herein, comprising (a) an input for an alkaline earth-metal containing water; (b) an input for a $CO_2$ source; and (c) a reactor connected to the inputs of step (a) and step (b) that is configured to make the composition provided herein. In one aspect, there is provided system for making a composition, comprising (a) an input for an alkaline earth-metal containing water; (b) an input for a $CO_2$ source; (c) an input for a stabilizer source; and (d) a reactor connected to the inputs of (a), (b), and (c) that is configured to make the composition comprising vaterite and the stabilizer.

In one aspect, there is provided a method for making a cement product from the composition provided herein, comprising (a) combining the composition provided herein with an aqueous medium under one or more suitable conditions; and (b) allowing the composition to set and harden into a cement product. In some embodiments, the one or more suitable conditions include, but not limited to, temperature, pH, pressure, time period for setting, a ratio of the aqueous medium to the composition, and combination thereof. In some embodiments, the method further includes combining the composition before step (a) with a Portland cement clinker, aggregate, a supplementary cementitious material, or a combination thereof, before combining with the aqueous medium. In some embodiments, the cement product is a formed building material.

In one aspect, there is provided a system for making a cement product from the composition provided herein, comprising (a) an input for the composition provided herein; (b) an input for an aqueous medium; and (c) a reactor connected to the inputs of step (a) and step (b) configured to mix the composition provided herein with the aqueous medium under one or more suitable conditions to make a cement product.

In one aspect, there is provided a method for making a formed building material from the composition provided herein, comprising combining the composition provided herein with an aqueous medium under one or more suitable conditions; and allowing the composition to set and harden into the formed building material.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention may be obtained by reference to the following detailed description that sets forth illustrative embodiments, in which the principles of the invention are utilized, and the accompanying drawings of which:

DETAILED DESCRIPTION

Figure 1:
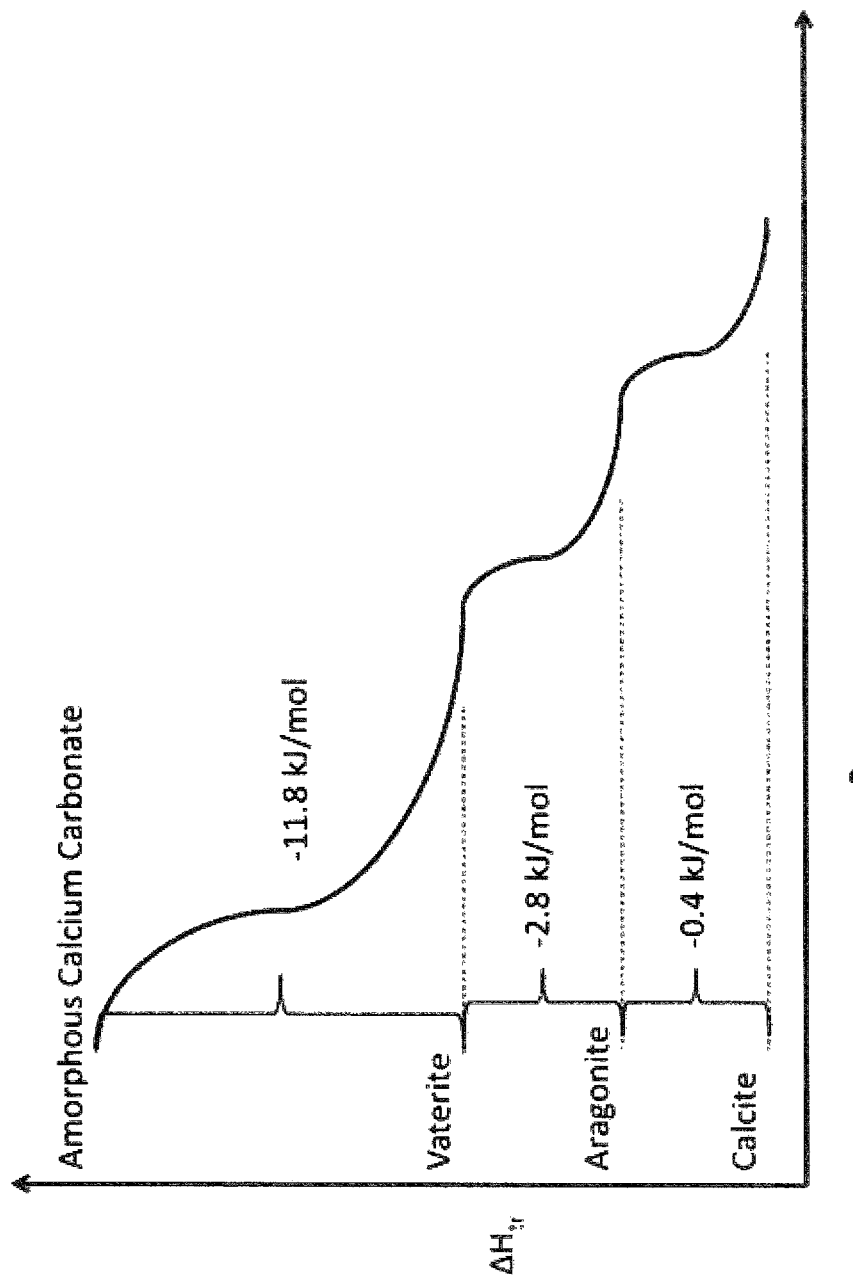
FIG. 1 illustrates a Gibbs free energy diagram of the transition from vaterite to aragonite and aragonite to calcite.

Provided herein are compositions, methods, and systems including carbonate materials and stabilizers; methods and systems for making and using the compositions; and the materials formed from such compositions, such as aggregates and formed or pre-formed building materials.

Provided herein are compositions containing metastable carbonate and stabilizer. In some embodiments, the compositions are cementitious compositions. The cementitious compositions include hydraulic cement, supplementary cementitious material, or self-cementing compositions that include polymorph forms of calcium carbonate, such as, but not limited to, metastable form such as vaterite ($CaCO_3$) alone or vaterite in combination with amorphous calcium carbonate ($CaCO_3 \cdot nH_2O$), aragonite ($CaCO_3$), calcite ($CaCO_3$), ikaite ($CaCO_3 \cdot 6H_2O$), a precursor phase of vaterite, a precursor phase of aragonite, an intermediary phase that is less stable than calcite, polymorphic forms in between these polymorphs, or combination thereof. The carbonate in the cementitious compositions provided herein includes one or more of metastable polymorphic forms, such as, but not limited to, vaterite, amorphous calcium carbonate, a precursor phase of vaterite, a precursor phase of aragonite, an intermediary phase that is less stable than calcite, polymorphic forms in between these polymorphs, or combination thereof.

It was unexpectedly and surprisingly found that the use of stabilizers during the preparation of the carbonate containing cementitious compositions results in more stable metastable carbonate containing compositions or that the stability of the composition can be optimized by optimizing the amount of the stabilizer. The metastable carbonate containing compositions provided herein are stable compositions in a dry powdered or wet form. The metastable forms in the compositions of the invention convert to the stable forms, such as aragonite and/or calcite, for cementation when contacted with fresh water.

The products obtained from the compositions provided herein (either alone or in combination with OPC) have high compressive strength resulting in products with high durability and less maintenance costs. The stability of the metastable carbonate in the compositions provided herein may be optimized by optimizing the amount of stabilizer or by optimizing the step at which the stabilizer is added during the preparation of the composition. The optimization of the stability of the composition may facilitate efficient control of the cementation process.

Applicants have also unexpectedly and surprisingly found that the activation of vaterite, as described herein, facilitates aragonitic pathway and not calcite pathway during dissolution-reprecipitation process. In one aspect of the invention, the vaterite containing composition is activated in such a way that after the dissolution-reprecipitation process, aragonite formation is enhanced and calcite formation is suppressed. The activation of the vaterite containing composition may result in control over the aragonite formation and crystal growth. The activation of the vaterite containing composition may be achieved by various processes, as described herein.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

I. Compositions

In one aspect, there are provided cementitious compositions including a metastable carbonate and a stabilizer. The cementitious compositions include hydraulic cement, supplementary cemetitious material (SCM), and self-cementing composition, where the hydraulic cement or the SCM or the self-cementing composition includes metastable and stable carbonate forms such as, vaterite, amorphous calcium carbonate (ACC), aragonite, calcite, ikaite, a precursor phase of vaterite, a precursor phase of aragonite, an intermediary phase that is less stable than calcite, polymorphic forms in between these polymorphs, and combination thereof. The cementitious compositions provided herein may further include forms of magnesium carbonate, calcium bicarbonate, magnesium bicarbonate, calcium magnesium carbonate, calcium magnesium bicarbonate, or combination thereof. The "cementitious" compositions as used herein, includes compositions that after combining with water set and harden into cement. In one aspect, there are provided non-cementitious compositions including a metastable carbonate and a stabilizer. The non-cementitious compositions include, but not limited to, paper, plastic, paint, etc.

As used herein, "metastable carbonate" includes metastable polymorphic forms of calcium carbonate such as vaterite, amorphous calcium carbonate, a precursor phase of vaterite, a precursor phase of aragonite, an intermediary phase that is less stable than calcite, polymorphic forms in between these polymorphs, or combination thereof. The metastable forms such as vaterite and precursor to vaterite and stable carbonate forms, such as, aragonite or calcite, may have varying degrees of solubility so that the metastable form, such as vaterite, may dissolve when hydrated in aqueous solutions and reprecipitate carbonate minerals, such as calcite and/or aragonite. The amorphous calcium carbonate, precursor of vaterite, vaterite, and precursor of aragonite can be utilized as a reactive metastable calcium carbonate forms for reaction purposes and stabilization reactions, such as cementing.

During precipitation of calcium carbonate, described herein, amorphous calcium carbonate (ACC) may initially precipitate and transform into one or more of its three more stable phases (vaterite, aragonite, or calcite). A thermodynamic driving force may exist for the transformation from unstable phases to more stable phases, as described by Ostwald in his Step Rule (Ostwald, W. *Zeitschrift fur Physikalische Chemie* 289 (1897)). For this reason, calcium carbonate phases may transform in the order: ACC to vaterite, aragonite, and calcite where intermediate phases may or may not be present. For instance, ACC can transform to vaterite and may not transform to aragonite or calcite; or ACC can transform to vaterite and then directly to calcite, skipping the aragonite form; or alternatively, ACC can transform to vaterite and then to aragonite without transforming to calcite. During this transformation, excesses of energy are released, as demonstrated in FIG. 1. This intrinsic energy may be harnessed to create a strong aggregation tendency and surface interactions that may lead to agglomeration and cementing. It is to be understood that the values reported in FIG. 1 are well known in the art and may vary.

The transformation between calcium carbonate polymorphs may occur via solid-state transition or may be solution mediated. In some embodiments, the transformation is solution-mediated because it may require less energy than the thermally activated solid-state transition. The solution-mediated transformation may be environmentally conscious and more applicable to a cementing application. Vaterite is metastable and the difference in thermodynamic stability of calcium carbonate polymorphs may be manifested as a difference in solubility, where the least stable phases are the most soluble (Ostwald, supra.). Therefore, vaterite may dissolve readily in solution and transform favorably towards a more stable polymorph: aragonite or calcite. The driving force for the formation of a particular calcium carbonate polymorph or combination of polymorphs is the change in Gibbs free energy from a supersaturated solution to equilibrium (Spanos & Koutsoukos *Journal of Crystal Growth* (1998) 191, 783-790).

In a polymorphic system like calcium carbonate, two kinetic processes may exist simultaneously in solution: dissolution of the metastable phase and growth of the stable phase (Kralj et al. *Journal of Crystal Growth* (1997) 177, 248-257). In some embodiments, the aragonite or calcite crystals may be growing while vaterite may be undergoing dissolution in the aqueous medium. Crystallization of the polymorphs may be a surface controlled process where heterogeneous nucleation may be responsible for the formation of multiple solid phases. When a single phase is present, the number of particles may decrease with time, while their size increases (Spanos & Koutsoukos, supra.).

Vaterite in the metastable carbonate may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition, may be needle shaped, columnar, or crystals of the rhombic system. Calcite, if present, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The stabilizer as provided herein may stabilize the metastable carbonate forms such that the conversion of ACC to vaterite or the conversion of vaterite to aragonite is slowed down and the stability of the metastable form increases. In some embodiments, the stabilizer may affect the Gibbs free energy of transformation of one form to the other. As used herein, "stabilizer" includes any reagent that stabilizes the metastable forms of carbonate in the composition. In some embodiments, the metastable form that is stabilized by the stabilizer is vaterite. In some embodiments, the stabilizer stabilizes the metastable forms of the carbonate in the composition from hours to days to few weeks to many years. In some embodiments, the stabilizer stabilizes the metastable forms of the carbonate in the composition for upto 20 years; or for upto 10 years; or for upto 5 years; or for upto 1 year; or from few hours to 2 weeks; or from 2 weeks to 20 years; or from 2 weeks to 10 years; or from 2 weeks to 5 years; or from 2 weeks to 1 year; or from 2 weeks to few months such as 6 months, 8 months etc. In some embodiments, the stability of the metastable carbonate in the composition with stabilizer is more than the stability of the metastable carbonate in the composition without the stabilizer. In some embodiments, the stabilizer stabilizes the metastable forms of the carbonate in the composition for few hours to few days to few weeks.

In some embodiments, the stability of the metastable carbonate forms in the compositions provided herein may be optimized for any period of time by optimizing the amount of the stabilizer added during the formation of the composition. In some embodiments, the stability of the metastable carbonate forms in the compositions provided herein may be optimized for any period of time by optimizing the step at which the stabilizer is added during the formation of the composition. Therefore, the composition may be stabilized for a period of time based on desired reactivity for the composition. For example, in applications such as preformed building materials where the composition may need to be rapidly cemented, a less stable metastable carbonate containing composition may be desired. In some embodiments, in applications where the composition is used as hydraulic cement, a slow cementation may be desired and a more stable metastable carbonate containing composition may be formed. In some embodiments, in applications where the composition is used as SCM, a super stable metastable carbonate containing composition may be desired that may not react with the cement it is mixed with to form a stable cemented product. In some embodiments, the stabilizer imparts storage stability to the composition. In some embodiments, the cementitious composition may need to be stored for a longer period of time and the amount of stabilizer may be used accordingly. The amount of the stabilizer used during the formation of the cementitious composition may be varied depending on the desired stability of the composition.

In some embodiments, the amount of stabilizer used during the formation of the metastable carbonate is more than 0.1% w/w; more than 0.5% w/w; more than 1% w/w; or more than 10% w/w; or more than 25% w/w/; or between 0.1-20% w/w; or between 0.1-15% w/w; or between 0.1-10% w/w; or between 0.1-5% w/w; or between 0.1-2% w/w; or between 0.1-1% w/w; or between 0.5-20% w/w; or between 0.5-15% w/w; or between 0.5-10% w/w; or between 0.5-5% w/w; or between 0.5-2% w/w; or between 0.5-1% w/w; or between 1-20% w/w; or between 1-15% w/w; or between 1-10% w/w; or between 1-5% w/w; or between 1-2% w/w; or between 1.5-20% w/w; or between 1.5-15% w/w; or between 1.5-10% w/w; or between 1.5-5% w/w; or between 1.5-2% w/w; or between 2-20% w/w; or between 2-15% w/w; or between 2-10% w/w; or between 2-5% w/w; or between 2-3% w/w; or between 5-20% w/w; or between 5-15% w/w; or between 5-10% w/w; or between 5-8% w/w; or between 8-20% w/w; or between 8-15% w/w; or between 8-10% w/w; or between 10-15% w/w; or between 10-20% w/w; or between 15-20% w/w; or 0.1% w/w; or 0.5% w/w; or 1% w/w; or 1.5% w/w; or 2% w/w; or 2.5% w/w; or 3% w/w; or 5% w/w; or 10% w/w; or 15% w/w; or 20% w/w (or by weight). In some embodiments, the above recited amounts are in weight by volume (w/v). In some embodiments, the amount of stabilizer used during the formation of the metastable carbonate or the amount of stabilizer present in the cementitious compositions is 1 mM (millimolar) to 50 mM; or 1 mM to 40 mM; or 1 mM to 30 mM; or 1 mM to 20 mM; or 1 mM to 10 mM; or 1 mM to 5 mM; or 1 mM to 4 mM; or 1 mM to 3 mM; or 1 mM to 2 mM; or 2 mM to 50 mM; or 2 mM to 40 mM; or 2 mM to 30 mM; or 2 mM to 20 mM; or 2 mM to 10 mM; or 2 mM to 5 mM; or 2 mM to 4 mM; or 2 mM to 3 mM; or 3 mM to 50 mM; or 3 mM to 40 mM; or 3 mM to 30 mM; or 3 mM to 20 mM; or 3 mM to 10 mM; or 3 mM to 5 mM; or 3 mM to 4 mM; or 4 mM to 50 mM; or 4 mM to 40 mM; or 4 mM to 30 mM; or 4 mM to 20 mM; or 4 mM to 10 mM; or 4 mM to 5 mM; or 5 mM to 50 mM; or 5 mM to 40 mM; or 5 mM to 30 mM; or 5 mM to 20 mM; or 5 mM to 10 mM; or 6 mM to 50 mM; or 6 mM to 40 mM; or 6 mM to 30 mM; or 6 mM to 20 mM; or 6 mM to 10 mM; or 7 mM to 50 mM; or 7 mM to 40 mM; or 7 mM to 30 mM; or 7 mM to 20 mM; or 7 mM to 10 mM; or mM; or 2 mM; or 3 mM; 4 mM; or 5 mM; or 6 mM; or 7 mM; or 8 mM; or 9 mM; or 10 mM. In some embodiments, the above described amount of the stabilizer is the amount of stabilizer present in the cementitious compositions described herein.

For example, in some embodiments, the amount of stabilizer present in the compositions is between 0.1 wt % to 2 wt %; or between 0.1 wt % to 1.5 wt %; or between 0.1 wt % to 1 wt %; or between 0.1 wt % to 0.5 wt %; or between 0.1 wt % to 0.2 wt %; or between 0.5 wt % to 2 wt %; or between 0.5 wt % to 1.5 wt %; or between 0.5 wt % to 1 wt %; or between 1 wt % to 2 wt %; or between 1 wt % to 1.5 wt %; or between 1.5 wt % to 2 wt %.

In some embodiments where sulfate such as sulfate in sea water, an alkali metal sulfate, an alkaline earth metal sulfate, lignosulfate, or combination thereof, is used as the stabilizer, some or all of sulfate in the metastable carbonate containing composition is from the sulfate added during precipitation. In some embodiments, the sulfate present in the metastable carbonate compositions of the invention is not from the flue gas or is in only ppm from the flue gas and the rest is from the sulfate stabilizer. For example, typically 400 scfm of flue gas entering the process of the invention may contain 1.3 ton/day of $CO_2$. In addition, the flue gas entering the process may contain 0.15 lb/day of $NO_X$, 0.004 lb/day of CO, and 0.0015 lb/day of $SO_X$. So roughly assuming identical capture of $CO_2$ and $SO_2$, for each 1.3 tons of $CO_2$ captured there may be 0.0015 lbs of $SO_2$ in the composition of the invention (a ratio of 1,911,000 $CO_2$ to 1 $SO_2$). This sulfur content in the composition of the invention originating from the flue gas is in ppm. Accordingly, in some embodiments, of the total sulfate stabilizer present in the compositions of the invention more than 90% is from the stabilizer added during the precipitation process or more than 90% is from sulfate such as, sodium sulfate added during the process; or more than 95%, or between 80-99%, or between 80-99.9%, or between 90-99% or between 90-95%, is from sodium sulfate added during the process.

In some embodiments, there is provided a composition comprising the metastable carbonate and a stabilizer wherein the stabilizer is more than 0.1 wt %. In some embodiments, the stabilizer is sulfate in sea water, an alkali metal sulfate, alkaline earth metal sulfate, lignosulfate, or combination thereof. In some embodiments, the stabilizer is an alkali metal sulfate. In some embodiments, the stabilizer is an alkali metal sulfate and the sulfate in the composition is at least 0.1 wt %. In some embodiments, the more than 90% of the sulfate in the composition is from the stabilizer added during the process. In some embodiments, the metastable carbonate in such compositions comprises vaterite. In some embodiments, the amount of vaterite in such composition is at least 50 wt % or between 50-100 wt %. In some embodiments, the composition is cementitious. In some embodiments, such composition has carbon isotopic fractionation value ($\delta^{13}C$) of less than −12‰ or between −12‰ to −25‰. Accordingly, there is provided a composition comprising at least 50 wt % vaterite and a stabilizer. In some embodiments, there is provided a composition comprising at least 50 wt % vaterite and at least 0.1 wt % of stabilizer. In some embodiments, there is provided a composition comprising at least 50 wt % vaterite and a sulfate such as an alkali metal sulfate, alkaline earth metal sulfate, lignosulfate, or combination thereof. In some embodiments, there is provided a composition comprising at least 50 wt % vaterite and at least 0.1 wt % of an alkali metal sulfate. In some embodiments, there is provided a composition comprising at least 50 wt % or between 50-100 wt % vaterite and at least 0.1 wt % or between 0.1-1.5 wt % sulfate. In some embodiments, there is provided a composition comprising at least 50 wt % or between 50-100 wt % vaterite and at least 0.1 wt % or between 0.1-1.5 wt % stabilizer wherein composition has carbon isotopic fractionation value ($\delta^{13}C$) of less than −12‰ or between −12‰ to −25‰. In some embodiments, there is provided a composition comprising at least 50 wt % or between 50-100 wt % vaterite and at least 0.1 wt % or between 0.1-1.5 wt % sulfate wherein composition has carbon isotopic fractionation value ($\delta^{13}C$) of less than −12‰ or between −12‰ to −25‰. In some embodiments, there is provided a composition comprising at least 50 wt % or between 50-100 wt % vaterite and at least 0.1 wt % or between 0.1-1.5 wt % stabilizer wherein composition has carbon isotopic fractionation value ($\delta^{13}C$) of less than −12‰ or between −12‰ to −25‰ and wherein the composition after combination with water sets and hardens with a compressive strength between 14-40 MPa. In some embodiments, there is provided a composition comprising at least 50 wt % or between 50-100 wt % vaterite and at least 0.1 wt % or between 0.1-1.5 wt % sulfate wherein composition has carbon isotopic fractionation value ($\delta^{13}C$) of less than −12‰ or between −12‰ to −25‰ and wherein the composition after combination with water sets and hardens with a compressive strength between 14-40 MPa. In some embodiments of the above described compositions, the composition is a non-naturally occurring or synthetic cementitious composition selected from hydraulic cement, SCM, self-cement, or combination thereof. In some embodiments of the above described compositions, the sulfate is an alkali metal sulfate, alkaline earth metal sulfate, lignosulfate, or combination thereof. In some embodiments of the above described compositions, the vatreite is an activated vaterite. In some embodiments of the above described compositions, the ratio of the calcium to carbonate (Ca:$CO_3$) in the metastable carbonate or vaterite is between 1:1 to 1.5:1.

In some embodiments, ratio of the calcium to carbonate (Ca:$CO_3$) in the metastable carbonate composition affects the partition coefficient of the stabilizer in the cementitious composition from the solution to the solid. In some embodiments, the ratio of the calcium to carbonate in the metastable carbonate composition in combination with the amount of stabilizer (e.g. as described above) in the composition, may affect the stability of the metastable carbonate composition. In some embodiments, the ratio of the calcium to carbonate in the metastable carbonate composition in combination with the amount of stabilizer in the composition (e.g. as described above), may be used to optimize the stability of the metastable carbonate composition. In some embodiments, the ratio of the calcium to the carbonate (Ca:$CO_3$) in the metastable carbonate composition is in a range of 0.5:1-5:1; or 0.5:1-4:1; or 0.5:1-3:1; or 0.5:1-2:1; or 0.5:1-1.9:1; or 0.5:1-1.8:1; or 0.5:1-1.7:1; or 0.5:1-1.6:1; or 0.5:1-1.5:1; or 0.5:1-1.4:1; or 0.5:1-1.3:1; or 0.5:1-1.2:1; or 0.5:1-1.1:1; or 0.5:1-1:1; 1:1-5:1; or 1:1-4:1; or 1:1-3:1; or 1:1-2:1; or 1:1-1.9:1; or 1:1-1.8:1; or 1:1-1.7:1; or 1:1-1.6:1; or 1:1-1.5:1; or 1:1-1.4:1; or 1:1-1.3:1; or 1:1-1.2:1; or 1:1-1.1:1; 2:1-5:1; or 2:1-4:1; or 2:1-3:1; 3:1-5:1; or 3:1-4:1; 4:1-5:1. In some embodiments, the ratio is a molar ratio. In some embodiments, the ratio is weight ratio.

In some embodiments, a higher amount of stabilizer and a higher calcium:carbonate ratio results in more stable metastable carbonate.

In some embodiments, the ratio of the calcium:carbonate in the metastable carbonate and/or the amount of stabilizer in the cementitious composition provides stability to metastable phases of the metastable carbonate during the formation, dewatering, rinsing, and/or drying process to obtain the composition. In some embodiments, these factors do not inhibit phase transformation during cemenation of vaterite composition, such as formation of calcite and/or aragonite.

In some embodiments, the stabilizer provided herein is an organic compound or an inorganic compound. In some embodiments, the stabilizer includes, but not limited to, acid, ester, phosphate, sulfate, polyethylene oxide, polyalcohol, and combination thereof. Examples of acid include, but not limited to, $C_1$-$C_{20}$ acid, sulfonic acid, or a phosphonic acid. Examples of $C_1$-$C_{20}$ acid include, but not limited to, citric acid, malic acid, adipic acid, tannic acid, lactic acid, ascorbic acid, acetic acid, fumaric acid, and mixtures thereof. Examples of sulfonic acid include, but not limited to, copolymer of 2-acrylamido-2-methyl propanesulfonic acid with acrylic acid. Examples of phosphonic acid include, but not limited to, N-nitrilo tris(methylene phosphonic acid), 1,2-ethanediyl bis(nitrilo di(methylene phosphonic acid)); 1,6-hexanediyl bis(nitrilodi(methylene phosphonic acid)), amino tris(methylene phosphonic acid), polymethoxy polyphosphonic acid, ethylenediamine tetra(methylene phosphonic acid) (EDTMP), and combination thereof. In some embodiments, the acids described herein, may further include an amino and/or hydroxyl group. Examples of esters include, but not limited to, an ester of a $C_1$-$C_{20}$ acid, a phosphonic acid, or a sulfonic acid. Such acids have been described above. In some embodiments, the stabilizer is a sulfate. The "sulfate" as used herein includes any molecule that provides sulfate ions in the solution. Examples of sulfate include, but not limited to, sea water, an alkali metal sulfate, alkaline earth metal sulfate, lignosulfate, or combination thereof. Such sulfates include, but not limited to, sodium sulfate, potassium sulfate, calcium sulfate, magnesium sulfate, barium sulfate, etc. In some embodiments, the sulfate is sodium sulfate. In some embodiments, the polyethylene oxide is the polymer that has a molecular weight of between 1,000 and 100,000. Other examples of polyethylene oxide include, but not limited to, the polyethylene oxide of formula R-Ph-O($OCH_2CH_2$)$_m$OH where R is an alkyl group of from 5 to 30 carbon atoms, Ph is a phenyl group, and m is an integer having value between 5 to 50. In some embodiments, the polyethylene oxide is ethoxylated nonylphenyl including in a range of 20 to 30 moles of ethylene oxide. Examples of polyalcohol include, but not limited to, C10-C18 polyalcohol.

Without being limited by any theory, it is contemplated that the use of stabilizer may result in control of one or more of the properties of the metastable carbonate including, but not limited to, polymorph, morphology, particle size, agglomeration, coagulation, aggregation, sedimentation, crystallography, inhibiting growth along a certain face of a crystal, allowing growth along a certain face of a crystal, reduce the surface charge, increase the surface charge, or combination thereof. For example, the stabilizer may selectively target one morphology or polymorph (based on difference in surface charge), inhibit its growth and promote the formation of another polymorph that is generally not favorable kinetically. In some embodiments, the stabilizer may reduce the surface charge of the precipitated carbonate solids thereby increasing the agglomeration. In some embodiments, the stabilizer may bind to the precipitated surfaces; may be a calcium binding agent or carbonate binding agent; is incorporated in crystal lattice of the carbonate; is absorbed on the surface of the carbonate; is bound to the carbonate as a ligand; is present as a particle in the carbonate composition; is encapsulated in the carbonate; or any combination thereof.

In one aspect, there are provided compositions including an activated vaterite. As used herein, "activated vaterite" or its grammatical equivalent includes vaterite that leads to aragonite formation during and/or after dissolution-reprecipitation process. One example of the dissolution-reprecipitation process includes cementation. The cementation process includes combining the composition with water when it sets and hardens. Applicants unexpectedly and surprisingly found that in some embodiments, the compositions of the invention further benefit by the activation of the metastable carbonate. Various examples of the activation of vaterite, such as, but not limited to, nuclei activation, thermal activation, mechanical activation, chemical activation, or combination thereof, are described herein. In some embodiments, the composition of the invention containing metastable carbonate is activated such that an activated metastable carbonate is formed. The vaterite containing compositions are activated in such a way that the composition results in the conversion of vaterite to aragonite during dissolution-reprecipitation process. In some embodiments, the activation of the vaterite facilitates the conversion of the vaterite to aragonite while inhibiting the further conversion to calcite. In some embodiments, the vaterite is activated through various processes such that aragonite formation and its morphology and/or crystal growth can be controlled upon reaction of vaterite containing composition with water. The aragonite formed results in higher compressive strength and fracture tolerance to the structure built from the composition. In some embodiments, vaterite may be activated by mechanical means, as described herein. For example, the vaterite containing compositions may be activated by creating surface defects on the vaterite composition such that aragonite formation is accelerated. In some embodiments, the activated vaterite is a ball-milled vaterite or is a vaterite with surface defects such that aragonite formation pathway is facilitated. The vaterite containing compositions may also be activated by providing chemical or nuclei activation to the vaterite composition. Such chemical or nuclei activation may be provided by one or more of aragonite seeds, inorganic additive, or organic additive.

In one aspect, there are provided compositions including vaterite, a stabilizer, and one or more of aragonite seed, inorganic additive or organic additive. In one aspect, there are provided compositions including an activated vaterite, a stabilizer, and one or more of aragonite seed, inorganic additive or organic additive. The presence of aragonite seeds, inorganic addive, organic additive, or combination thereof, in the composition, may also activate vaterite to facilitate aragonite pathway during dissolution-reprecipitation process. The amorphous calcium carbonate, precursor of vaterite, and/or vaterite, can be utilized as a reactive metastable calcium carbonate forms for reaction purposes and stabilization reactions, such as cementing.

In some embodiments, there are provided compositions containing vaterite, a stabilizer, and one or more of aragonite seed, inorganic additive or organic additive where the vaterite is a ball-milled vaterite. In some embodiments, the vaterite is activated by generating surface defects, such as, ball-milling. Ball-milling is a process in which the vaterite containing material is grinded using a grinder into powder. The ball-milling process can affect the size, density, hardness, and/or reactivity of the material.

The aragonite seed present in the compositions provided herein may be obtained from natural or synthetic sources. The natural sources include, but not limited to, reef sand, limestone, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of vaterite to aragonite, such as transformed vaterite described herein.

In some embodiments, the inorganic additive or organic additive in the compositions provided herein can be any additive that activates vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

In some embodiments, the amount of aragonite seed, inorganic additive or organic additive added to the composition is less than 0.01% w/w; or less than 0.1% w/w; or between 0.001-20% w/w; or between 0.001-15% w/w; or between 0.001-10% w/w; or between 0.001-5% w/w; or between 0.001-2% w/w; or between 0.001-1% w/w; or between 0.01-20% w/w; or between 0.01-15% w/w; or between 0.01-10% w/w; or between 0.01-5% w/w; or between 0.01-2% w/w; or between 0.01-1% w/w; or between 0.1-20% w/w; or between 0.1-15% w/w; or between 0.1-10% w/w; or between 0.1-5% w/w; or between 0.1-2% w/w; or between 0.1-1% w/w; or 0.001% w/w; or 0.01% w/w; or 0.1% w/w; or 0.5% w/w; or 1% w/w; or 1.5% w/w; or 2% w/w; or 2.5% w/w; or 3% w/w; or 5% w/w; or 10% w/w; or 15% w/w; or 20% w/w (or by weight). In some embodiments, the above recited amounts are in weight by volume (w/v). It is to be understood, that the amount of aragonite seed that may be needed to seed the vaterite composition may be a small amount including one or few crystals of aragonite.

Without being limited by any theory, it is contemplated that the activation of vaterite by ball-milling or by addition of aragonite seed, inorganic additive or organic additive or combination thereof may result in control of formation of aragonite during dissolution-reprecipitation process of the activated vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of aragonite that may generally not be favorable kinetically.

In some embodiments, the cementitious compositions provided herein are synthetic compositions and are not naturally occurring. In some embodiments, the compositions provided herein are non-medical or are not for medical procedures. In some embodiments, the composition is in a powder form. In some embodiments, the composition is in a dry powder form. In some embodiments, the composition is disordered or is not in an ordered array or is in the powdered form. In still some embodiments, the composition is in a partially or wholly hydrated form.

The compositions provided herein show properties, such as, high compressive strength, high durability, and less maintenance costs. In some embodiments, the compositions upon combination with water, setting, and hardening, have a compressive strength of at least 14 MPa (megapascal) or in some embodiments, between 14-80 MPa, or 14-40 MPa, or 14-35 MPa. In some embodiments, the metastable carbonate containing compositions provided herein are formed from $CO_2$ source that has a fossil fuel origin. Accordingly, in some embodiments, the compositions provided herein have a carbon isotopic fractionation value ($\delta^{13}C$) of less than −12‰.

In some embodiments, the cementitious composition provided herein is a hydraulic cement composition. As used herein, "hydraulic cement" includes a composition which sets and hardens after combining with water or a solution where the solvent is water, e.g., an admixture solution. After hardening, the compositions retain strength and stability even under water. As a result of the immediately starting reactions, stiffening can be observed which may increase with time. After reaching a certain level, this point in time may be referred to as the start of setting. The consecutive further consolidation may be called setting, after which the phase of hardening begins. The compressive strength of the material may then grow steadily, over a period which ranges from a few days in the case of "ultra-rapid-hardening" cements, to several months or years in the case of other cements. Setting and hardening of the product produced by combination of the composition of the invention with an aqueous liquid may or may not result from the production of hydrates that may be formed from the composition upon reaction with water, where the hydrates are essentially insoluble in water. Cements may be employed by themselves or in combination with aggregates, both coarse and fine, in which case the compositions may be referred to as concretes or mortars. Cements may also be cut and chopped to form aggregates. In some embodiments, it may be desired to produce a hydraulic cement composition with stabilized vaterite that is stabilized to withstand the process such as dewatering, drying etc. but that such stabilized vaterite facilitates aragonite formation after dissolution and reprecipitation to form cement.

In some embodiments, the cementitious composition provided herein is a supplementary cementitious material (SCM). As used herein, "supplementary cementitious material" (SCM) includes SCM as is well known in the art. For example, when SCM of the invention is mixed with Portland cement, one or more properties of that Portland cement after interaction with SCM substantially remain unchanged or are enhanced as compared to the Portland cement itself without SCM or the Portland cement mixed with conventional SCM (such as fly ash). The properties include, but are not limited to, fineness, soundness, consistency, setting time of cement, hardening time of cement, rheological behavior, hydration reaction, specific gravity, loss of ignition, and/or hardness, such as compressive strength of the cement. For example, when 20% of SCM of the invention is added to 80% of OPC (ordinary Portland cement), the one or more properties, such as, e.g., compressive strength, of OPC either remain unchanged, decrease by no more than 10%, or are enhanced. The properties of Portland cement may vary depending on the type of Portland cement. The substitution of Portland cement with the SCM of the invention may reduce the $CO_2$ emissions without compromising the performance of the cement or the concrete as compared to regular Portland cement. In some embodiments, it may be desired to produce a SCM composition with stabilized vaterite that is stabilized to withstand the process such as dewatering, drying etc. and also that such stabilized vaterite does not transform to aragonite or transforms very slowly to aragonite after mixing with ordinary cement and after dissolution and reprecipitation to form cement, i.e. such stabilized vaterite SCM composition acts as a filler in the cement.

In some embodiments, the vaterite in the SCM composition of the invention may react with the Portland cement or Portland clinker. In some embodiments, the aluminates from the clinker fraction may combine with the carbonate of the SCM to form carboaluminates which may reduce the porosity of the concrete and increase its strength. In some embodiments, the SCM composition of the invention may act as a filler. In some embodiments, the size of the particles and/or the surface area of the particles may affect the interaction of the SCM composition of the invention with the Portland cement or Portland clinker. In some embodiments, the SCM composition of the invention may provide nucleation sites for the Portland cement or the Portland clinker. In some embodiments, the SCM composition of the invention may possess a combination of the foregoing embodiments.

In some embodiments, at least 17% by wt of SCM; or at least 18% by wt of SCM; or at least 19% by wt of SCM; or at least 20% by wt of SCM; or at least 21% by wt of SCM; or at least 22% by wt of SCM; or at least 23% by wt of SCM; or at least 24% by wt of SCM; or at least 25% by wt of SCM; or at least 30% by wt of SCM; or at least 40% by wt of SCM; or at least 50% by wt of SCM; or between 16-50% by wt of SCM; or between 16-40% by wt of SCM; or between 16-30% by wt of SCM; or between 16-25% by wt of SCM; or between 16-22% by wt of SCM; or between 16-20% by wt of SCM; or between 16-18% by wt of SCM; or between 18-50% by wt of SCM; or between 18-40% by wt of SCM; or between 18-30% by wt of SCM; or between 18-20% by wt of SCM; or between 20-50% by wt of SCM; or between 20-40% by wt of SCM; or between 20-30% by wt of SCM; or between 30-50% by wt of SCM; or between 30-40% by wt of SCM; or between 40-50% by wt of SCM; or 16% by wt of SCM; or 17% by wt of SCM; or 18% by wt of SCM; or 19% by wt of SCM; or 20% by wt of SCM; or 22% by wt of SCM; or 25% by wt of SCM; or 35% by wt of SCM, is mixed with OPC alone or OPC in combination with other SCM conventionally known in the art, such as, but not limited to, slag, fly ash, silica fume, calcined clay, or combination thereof.

In some embodiments, the cementitious composition provided herein is a self-cementing composition. As used herein, the "self cementing" composition is a composition that sets and hardens in water after precipitation of the carbonate without any step of dewatering or drying. In some embodiments, the self-cementing composition is present in water. In some embodiments, the self-cementing composition that is in water includes less than 90% by wt solid material; or less than 80% by wt solid material; or less than 70% by wt solid material; or less than 60% by wt solid material; or less than 50% by wt solid material; or less than 40% by wt solid material; or less than 30% by wt solid material; or less than 20% by wt solid material; or less than 10% by wt solid material; or between 10-90% by wt solid material; or between 10-80% by wt solid material; or between 10-70% by wt solid material; or between 10-50% by wt solid material; or between 10-30% by wt solid material; or between 40-90% by wt solid material; or between 50-90% by wt solid material. The self-cementing composition need not be dewatered and dried to make the cementitious composition. Such composition can be simply dewatered, optionally washed with water to partially or completely remove chloride, such as, sodium chloride, optionally dewatered again, and poured into molds where it sets and hardens to form a rock, pre-cast or pre-formed building materials. The rock can be further processed to make aggregates. Such absence of the step of drying saves energy, reduces the carbon foot print, and provides a cleaner environment. Such self-cementing composition can be artificially lithified in processes that mimic geologic processes in which physical, rather than chemical, processes are the processes by which rocks are formed, e.g., dissolution and reprecipitation of compounds in new forms that serve to bind the composition together. Such self-cementing composition, in certain embodiments, contains one or more carbonate compounds, e.g., carbonate compounds derived from a fossil fuel source.

The self-cementing composition when rinsed with water may lead to a synthetic rock in a process in which polymorphs recited herein, such as, vaterite, is converted to more stable components, such as aragonite, calcite, or combination thereof. For example, in some embodiments, the synthetic rock is produced from the self-cementing composition in a process where vaterite is converted to aragonite optionally containing calcite. In some embodiments, it may be desired to produce a self-cementing composition with stabilized vaterite sufficiently stabilized to facilitate rapid transformation to aragonite after dissolution and reprecipitation to form cement.

In some embodiments of the aspects and embodiments provided herein, the cementitious composition or the metastable carbonate includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 95% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 80% w/w vaterite; or from 20% w/w to 70% w/w vaterite; or from 20% w/w to 60% w/w vaterite; or from 20% w/w to 50% w/w vaterite; or from 20% w/w to 40% w/w vaterite; or from 20% w/w to 30% w/w vaterite; or from 20% w/w to 25% w/w vaterite; or from 30% w/w to 99% w/w vaterite; or from 30% w/w to 95% w/w vaterite; or from 30% w/w to 90% w/w vaterite; or from 30% w/w to 80% w/w vaterite; or from 30% w/w to 70% w/w vaterite; or from 30% w/w to 60% w/w vaterite; or from 30% w/w to 50% w/w vaterite; or from 30% w/w to 40% w/w vaterite; or from 40% w/w to 99% w/w vaterite; or from 40% w/w to 95% w/w vaterite; or from 40% w/w to 90% w/w vaterite; or from 40% w/w to 80% w/w vaterite; or from 40% w/w to 70% w/w vaterite; or from 40% w/w to 60% w/w vaterite; or from 40% w/w to 50% w/w vaterite; or from 50% w/w to 99% w/w vaterite; or from 50% w/w to 95% w/w vaterite; or from 50% w/w to 90% w/w vaterite; or from 50% w/w to 80% w/w vaterite; or from 50% w/w to 70% w/w vaterite; or from 50% w/w to 60% w/w vaterite; or from 60% w/w to 99% w/w vaterite; or from 60% w/w to 95% w/w vaterite; or from 60% w/w to 90% w/w vaterite; or from 60% w/w to 80% w/w vaterite; or from 60% w/w to 70% w/w vaterite; or from 70% w/w to 99% w/w vaterite; or from 70% w/w to 95% w/w vaterite; or from 70% w/w to 90% w/w vaterite; or from 70% w/w to 80% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or from 90% w/w to 95% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. In some embodiments, the cementitious composition or the metastable carbonate contains at least 50% by weight vaterite or between 50-100% by weight vaterite.

In some embodiments of the aspects and embodiments provided herein, the cementitious composition or the metastable carbonate includes at least 1% w/w amorphous calcium carbonate (ACC); or at least 2% w/w ACC; or at least 5% w/w ACC; or at least 10% w/w ACC; or at least 20% w/w ACC; or at least 30% w/w ACC; or at least 40% w/w ACC; or at least 50% w/w ACC; or at least 60% w/w ACC; or at least 70% w/w ACC; or at least 80% w/w ACC; or at least 90% w/w ACC; or from 1% w/w to 90% w/w ACC; or from 1% w/w to 80% w/w ACC; or from 1% w/w to 70% w/w ACC; or from 1% w/w to 60% w/w ACC; or from 1% w/w to 50% w/w ACC; or from 1% w/w to 40% w/w ACC; or from 1% w/w to 30% w/w ACC; or from 1% w/w to 20% w/w ACC; or from 1% w/w to 10% w/w ACC; or from 5% w/w to 90% w/w ACC; or from 5% w/w to 80% w/w ACC; or from 5% w/w to 70% w/w ACC; or from 5% w/w to 60% w/w ACC; or from 5% w/w to 50% w/w ACC; or from 5% w/w to 40% w/w ACC; or from 5% w/w to 30% w/w ACC; or from 5% w/w to 20% w/w ACC; or from 5% w/w to 10% w/w ACC; or from 10% w/w to 90% w/w ACC; or from 10% w/w to 80% w/w ACC; or from 10% w/w to 70% w/w ACC; or from 10% w/w to 60% w/w ACC; or from 10% w/w to 50% w/w ACC; or from 10% w/w to 40% w/w ACC; or from 10% w/w to 30% w/w ACC; or from 10% w/w to 20% w/w ACC; or from 20% w/w to 90% w/w ACC; or from 20% w/w to 80% w/w ACC; or from 20% w/w to 70% w/w ACC; or from 20% w/w to 60% w/w ACC; or from 20% w/w to 50% w/w ACC; or from 20% w/w to 40% w/w ACC; or from 20% w/w to 30% w/w ACC; or from 30% w/w to 90% w/w ACC; or from 30% w/w to 80% w/w ACC; or from 30% w/w to 70% w/w ACC; or from 30% w/w to 60% w/w ACC; or from 30% w/w to 50% w/w ACC; or from 30% w/w to 40% w/w ACC; or from 40% w/w to 90% w/w ACC; or from 40% w/w to 80% w/w ACC; or from 40% w/w to 70% w/w ACC; or from 40% w/w to 60% w/w ACC; or from 40% w/w to 50% w/w ACC; or from 50% w/w to 90% w/w ACC; or from 50% w/w to 80% w/w ACC; or from 50% w/w to 70% w/w ACC; or from 50% w/w to 60% w/w ACC; or from 60% w/w to 90% w/w ACC; or from 60% w/w to 80% w/w ACC; or from 60% w/w to 70% w/w ACC; or from 60% w/w to 65% w/w ACC; or from 70% w/w to 90% w/w ACC; or from 70% w/w to 80% w/w ACC; or from 70% w/w to 75% w/w ACC; or from 80% w/w to 90% w/w ACC; or from 80% w/w to 85% w/w ACC; or from 85% w/w to 90% w/w ACC; or 1% w/w ACC; or 2% w/w ACC; or 5% w/w ACC; or 10% w/w ACC; or 20% w/w ACC; or 30% w/w ACC; or 40% w/w ACC; or 50% w/w ACC; or 60% w/w ACC; or 70% w/w ACC; or 80% w/w ACC; or 90% w/w ACC.

In some embodiments of the aspects and embodiments provided herein, the composition includes the vaterite in a range of 10% w/w to 99% w/w and the ACC in a range of 1% w/w to 90% w/w; or the vaterite is in a range of 10% w/w to 90% w/w and the ACC is in a range of 10% w/w to 90% w/w; or the vaterite is in a range of 10% w/w to 80% w/w and the ACC is in a range of 20% w/w to 90% w/w; or the vaterite is in a range of 10% w/w to 70% w/w and the ACC is in a range of 30% w/w to 90% w/w; or the vaterite is in a range of 10% w/w to 60% w/w and the ACC is in a range of 40% w/w to 90% w/w; or the vaterite is in a range of 10% w/w to 50% w/w and the ACC is in a range of 50% w/w to 90% w/w; or the vaterite is in a range of 10% w/w to 40% w/w and the ACC is in a range of 60% w/w to 90% w/w; or the vaterite is in a range of 10% w/w to 30% w/w and the ACC is in a range of 70% w/w to 90% w/w; or the vaterite is in a range of 10% w/w to 20% w/w and the ACC is in a range of 80% w/w to 90% w/w. It is to be understood that the percentage of each of the components in the composition will be in such a way that the total percentage of the components in the composition may not exceed a total of 100% by wt.

In some embodiments of the aspects and embodiments provided herein, the composition after setting, and hardening has a compressive strength of at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 14-100 MPa; or from 14-80 MPa; or from 14-75 MPa; or from 14-70 MPa; or from 14-65 MPa; or from 14-60 MPa; or from 14-55 MPa; or from 14-50 MPa; or from 14-45 MPa; or from 14-40 MPa; or from 14-35 MPa; or from 14-30 MPa; or from 14-25 MPa; or from 14-20 MPa; or from 14-18 MPa; or from 14-16 MPa; or from 17-35 MPa; or from 17-30 MPa; or from 17-25 MPa; or from 17-20 MPa; or from 17-18 MPa; or from 20-100 MPa; or from 20-90 MPa; or from 20-80 MPa; or from 20-75 MPa; or from 20-70 MPa; or from 20-65 MPa; or from 20-60 MPa; or from 20-55 MPa; or from 20-50 MPa; or from 20-45 MPa; or from 20-40 MPa; or from 20-35 MPa; or from 20-30 MPa; or from 20-25 MPa; or from 30-100 MPa; or from 30-90 MPa; or from 30-80 MPa; or from 30-75 MPa; or from 30-70 MPa; or from 30-65 MPa; or from 30-60 MPa; or from 30-55 MPa; or from 30-50 MPa; or from 30-45 MPa; or from 30-40 MPa; or from 30-35 MPa; or from 40-100 MPa; or from 40-90 MPa; or from 40-80 MPa; or from 40-75 MPa; or from 40-70 MPa; or from 40-65 MPa; or from 40-60 MPa; or from 40-55 MPa; or from 40-50 MPa; or from 40-45 MPa; or from 50-100 MPa; or from 50-90 MPa; or from 50-80 MPa; or from 50-75 MPa; or from 50-70 MPa; or from 50-65 MPa; or from 50-60 MPa; or from 50-55 MPa; or from 60-100 MPa; or from 60-90 MPa; or from 60-80 MPa; or from 60-75 MPa; or from 60-70 MPa; or from 60-65 MPa; or from 70-100 MPa; or from 70-90 MPa; or from 70-80 MPa; or from 70-75 MPa; or from 80-100 MPa; or from 80-90 MPa; or from 80-85 MPa; or from 90-100 MPa; or from 90-95 MPa; or 14 MPa; or 16 MPa; or 18 MPa; or 20 MPa; or 25 MPa; or 30 MPa; or 35 MPa; or 40 MPa; or 45 MPa. For example, in some embodiments of the aspects and embodiments provided herein, the composition after setting, and hardening has a compressive strength of 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

In some embodiments, the carbonate containing compositions provided herein are formed using a gaseous stream of $CO_2$. The calcium carbonate in the compositions of the invention may contain carbon dioxide from any number of sources including, but not limited to, an industrial waste stream including flue gas from combustion; a flue gas from a chemical processing plant; a flue gas from a plant that produces $CO_2$ as a byproduct; or combination thereof. In some embodiments, the carbon dioxide sequestered into the calcium carbonate in the compositions of the invention, originates from the burning of fossil fuel, and thus some (e.g., at least 10, 50, 60, 70, 80, 90, 95%) or substantially all (e.g., at least 99, 99.5, or 99.9%) of the carbon in the carbonates is of fossil fuel origin, i.e., of plant origin. Typically, carbon of plant origin has a different ratio of stable isotopes ($^{13}C$ and $^{12}C$) than carbon of inorganic origin. The plants from which fossil fuels are derived preferentially utilize $^{12}C$ over $^{13}C$, thus fractionating the carbon isotopes so that the value of their ratio differs from that in the atmosphere in general. This value, when compared to a standard value (PeeDee Belemnite, or PDB, standard), is termed the carbon isotopic fractionation ($\delta^{13}C$) value. Typically, $\delta^{13}C$ values for coal are in the range −30 to −20‰; $\delta^{13}C$ values for methane may be as low as −20‰ to −40‰ or even −40‰ to −80‰; $\delta^{13}C$ values for atmospheric $CO_2$ are −10‰ to −7‰; for limestone +3‰ to −3‰; and for marine bicarbonate, 0‰.

In some embodiments, the carbon in the vaterite and/or other polymorphs in the composition of the invention, has a $\delta^{13}C$ of less than −12‰, −13‰, −14‰, −15‰, −20‰, or less than −25‰, or less than −30‰, or less than −35‰, or less than −45‰, or less than −50‰, as described in further detail herein. In some embodiments, the composition of the invention includes a $CO_2$-sequestering additive including carbonates, bicarbonates, or a combination thereof, in which the carbonates, bicarbonates, or a combination thereof have a carbon isotopic fractionation ($\delta^{13}C$) value less than −12‰.

The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C‰=[(^{13}C/^{12}C_{sample}-^{13}C/^{12}C_{PDB\ standard})/(^{13}C/^{12}C_{PDB\ standard})]\times 1000$$

$^{12}C$ is preferentially taken up by plants during photosynthesis and in other biological processes that use inorganic carbon because of its lower mass. The lower mass of $^{12}C$ allows for kinetically limited reactions to proceed more efficiently than with $^{13}C$. Thus, materials that are derived from plant material, e.g., fossil fuels, have relative carbon isotope composition values that are less than those derived from inorganic sources. The carbon dioxide in flue gas produced from burning fossil fuels reflects the relative carbon isotope composition values of the organic material that was fossilized.

Material incorporating carbon from fossil fuels reflects $\delta^{13}C$ values that are like those of plant derived material, i.e. less than that which incorporates carbon from atmospheric or non-plant marine sources. The $\delta^{13}C$ value of the material produced by the carbon dioxide from the burning fossil fuels can be verified by measuring the $\delta^{13}C$ value of the material and confirming that it is not similar to the values for atmospheric carbon dioxide or marine sources of carbon. Table I below lists relative carbon isotope composition ($\delta^{13}C$) value ranges for various carbon sources for comparison.

TABLE I

| Carbon Source | $\delta^{13}C$ Range [‰] | $\delta^{13}C$ Average value [‰] |
|---|---|---|
| C3 Plants (most higher plants) | −23 to −33 | −27 |
| C4 Plants (most tropical and marsh plants) | −9 to −16 | −13 |
| Atmosphere | −6 to −7 | −6 |
| Marine Carbonate ($CO_3$) | −2 to +2 | 0 |
| Marine Bicarbonate ($HCO_3$) | −3 to +1 | −1 |
| Coal from Yallourn Seam in Australia[1] | −27.1 to −23.2 | −25.5 |
| Coal from Dean Coal Bed in Kentucky, USA[2] | −24.47 to −25.14 | −24.805 |

[1]Holdgate, G. R. et al., *Global and Planetary Change*, 65 (2009) pp. 89-103.
[2]Elswick, E. R. et al., *Applied Geochemistry*, 22 (2007) pp. 2065-2077.

In some embodiments, the invention provides a method of characterizing the composition of the invention by measuring its $\delta^{13}C$ value. Any suitable method may be used for measuring the $\delta^{13}C$ value, such as mass spectrometry or off-axis integrated-cavity output spectroscopy (off-axis ICOS). Any mass-discerning technique sensitive enough to measure the amounts of carbon, can be used to find ratios of the $^{13}C$ to $^{12}C$ isotope concentrations. The $\delta^{13}C$ values can be measured by the differences in the energies in the carbon-oxygen double bonds made by the $^{12}C$ and $^{13}C$ isotopes in carbon dioxide. The $\delta^{13}C$ value of a carbonate may serve as a fingerprint for a $CO_2$ gas source, as the value can vary from source to source. In some embodiments, the amount of carbon in the vaterite and/or polymorphs in the compositions provided herein, may be determined any suitable technique known in the art. Such techniques include, but are not limited to, coulometry.

In some embodiments of the aspects and embodiments provided herein, the composition has a $\delta^{13}C$ of less than −12‰; or less than −13‰; or less than −14‰; or less than −15‰; or less than −16‰; or less than −17‰; or less than −18‰; or less than −19‰; or less than −20‰; or less than −21‰; or less than −22‰; or less than −25‰; or less than −30‰; or less than −40‰; or less than −50‰; or less than −60‰; or less than −70‰; or less than −80‰; or less than −90‰; or less than −100‰; or from −12‰ to −80‰; or from −12‰ to −70‰; or from −12‰ to −60‰; or from −12‰ to −50‰; or from −12‰ to −45‰; or from −12‰ to −40‰; or from −12‰ to −35‰; or from −12‰ to −30‰; or from −12‰ to −25‰; or from −12‰ to −20‰; or from −12‰ to −15‰; or from −13‰ to −80‰; or from −13‰ to −70‰; or from −13‰ to −60‰; or from −13‰ to −50‰; or from −13‰ to −45‰; or from −13‰ to −40‰; or from −13‰ to −35‰; or from −13‰ to −30‰; or from −13‰ to −25‰; or from −13‰ to −20‰; or from −13‰ to −15‰; from −14‰ to −80‰; or from −14‰ to −70‰; or from −14‰ to −60‰; or from −14‰ to −50‰; or from −14‰ to −45‰; or from −14‰ to −40‰; or from −14‰ to −35‰; or from −14‰ to −30‰; or from −14‰ to −25‰; or from −14‰ to −20‰; or from −14‰ to −15‰; or from −15‰ to −80‰; or from −15‰ to −70‰; or from −15‰ to −60‰; or from −15‰ to −50‰; or from −15‰ to −45‰; or from −15‰ to −40‰; or from −15‰ to −35‰; or from −15‰ to −30‰; or from −15‰ to −25‰; or from −15‰ to −20‰; or from −16‰ to −80‰; or from −16‰ to −70‰; or from −16‰ to −60‰; or from −16‰ to −50‰; or from −16‰ to −45‰; or from −16‰ to −40‰; or from −16‰ to −35‰; or from −16‰ to −30‰; or from −16‰ to −25‰; or from −16‰ to −20‰; or from −20‰ to −80‰; or from −20‰ to −70‰; or from −20‰ to −60‰; or from −20‰ to −50‰; or from −20‰ to −40‰; or from −20‰ to −35‰; or from −20‰ to −30‰; or from −20‰ to −25‰; or from −30‰ to −80‰; or from −30‰ to −70‰; or from −30‰ to −60‰; or from −30‰ to −50‰; or from −30‰ to −40‰; or from −40‰ to −80‰; or from −40‰ to −70‰; or from −40‰ to −60‰; or from −40‰ to −50‰; or from −50‰ to −80‰; or from −50‰ to −70‰; or from −50‰ to −60‰; or from −60‰ to −80‰; or from −60‰ to −70‰; or from −70‰ to −80‰; or −12‰; or −13‰; or −14‰; or −15‰; or −16‰; or −17‰; or −18‰; or −19‰; or −20‰; or −21‰; or −22‰; or −25‰; or −30‰; or −40‰; or −50‰; or −60‰; or −70‰; or −80‰; or −90‰; or −100‰.

In some embodiments, the vaterite and the one or more polymorphs, in the compositions provided herein, are in a vaterite:one or more polymorph ratio of greater than 1:1; or a ratio of greater than 2:1; or a ratio of greater than 3:1; or a ratio of greater than 4:1; or a ratio of greater than 5:1; or a ratio of greater than 6:1; or a ratio of greater than 7:1; or a ratio of greater than 8:1; or a ratio of greater than 9:1; or a ratio of greater than 10:1; or a ratio of greater than 11:1; or a ratio of greater than 12:1; or a ratio of greater than 13:1; or a ratio of greater than 14:1; or a ratio of greater than 15:1; or a ratio of greater than 16:1; or a ratio of greater than 17:1; or a ratio of greater than 18:1; or a ratio of greater than 19:1; or a ratio of greater than 20:1; or a ratio of 1:1 to 20:1; or a ratio of 1:1 to 18:1; or a ratio of 1:1 to 15:1; or a ratio of 1:1 to 10:1; or a ratio of 1:1 to 9:1; or a ratio of 1:1 to 8:1; or a ratio of 1:1 to 7:1; or a ratio of 1:1 to 6:1; or a ratio of 1:1 to 5:1; or a ratio of 1:1 to 4:1; or a ratio of 1:1 to 3:1; or a ratio of 1:1 to 2:1; or a ratio of 2:1 to 20:1; or a ratio of 2:1 to 15:1; or a ratio of 2:1 to 10:1; or a ratio of 2:1 to 9:1; or a ratio of 2:1 to 8:1; or a ratio of 2:1 to 7:1; or a ratio of 2:1 to 6:1; or a ratio of 2:1 to 5:1; or a ratio of 2:1 to 4:1; or a ratio of 2:1 to 3:1; or a ratio of 5:1 to 20:1; or a ratio of 5:1 to 15:1; or a ratio of 5:1 to 10:1; or a ratio of 5:1 to 8:1; or a ratio of 7:1 to 20:1; or a ratio of 7:1 to 15:1; or a ratio of 7:1 to 10:1; or a ratio of 7:1 to 9:1; or a ratio of 10:1 to 20:1; or a ratio of 10:1 to 15:1; or a ratio of 10:1 to 12:1; or a ratio of 15:1 to 20:1; or a ratio of 15:1 to 18:1; or a ratio of 1:1; or a ratio of 2:1; or a ratio of 3:1; or a ratio of 4:1; or a ratio of 5:1; or a ratio of 6:1; or a ratio of 7:1; or a ratio of 8:1; or a ratio of 9:1; or a ratio of 10:1; or a ratio of 11:1; or a ratio of 12:1; or a ratio of 13:1; or a ratio of 14:1; or a ratio of 15:1; or a ratio of 16:1; or a ratio of 17:1; or a ratio of 18:1; or a ratio of 19:1; or a ratio of 20:1.

In some embodiments, the vaterite and the polymorph in the compositions provided herein are in a vaterite:one or more polymorph ratio of less than 1:1; or 0.1:1; or 0.2:1; or 0.3:1; or 0.4:1; or 0.5:1; or 0.6:1; or 0.7:1; or 0.8:1; or 0.9:1; or 0.1:1-10:1; or 0.2:1-10:1; or 0.3:1-10:1; or 0.4:1-10:1; or 0.5:1-10:1; or 0.6:1-10:1; or 0.7:1-10:1; or 0.8:1-10:1; or 0.9:1-10:1.

In some embodiments of the aspects and embodiments provided herein, the composition further includes 1% w/w to 85% w/w aragonite, 1% w/w to 85% w/w calcite, 1% w/w to 85% w/w ikaite, or combination thereof.

In some embodiments, the compositions in the aspects and embodiments provided herein, further include at least 1% w/w ACC and at least 1% w/w aragonite; at least 1% w/w ACC and at least 1% w/w calcite; at least 1% w/w ACC and at least 1% w/w ikaite; at least 1% w/w aragonite and at least 1% w/w calcite; at least 1% w/w aragonite and at least 1% w/w ikaite; at least 1% w/w calcite and at least 1% w/w ikaite; at least 1% w/w ACC, at least 1% w/w aragonite, and at least 1% w/w calcite; at least 1% w/w ACC, at least 1% w/w aragonite, and at least 1% w/w ikaite; at least 1% w/w ACC, at least 1% w/w ikaite, and at least 1% w/w calcite; at least 1% w/w aragonite, at least 1% w/w calcite, and at least 1% w/w ikaite; at least 1% w/w ACC, at least 1% w/w aragonite, at least 1% w/w calcite, and at least 1% w/w ikaite.

In some embodiments, the compositions in the aspects and embodiments provided herein, further include at least 1% w/w to 90% w/w ACC and at least 1% w/w to 85% w/w aragonite; at least 1% w/w to 90% w/w ACC and at least 1% w/w to 85% w/w calcite; at least 1% w/w to 90% w/w ACC and at least 1% w/w to 85% w/w ikaite; at least 1% w/w to 85% w/w aragonite and at least 1% w/w to 85% w/w calcite; at least 1% w/w to 85% w/w aragonite and at least 1% w/w to 85% w/w ikaite; at least 1% w/w to 85% w/w calcite and at least 1% w/w to 85% w/w ikaite; at least 1% w/w to 90% w/w ACC, at least 1% w/w to 85% w/w aragonite, and at least 1% w/w to 85% w/w calcite; at least 1% w/w to 90% w/w ACC, at least 1% w/w to 85% w/w aragonite, and at least 1% w/w to 85% w/w ikaite; at least 1% w/w to 90% w/w ACC, at least 1% w/w to 85% w/w ikaite, and at least 1% w/w to 85% w/w calcite; at least 1% w/w to 85% w/w aragonite, at least 1% w/w to 85% w/w calcite, and at least 1% w/w to 85% w/w ikaite; at least 1% w/w to 90% w/w ACC, at least 1% w/w to 85% w/w aragonite, at least 1% w/w to 85% w/w calcite, and at least 1% w/w to 85% w/w ikaite.

In some embodiments of the aspects and embodiments provided herein, the compositions further includes at least 1% w/w aragonite; or at least 2% w/w aragonite; or at least 5% w/w aragonite; or at least 10% w/w aragonite; or at least 20% w/w aragonite; or at least 30% w/w aragonite; or at least 40% w/w aragonite; or at least 50% w/w aragonite; or at least 60% w/w aragonite; or at least 70% w/w aragonite; or at least 80% w/w aragonite; or at least 85% w/w aragonite; or from 1% w/w to 85% w/w aragonite; or from 1% w/w to 80% w/w aragonite; or from 1% w/w to 70% w/w aragonite; or from 1% w/w to 60% w/w aragonite; or from 1% w/w to 50% w/w aragonite; or from 1% w/w to 40% w/w aragonite; or from 1% w/w to 30% w/w aragonite; or from 1% w/w to 20% w/w aragonite; or from 1% w/w to 10% w/w aragonite; or from 5% w/w to 85% w/w aragonite; or from 5% w/w to 80% w/w aragonite; or from 5% w/w to 70% w/w aragonite; or from 5% w/w to 60% w/w aragonite; or from 5% w/w to 50% w/w aragonite; or from 5% w/w to 40% w/w aragonite; or from 5% w/w to 30% w/w aragonite; or from 5% w/w to 20% w/w aragonite; or from 5% w/w to 10% w/w aragonite; or from 10% w/w to 85% w/w aragonite; or from 10% w/w to 80% w/w aragonite; or from 10% w/w to 70% w/w aragonite; or from 10% w/w to 60% w/w aragonite; or from 10% w/w to 50% w/w aragonite; or from 10% w/w to 40% w/w aragonite; or from 10% w/w to 30% w/w aragonite; or from 10% w/w to 20% w/w aragonite; or from 20% w/w to 85% w/w aragonite; or from 20% w/w to 80% w/w aragonite; or from 20% w/w to 70% w/w aragonite; or from 20% w/w to 60% w/w aragonite; or from 20% w/w to 50% w/w aragonite; or from 20% w/w to 40% w/w aragonite; or from 20% w/w to 30% w/w aragonite; or from 30% w/w to 85% w/w aragonite; or from 30% w/w to 80% w/w aragonite; or from 30% w/w to 70% w/w aragonite; or from 30% w/w to 60% w/w aragonite; or from 30% w/w to 50% w/w aragonite; or from 30% w/w to 40% w/w aragonite; or from 40% w/w to 85% w/w aragonite; or from 40% w/w to 80% w/w aragonite; or from 40% w/w to 70% w/w aragonite; or from 40% w/w to 60% w/w aragonite; or from 40% w/w to 50% w/w aragonite; or from 50% w/w to 85% w/w aragonite; or from 50% w/w to 80% w/w aragonite; or from 50% w/w to 70% w/w aragonite; or from 50% w/w to 60% w/w aragonite; or from 60% w/w to 85% w/w aragonite; or from 60% w/w to 80% w/w aragonite; or from 60% w/w to 70% w/w aragonite; or from 60% w/w to 65% w/w aragonite; or from 70% w/w to 85% w/w aragonite; or from 70% w/w to 80% w/w aragonite; or from 70% w/w to 75% w/w aragonite; or from 80% w/w to 85% w/w aragonite; or 1% w/w aragonite; or 2% w/w aragonite; or 5% w/w aragonite; or 10% w/w aragonite; or 20% w/w aragonite; or 30% w/w aragonite; or 40% w/w aragonite; or 50% w/w aragonite; or 60% w/w aragonite; or 70% w/w aragonite; or 80% w/w aragonite; or 85% w/w aragonite.

In some embodiments of the aspects and embodiments provided herein, the compositions further includes at least 1% w/w calcite; or at least 2% w/w calcite; or at least 5% w/w calcite; or at least 10% w/w calcite; or at least 20% w/w calcite; or at least 30% w/w calcite; or at least 40% w/w calcite; or at least 50% w/w calcite; or at least 60% w/w calcite; or at least 70% w/w calcite; or at least 80% w/w calcite; or at least 85% w/w calcite; or from 1% w/w to 85% w/w calcite; or from 1% w/w to 80% w/w calcite; or from 1% w/w to 75% w/w calcite; or from 1% w/w to 70% w/w calcite; or from 1% w/w to 65% w/w calcite; or from 1% w/w to 60% w/w calcite; or from 1% w/w to 55% w/w calcite; or from 1% w/w to 50% w/w calcite; or from 1% w/w to 45% w/w calcite; or from 1% w/w to 40% w/w calcite; or from 1% w/w to 35% w/w calcite; or from 1% w/w to 30% w/w calcite; or from 1% w/w to 25% w/w calcite; or from 1% w/w to 20% w/w calcite; or from 1% w/w to 15% w/w calcite; or from 1% w/w to 10% w/w calcite; or from 5% w/w to 85% w/w calcite; or from 5% w/w to 80% w/w calcite; or from 5% w/w to 70% w/w calcite; or from 5% w/w to 60% w/w calcite; or from 5% w/w to 50% w/w calcite; or from 5% w/w to 40% w/w calcite; or from 5% w/w to 30% w/w calcite; or from 5% w/w to 20% w/w calcite; or from 5% w/w to 10% w/w calcite; or from 10% w/w to 85% w/w calcite; or from 10% w/w to 80% w/w calcite; or from 10% w/w to 70% w/w calcite; or from 10% w/w to 60% w/w calcite; or from 10% w/w to 50% w/w calcite; or from 10% w/w to 40% w/w calcite; or from 10% w/w to 30% w/w calcite; or from 10% w/w to 20% w/w calcite; or from 20% w/w to 85% w/w calcite; or from 20% w/w to 80% w/w calcite; or from 20% w/w to 70% w/w calcite; or from 20% w/w to 60% w/w calcite; or from 20% w/w to 50% w/w calcite; or from 20% w/w to 40% w/w calcite; or from 20% w/w to 30% w/w calcite; or from 30% w/w to 85% w/w calcite; or from 30% w/w to 80% w/w calcite; or from 30% w/w to 70% w/w calcite; or from 30% w/w to 60% w/w calcite; or from 30% w/w to 50% w/w calcite; or from 30% w/w to 40% w/w calcite; or from 40% w/w to 85% w/w calcite; or from 40% w/w to 80% w/w calcite; or from 40% w/w to 70% w/w calcite; or from 40% w/w to 60% w/w calcite; or from 40% w/w to 50% w/w calcite; or from 50% w/w to 85% w/w calcite; or from 50% w/w to 80% w/w calcite; or from 50% w/w to 70% w/w calcite; or from 50% w/w to 60% w/w calcite; or from 60% w/w to 85% w/w calcite; or from 60% w/w to 80% w/w calcite; or from 60% w/w to 70% w/w calcite; or from 60% w/w to 65% w/w calcite; or from 70% w/w to 85% w/w calcite; or from 70% w/w to 80% w/w calcite; or from 70% w/w to 75% w/w calcite; or from 80% w/w to 85% w/w calcite; or 1% w/w calcite; or 2% w/w calcite; or 5% w/w calcite; or 10% w/w calcite; or 20% w/w calcite; or 30% w/w calcite; or 40% w/w calcite; or 50% w/w calcite; or 60% w/w calcite; or 70% w/w calcite; or 80% w/w calcite; or 85% w/w calcite.

The compositions provided herein may include a number of different cations, such as, but are not limited to, calcium, magnesium, sodium, potassium, sulfur, boron, silicon, strontium, and combinations thereof, where carbonate minerals include, but are not limited to: calcium carbonate minerals, magnesium carbonate minerals and calcium magnesium carbonate minerals. Calcium carbonate minerals in the composition of the invention include, but are not limited to: vaterite alone or in combination with calcite, aragonite, ikaite, amorphous calcium carbonate, a precursor phase of vaterite, a precursor phase of aragonite, an intermediary phase that is less stable than calcite, polymorphic forms in between these polymorphs, or combination thereof. These carbonate minerals may also be present in combination with magnesium carbonate minerals. Magnesium carbonate minerals include, but are not limited to, magnesite ($MgCO_3$), barringtonite ($MgCO_3.2H_2O$), nesquehonite ($MgCO_3.3H_2O$), lanfordite ($MgCO_3.5H_2O$) and amorphous magnesium calcium carbonate ($MgCO_3.nH_2O$). The carbonate minerals in the composition of the invention may also be present in combination with calcium magnesium carbonate minerals which include, but are not limited to, dolomite ($CaMgCO_3$), huntitte ($CaMg(CO_3)_4$) and sergeevite ($Ca_2Mg_{11}(CO_3)_{13}.H_2O$). Other calcium mineral that may be present in the composition of the invention, is portlandite ($Ca(OH)_2$), and amorphous hydrated analogs thereof. Other magnesium mineral that may be present in the composition of the invention, is brucite ($Mg(OH)_2$), and amorphous hydrated analogs thereof.

In some embodiments of the aspects and embodiments provided herein, the composition further includes strontium (Sr). In some embodiments, the Sr is present in the composition in an amount of 1-50,000 parts per million (ppm); or 1-10,000 ppm; or 1-5,000 ppm; or 1-1,000 ppm; or 3-50,000 ppm; or 3-10,000 ppm; or 3-9,000 ppm; or 3-8,000 ppm; or 3-7,000 ppm; or 3-6,000 ppm; or 3-5,000 ppm; or 3-4,000 ppm; or 3-3,000 ppm; or 3-2,000 ppm; or 3-1,000 ppm; or 3-900 ppm; or 3-800 ppm; or 3-700 ppm; or 3-600 ppm; or 3-500 ppm; or 3-400 ppm; or 3-300 ppm; or 3-200 ppm; or 3-100 ppm; or 3-50 ppm; or 3-10 ppm; or 10-50,000 ppm; or 10-10,000 ppm; or 10-9,000 ppm; or 10-8,000 ppm; or 10-7,000 ppm; or 10-6,000 ppm; or 10-5,000 ppm; or 10-4,000 ppm; or 10-3,000 ppm; or 10-2,000 ppm; or 10-1,000 ppm; or 10-900 ppm; or 10-800 ppm; or 10-700 ppm; or 10-600 ppm; or 10-500 ppm; or 10-400 ppm; or 10-300 ppm; or 10-200 ppm; or 10-100 ppm; or 10-50 ppm; or 100-50,000 ppm; or 100-10,000 ppm; or 100-9,000 ppm; or 100-8,000 ppm; or 100-7,000 ppm; or 100-6,000 ppm; or 100-5,000 ppm; or 100-4,000 ppm; or 100-3,000 ppm; or 100-2,000 ppm; or 100-1,000 ppm; or 100-900 ppm; or 100-800 ppm; or 100-700 ppm; or 100-600 ppm; or 100-500 ppm; or 100-400 ppm; or 100-300 ppm; or 100-200 ppm; or 200-50,000 ppm; or 200-10,000 ppm; or 200-1,000 ppm; or 200-500 ppm; or 500-50,000 ppm; or 500-10,000 ppm; or 500-1,000 ppm; or 10 ppm; or 100 ppm; or 200 ppm; or 500 ppm; or 1000 ppm; or 5000 ppm; or 8000 ppm; or 10,000 ppm.

In some embodiments, the above recited Sr is present in a crystal lattice of the vaterite. In some embodiments, the above recited Sr is present in a crystal lattice of the aragonite. In some embodiments, the above recited Sr is present in a crystal lattice of the calcite. In some embodiments, the above recited Sr is present in a crystal lattice of the ikaite. In some embodiments, the above recited Sr is present in a crystal lattice of one or more of vaterite, aragonite, calcite, and ikaite. In some embodiments, the Sr is encapsulated in the carbonate mineral.

The water employed in the invention may be fresh water, saltwater, or an alkaline-earth-metal-containing water, depending on the method employing the water. In some embodiments, the water employed in the process includes one or more alkaline earth metals, e.g., magnesium, calcium, etc. The various types of water that may be employed in the invention are described below. In some embodiments, the water contains calcium in amounts ranging from 50 to 20,000 ppm; or 50 to 10,000 ppm; or 50 to 5,000 ppm; or 50 to 1,000 ppm; or 50 to 500 ppm; or 50 to 100 ppm; or 100 to 20,000 ppm; or 100 to 10,000 ppm; or 100 to 5,000 ppm; or 100 to 1,000 ppm; or 100 to 500 ppm; or 500 to 20,000 ppm; or 500 to 10,000 ppm; or 500 to 5,000 ppm; or 500 to 1,000 ppm; or 1,000 to 20,000 ppm; or 1,000 to 10,000 ppm; or 1,000 to 5,000 ppm; or 5,000 to 20,000 ppm; or 5,000 to 10,000 ppm; or 10,000 to 20,000 ppm.

In some embodiments, the water contains magnesium in amounts ranging from 50 to 20,000 ppm; or 50 to 10,000 ppm; or 50 to 5,000 ppm; or 50 to 1,000 ppm; or 50 to 500 ppm; or 50 to 100 ppm; or 100 to 20,000 ppm; or 100 to 10,000 ppm; or 100 to 5,000 ppm; or 100 to 1,000 ppm; or 100 to 500 ppm; or 500 to 20,000 ppm; or 500 to 10,000 ppm; or 500 to 5,000 ppm; or 500 to 1,000 ppm; or 1,000 to 20,000 ppm; or 1,000 to 10,000 ppm; or 1,000 to 5,000 ppm; or 5,000 to 20,000 ppm; or 5,000 to 10,000 ppm; or 10,000 to 20,000 ppm.

The composition has, in certain embodiments, a calcium/magnesium ratio that is influenced by, and therefore reflects, the water source from which it has been precipitated, e.g., seawater, which contains more magnesium than calcium, or, e.g., certain brines, which may contain one-hundred-fold the calcium content as seawater; the calcium/magnesium ratio also reflects factors such as the addition of calcium and/or magnesium-containing substances during the production process, e.g., the use of flyash, red mud, slag, or other calcium and/or magnesium-containing industrial wastes, or the use of calcium and/or magnesium-containing minerals such as mafic and ultramafic minerals, such as serpentine, olivine, and the like. Because of the large variation in raw materials as well as materials added during production, the calcium/magnesium molar ratio may vary widely in various embodiments of the compositions and methods provided herein, and indeed in certain embodiment the ratio may be adjusted according to the intended use of the composition.

In some embodiments of the aspects and embodiments provided herein, the composition further includes magnesium (Mg). In some embodiments, Mg is present as magnesium carbonate. In some embodiments, a ratio of calcium to magnesium (Ca:Mg) or the ratio of vaterite:magnesium carbonate is greater than 1:1; or a ratio of greater than 2:1; or a ratio of greater than 3:1; or a ratio of greater than 4:1; or a ratio of greater than 5:1; or a ratio of greater than 6:1; or a ratio of greater than 7:1; or a ratio of greater than 8:1; or a ratio of greater than 9:1; or a ratio of greater than 10:1; or a ratio of greater than 15:1; or a ratio of greater than 20:1; or a ratio of greater than 30:1; or a ratio of greater than 40:1; or a ratio of greater than 50:1; or a ratio of greater than 60:1; or a ratio of greater than 70:1; or a ratio of greater than 80:1; or a ratio of greater than 90:1; or a ratio of greater than 100:1; or a ratio of greater than 150:1; or a ratio of greater than 200:1; or a ratio of greater than 250:1; or a ratio of greater than 300:1; or a ratio of greater than 350:1; or a ratio of greater than 400:1; or a ratio of greater than 450:1; or a ratio of greater than 500:1; or a ratio of 1:1 to 500:1; or a ratio of 1:1 to 450:1; or a ratio of 1:1 to 400:1; or a ratio of 1:1 to 350:1; or a ratio of 1:1 to 300:1; or a ratio of 1:1 to 250:1; or a ratio of 1:1 to 200:1; or a ratio of 1:1 to 150:1; or a ratio of 1:1 to 100:1; or a ratio of 1:1 to 50:1; or a ratio of 1:1 to 25:1; or a ratio of 1:1 to 10:1; or a ratio of 5:1 to 500:1; or a ratio of 5:1 to 450:1; or a ratio of 5:1 to 400:1; or a ratio of 5:1 to 350:1; or a ratio of 5:1 to 300:1; or a ratio of 5:1 to 250:1; or a ratio of 5:1 to 200:1; or a ratio of 5:1 to 150:1; or a ratio of 5:1 to 100:1; or a ratio of 5:1 to 50:1; or a ratio of 5:1 to 25:1; or a ratio of 5:1 to 10:1; or a ratio of 50:1 to 500:1; or a ratio of 50:1 to 450:1; or a ratio of 50:1 to 400:1; or a ratio of 50:1 to 350:1; or a ratio of 50:1 to 300:1; or a ratio of 50:1 to 250:1; or a ratio of 50:1 to 200:1; or a ratio of 50:1 to 150:1; or a ratio of 50:1 to 100:1; or a ratio of 1:1; or a ratio of 2:1; or a ratio of 3:1; or a ratio of 4:1; or a ratio of 5:1; or a ratio of 6:1; or a ratio of 7:1; or a ratio of 8:1; or a ratio of 9:1; or a ratio of 10:1; or a ratio of 11:1; or a ratio of 15:1;

or a ratio of 20:1; or a ratio of 30:1; or a ratio of 40:1; or a ratio of 50:1; or a ratio of 60:1; or a ratio of 70:1; or a ratio of 80:1; or a ratio of 90:1; or a ratio of 100:1; or a ratio of 150:1; or a ratio of 200:1; or a ratio of 250:1; or a ratio of 300:1; or a ratio of 350:1; or a ratio of 400:1; or a ratio of 450:1; or a ratio of 500:1. In some embodiments, the ratio of calcium to magnesium (Ca:Mg) is between 2:1 to 5:1, or greater than 4:1, or 4:1. In some embodiments, the ratios herein are molar ratios or weight (such as, grams, mg or ppm) ratios.

In some embodiments, a ratio of magnesium to calcium (Mg:Ca) or the ratio of magnesium carbonate:vaterite is between 1:1 to 10:1; or between 2:1 to 10:1; or between 3:1 to 10:1; or between 4:1 to 10:1; or between 5:1 to 10:1; or between 6:1 to 10:1; or between 7:1 to 10:1; or between 8:1 to 10:1; or between 9:1 to 10:1.

In some embodiments, the amount of Mg present in the compositions provided herein is less than 2% w/w; or less than 1.5% w/w; or less than 1% w/w; or less than 0.5% w/w; or less than 0.1% w/w; between 0.1% w/w Mg to 5% w/w Mg; or between 0.1% w/w Mg to 2% w/w Mg; or between 0.1% w/w Mg to 1.5% w/w Mg; or between 0.1% w/w Mg to 1% w/w Mg; or between 0.1% w/w Mg to 0.5% w/w Mg.

Alternatively, in some embodiments, the ratio of calcium to magnesium (Ca:Mg) is 0.1; or 0.2; or 0.3; or 0.4; or 0.5.

In some embodiments, the compositions provided herein further include sodium. In such compositions the sodium is present in an amount less than 100,000 ppm; or less than 80,000 ppm; or less than 50,000 ppm; or less than 20,000 ppm; or less than 15,000 ppm; or less than 10,000 ppm; or less than 5,000 ppm; or less than 1,000 ppm; or less than 500 ppm; or less than 400 ppm; or less than 300 ppm; or less than 200 ppm; or less than 100 ppm; or between 100 ppm to 100,000 ppm; or between 100 ppm to 50,000 ppm; or between 100 ppm to 30,000 ppm; or between 100 ppm to 20,000 ppm; or between 100 ppm to 15,000 ppm; or between 100 ppm to 10,000 ppm; or between 100 ppm to 5,000 ppm; or between 100 ppm to 1,000 ppm; or between 100 ppm to 500 ppm; or between 100 ppm to 400 ppm; or between 100 ppm to 300 ppm; or between 100 ppm to 200 ppm; or between 500 ppm to 100,000 ppm; or between 500 ppm to 50,000 ppm; or between 500 ppm to 30,000 ppm; or between 500 ppm to 20,000 ppm; or between 500 ppm to 15,000 ppm; or between 500 ppm to 10,000 ppm; or between 500 ppm to 5,000 ppm; or between 500 ppm to 1,000 ppm; or between 1000 ppm to 100,000 ppm; or between 1000 ppm to 50,000 ppm; or between 1000 ppm to 30,000 ppm; or between 1000 ppm to 20,000 ppm; or between 1000 ppm to 15,000 ppm; or between 1000 ppm to 10,000 ppm; or between 1000 ppm to 5,000 ppm; or between 5000 ppm to 100,000 ppm; or between 5000 ppm to 50,000 ppm; or between 10,000 ppm to 100,000 ppm; or between 10,000 ppm to 50,000 ppm; or between 50,000 ppm to 100,000 ppm; or 20,000 ppm; or 15,000 ppm; or 10,000 ppm; or 5,000 ppm; or 1,000 ppm; or 500 ppm; or 400 ppm; or 300 ppm; or 200 ppm; or 100 ppm.

In some embodiments, the compositions provided herein do not include calcium phosphate. In some embodiments, the compositions include calcium phosphate. In such compositions, the calcium phosphate is in an amount of less than 20,000 ppm; or less than 15,000 ppm; or less than 10,000 ppm; or less than 5,000 ppm; or less than 1,000 ppm; or less than 500 ppm; or less than 400 ppm; or less than 300 ppm; or less than 200 ppm; or less than 100 ppm; or between 100 ppm to 20,000 ppm; or between 100 ppm to 15,000 ppm; or between 100 ppm to 10,000 ppm; or between 100 ppm to 5,000 ppm; or between 100 ppm to 1,000 ppm; or between 100 ppm to 500 ppm; or between 100 ppm to 400 ppm; or between 100 ppm to 300 ppm; or between 100 ppm to 200 ppm; or 20,000 ppm; or 15,000 ppm; or 10,000 ppm; or 5,000 ppm; or 1,000 ppm; or 500 ppm; or 400 ppm; or 300 ppm; or 200 ppm; or 100 ppm.

In some embodiments, the composition provided herein is a particulate composition with an average particle size of 0.1-100 microns. The average particle size may be determined using any conventional particle size determination method, such as, but is not limited to, multi-detector laser scattering or sieving (i.e. <38 microns). In certain embodiments, unimodel or multimodal, e.g., bimodal or other, distributions are present. Bimodal distributions allow the surface area to be minimized, thus allowing a lower liquids/solids mass ratio for the cement yet providing smaller reactive particles for early reaction. In such instances, the average particle size of the larger size class can be upwards of 1000 microns (1 mm). In some embodiments, the composition provided herein is a particulate composition with an average particle size of 0.1-1000 microns; or 0.1-900 microns; or 0.1-800 microns; or 0.1-700 microns; or 0.1-600 microns; or 0.1-500 microns; or 0.1-400 microns; or 0.1-300 microns; or 0.1-200 microns; or 0.1-100 microns; or 0.1-90 microns; or 0.1-80 microns; or 0.1-70 microns; or 0.1-60 microns; or 0.1-50 microns; or 0.1-40 microns; or 0.1-30 microns; or 0.1-20 microns; or 0.1-10 microns; or 0.1-5 microns; or 0.5-100 microns; or 0.5-90 microns; or 0.5-80 microns; or 0.5-70 microns; or 0.5-60 microns; or 0.5-50 microns; or 0.5-40 microns; or 0.5-30 microns; or 0.5-20 microns; or 0.5-10 microns; or 0.5-5 microns; or 1-100 microns; or 1-90 microns; or 1-80 microns; or 1-70 microns; or 1-60 microns; or 1-50 microns; or 1-40 microns; or 1-30 microns; or 1-20 microns; or 1-10 microns; or 1-5 microns; or 3-100 microns; or 3-90 microns; or 3-80 microns; or 3-70 microns; or 3-60 microns; or 3-50 microns; or 3-40 microns; or 3-30 microns; or 3-20 microns; or 3-10 microns; or 3-8 microns; or 5-100 microns; or 5-90 microns; or 5-80 microns; or 5-70 microns; or 5-60 microns; or 5-50 microns; or 5-40 microns; or 5-30 microns; or 5-20 microns; or 5-10 microns; or 5-8 microns; or 8-100 microns; or 8-90 microns; or 8-80 microns; or 8-70 microns; or 8-60 microns; or 8-50 microns; or 8-40 microns; or 8-30 microns; or 8-20 microns; or 8-10 microns; or 10-100 microns; or 10-90 microns; or 10-80 microns; or 10-70 microns; or 10-60 microns; or 10-50 microns; or 10-40 microns; or 10-30 microns; or 10-20 microns; or 10-15 microns; or 15-100 microns; or 15-90 microns; or 15-80 microns; or 15-70 microns; or 15-60 microns; or 15-50 microns; or 15-40 microns; or 15-30 microns; or 15-20 microns; or 20-100 microns; or 20-90 microns; or 20-80 microns; or 20-70 microns; or 20-60 microns; or 20-50 microns; or 20-40 microns; or 20-30 microns; or 30-100 microns; or 30-90 microns; or 30-80 microns; or 30-70 microns; or 30-60 microns; or 30-50 microns; or 30-40 microns; or 40-100 microns; or 40-90 microns; or 40-80 microns; or 40-70 microns; or 40-60 microns; or 40-50 microns; or 50-100 microns; or 50-90 microns; or 50-80 microns; or 50-70 microns; or 50-60 microns; or 60-100 microns; or 60-90 microns; or 60-80 microns; or 60-70 microns; or 70-100 microns; or 70-90 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition provided herein is a particulate composition with an average particle size of 0.1-20 micron; or 0.1-15 micron; or 0.1-10 micron; or 0.1-8 micron; or 0.1-5 micron; or 1-5 micron; or 5-10 micron.

In some embodiments, the composition includes one or more different sizes of the particles in the composition. In some embodiments, the composition includes two or more, or three or more, or four or more, or five or more, or ten or more, or 20 or more, or 3-20, or 4-10 different sizes of the particles in the composition. For example, the composition may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles.

In some embodiments, the composition provided herein may include different morphologies of the particles, such as, but not limited to, fine or disperse and large or agglomerated.

The bulk density of the composition in the powder form or after the setting and/or hardening of the cement may vary. In some embodiments, the composition provided herein has a bulk density of between 75 lb/ft$^3$-170 lb/ft$^3$; or between 75 lb/ft$^3$-160 lb/ft$^3$; or between 75 lb/ft$^3$-150 lb/ft$^3$; or between 75 lb/ft$^3$-140 lb/ft$^3$; or between 75 lb/ft$^3$-130 lb/ft$^3$; or between 75 lb/ft$^3$-125 lb/ft$^3$; or between 75 lb/ft$^3$-120 lb/ft$^3$; or between 75 lb/ft$^3$-110 lb/ft$^3$; or between 75 lb/ft$^3$-100 lb/ft$^3$; or between 75 lb/ft$^3$-90 lb/ft$^3$; or between 75 lb/ft$^3$-80 lb/ft$^3$; or between 80 lb/ft$^3$-170 lb/ft$^3$; or between 80 lb/ft$^3$-160 lb/ft$^3$; or between 80 lb/ft$^3$-150 lb/ft$^3$; or between 80 lb/ft$^3$-140 lb/ft$^3$; or between 80 lb/ft$^3$-130 lb/ft$^3$; or between 80 lb/ft$^3$-125 lb/ft$^3$; or between 80 lb/ft$^3$-120 lb/ft$^3$; or between 80 lb/ft$^3$-110 lb/ft$^3$; or between 80 lb/ft$^3$-100 lb/ft$^3$; or between 80 lb/ft$^3$-90 lb/ft$^3$; or between 90 lb/ft$^3$-170 lb/ft$^3$; or between 90 lb/ft$^3$-160 lb/ft$^3$; or between 90 lb/ft$^3$-150 lb/ft$^3$; or between 90 lb/ft$^3$-140 lb/ft$^3$; or between 90 lb/ft$^3$-130 lb/ft$^3$; or between 90 lb/ft$^3$-125 lb/ft$^3$; or between 90 lb/ft$^3$-120 lb/ft$^3$; or between 90 lb/ft$^3$-110 lb/ft$^3$; or between 90 lb/ft$^3$-100 lb/ft$^3$; or between 90 lb/ft$^3$-90 lb/ft$^3$; or between 100 lb/ft$^3$-170 lb/ft$^3$; or between 100 lb/ft$^3$-160 lb/ft$^3$; or between 100 lb/ft$^3$-150 lb/ft$^3$; or between 100 lb/ft$^3$-140 lb/ft$^3$; or between 100 lb/ft$^3$-130 lb/ft$^3$; or between 100 lb/ft$^3$-125 lb/ft$^3$; or between 100 lb/ft$^3$-120 lb/ft$^3$; or between 100 lb/ft$^3$-110 lb/ft$^3$; or between 110 lb/ft$^3$-170 lb/ft$^3$; or between 110 lb/ft$^3$-160 lb/ft$^3$; or between 110 lb/ft$^3$-150 lb/ft$^3$; or between 110 lb/ft$^3$-140 lb/ft$^3$; or between 110 lb/ft$^3$-130 lb/ft$^3$; or between 110 lb/ft$^3$-125 lb/ft$^3$; or between 110 lb/ft$^3$-120 lb/ft$^3$; or between 120 lb/ft$^3$-170 lb/ft$^3$; or between 120 lb/ft$^3$-160 lb/ft$^3$; or between 120 lb/ft$^3$-150 lb/ft$^3$; or between 120 lb/ft$^3$-140 lb/ft$^3$; or between 120 lb/ft$^3$-130 lb/ft$^3$; or between 120 lb/ft$^3$-125 lb/ft$^3$; or between 130 lb/ft$^3$-170 lb/ft$^3$; or between 130 lb/ft$^3$-160 lb/ft$^3$; or between 130 lb/ft$^3$-150 lb/ft$^3$; or between 130 lb/ft$^3$-140 lb/ft$^3$; or between 140 lb/ft$^3$-170 lb/ft$^3$; or between 140 lb/ft$^3$-160 lb/ft$^3$; or between 140 lb/ft$^3$-150 lb/ft$^3$; or between 150 lb/ft$^3$-170 lb/ft$^3$; or between 150 lb/ft$^3$-160 lb/ft$^3$; or between 160 lb/ft$^3$-170 lb/ft$^3$; or 75 lb/ft$^3$; or 80 lb/ft$^3$; or 85 lb/ft$^3$; or 90 lb/ft$^3$; or 95 lb/ft$^3$; or 100 lb/ft$^3$; or 110 lb/ft$^3$; or 120 lb/ft$^3$; or 130 lb/ft$^3$; or 140 lb/ft$^3$; or 150 lb/ft$^3$; or 160 lb/ft$^3$; or 170 lb/ft$^3$.

The surface area of the components making up the cement may vary. In some embodiments, the compositions provided herein have an average surface area sufficient to provide for a liquid to solids ratio (as described herein) upon combination with a liquid to produce a settable composition. In some embodiments, an average surface area ranges from 0.5 m$^2$/gm-50 m$^2$/gm. The surface area may be determined using the surface area determination protocol described in Breunner, Emmit and Teller (BET) surface area analysis. In some embodiments, the composition provided herein has an average surface area of from 0.5 m$^2$/gm-50 m$^2$/gm; or from 0.5 m$^2$/gm-45 m$^2$/gm; or from 0.5 m$^2$/gm-40 m$^2$/gm; or from 0.5 m$^2$/gm-35 m$^2$/gm; or from 0.5 m$^2$/gm-30 m$^2$/gm; or from 0.5 m$^2$/gm-25 m$^2$/gm; or from 0.5 m$^2$/gm-20 m$^2$/gm; or from 0.5 m$^2$/gm-15 m$^2$/gm; or from 0.5 m$^2$/gm-10 m$^2$/gm; or from 0.5 m$^2$/gm-5 m$^2$/gm; or from 0.5 m$^2$/gm-4 m$^2$/gm; or from 0.5 m$^2$/gm-2 m$^2$/gm; or from 0.5 m$^2$/gm-1 m$^2$/gm; or from 1 m$^2$/gm-50 m$^2$/gm; or from 1 m$^2$/gm-45 m$^2$/gm; or from 1 m$^2$/gm-40 m$^2$/gm; or from 1 m$^2$/gm-35 m$^2$/gm; or from 1 m$^2$/gm-30 m$^2$/gm; or from 1 m$^2$/gm-25 m$^2$/gm; or from 1 m$^2$/gm-20 m$^2$/gm; or from 1 m$^2$/gm-15 m$^2$/gm; or from 1 m$^2$/gm-10 m$^2$/gm; or from 1 m$^2$/gm-5 m$^2$/gm; or from 1 m$^2$/gm-4 m$^2$/gm; or from 1 m$^2$/gm-2 m$^2$/gm; or from 2 m$^2$/gm-50 m$^2$/gm; or from 5 m$^2$/gm-50 m$^2$/gm; or from 8 m$^2$/gm-50 m$^2$/gm; or from 10 m$^2$/gm-50 m$^2$/gm; or from 15 m$^2$/gm-50 m$^2$/gm; or from 20 m$^2$/gm-50 m$^2$/gm; or from 30 m$^2$/gm-50 m$^2$/gm; or from 40 m$^2$/gm-50 m$^2$/gm; or 0.5 m$^2$/gm; or 1 m$^2$/gm; or 2 m$^2$/gm; or 5 m$^2$/gm; or 10 m$^2$/gm; or 15 m$^2$/gm; or 20 m$^2$/gm; or 30 m$^2$/gm; or 40 m$^2$/gm; or 50 m$^2$/gm. In some embodiments, the composition provided herein includes a mix of particles, such as, but not limited to, two or more, three or more, or four or more, or 5-10, or 10-20, or 1-20, or 1-50 particles with different surface area.

In some embodiments, in the aspects and embodiments provided herein, the composition has a zeta potential of greater than −25 millivolts (mV). Zeta potential is the potential difference between the dispersion medium and the stationary layer of fluid attached to the dispersed particle. The zeta potential indicates a degree of repulsion between adjacent similar particles in the dispersion. When the zeta potential is high, the particles may repel and resist aggregation resulting in high dispersion of the particles in the medium. When the zeta potential is low, the attraction may exceed repulsion causing the dispersion to break and particles to flocculate. Without being bound by any theory, it is proposed that the high dispersion of the particles in the compositions may facilitate the SCM properties of the composition where the SCM composition may not flocculate readily and may be added to Portland cement as SCM. The low dispersion of the particles in the composition may cause setting and hardening of the composition making the cement suitable as the hydraulic cement. The low dispersion of the particles in the composition may also cause setting and hardening of the composition making the cement suitable as the self-cementing material. The stabilizers may affect the surface charge and/or zeta potential of the carbonate particles. The experimental techniques to determine the zeta potential are well known in the art and include, but are not limited to, electrophoresis such as microelectrophoresis and electrophoretic light scattering.

In some embodiments, the aspects and embodiments provided herein, the composition includes a zeta potential of greater than −20 mV; or greater than −15 mV; or greater than −10 mV; or greater than −5 mV; or greater than −1 mV; or greater than 1 mV; or greater than 2 mV; or greater than 3 mV; or greater than 5 mV; or greater than 10 mV; or greater than 15 mV; or greater than 20 mV; or greater than 25 mV; or greater than 30 mV; or greater than 35 mV; or greater than 40 mV; or greater than 45 mV; or greater than 50 mV; or less than 45 mV; or less than 40 mV; or less than 35 mV; or less than 30 mV; or less than 25 mV; or less than 20 mV; or less than 15 mV; or less than 10 mV; or less than 5 mV; or less than 1 mV; or less than −1 mV; or less than −5 mV; or less than −10 mV; or less than −20 mV; or less than −25 mV; or between +50 mV to −25 mV; or between +1 mV to −25 mV; or between −1 mV to −25 mV; or between −10 mV to −5 mV; or between −15 mV to −5 mV; or between −20 mV to −5 mV; or between −25 mV to −5 mV; or between +25 mV to −1 mV; or between +20 mV to −1 mV; or between +15 mV to −1 mV; or between +10 mV to −1 mV; or between +5 mV to −1 mV; or between +1 mV to −1 mV; or between −5 mV to −1 mV; or between −10 mV to −1 mV; or between −15 mV to −1 mV; or between −20 mV to −1 mV; or between −25 mV to −1 mV; or between 25 mV to 5 mV; or between 20 mV to 5 mV; or between 15 mV to 5 mV; or between 10 mV to 5 mV; or between 1 mV to 5 mV; or between −1 mV to +5 mV; or between −5 mV to +5 mV; or between 5 mV to 20 mV; or between 1 mV to 20 mV; or between −1 mV to +20 mV; or between −5 mV to +20 mV; or between −10 mV to +20 mV; or between −15 mV to +20 mV; or between −20 mV to +20 mV; or between −25 mV to +20 mV; or between 20 mV to 25 mV; or between 15 mV to 25 mV; or between 10 mV to 25 mV; or between 5 mV to 25 mV; or between 1 mV to 25 mV; or between −1 mV to +25 mV; or between −5 mV to +25 mV; or between −10 mV to +25 mV; or between −15 mV to +25 mV; or between −20 mV to +25 mV. For example, in the aspects and embodiments provided herein, the composition includes a zeta potential of between 10 mV to 45 mV; or between 15 mV to 45 mV; or between 20 mV to 45 mV; or between 25 mV to 45 mV; or between 30 mV to 45 mV; or between 35 mV to 45 mV; or between 40 mV to 45 mV. In some embodiments, the composition provided herein includes a mix of particles with different zeta potential. For example, two or more, or three or more particles, or 3-20 particles in the composition may have different zeta potentials.

In some embodiments, a ratio of calcium to carbonate in the composition may affect the zeta potential of the composition. In some embodiments, a ratio of stabilizer with the metastable carbonate may affect the zeta potential of the composition. Without being limited by any theory, it is proposed that the higher ratio of calcium with the carbonate may result in a higher zeta potential or a positive zeta potential, and the lower ratio of the calcium with the carbonate may result in a lower zeta potential or a negative zeta potential. In some embodiments, the ratio of calcium or calcium ion with the carbonate or the carbonate ion in the composition (calcium:carbonate) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is in a range of 1.2:1 to 1.8:1; or is 1:1; or is 1.5:1; or is 2:1; or is 2.5:1; or is 3:1; or is 3.5:1; or is 4:1; or is 4.5:1; or is 5:1. In some embodiments, the ratio of calcium:carbonate in the composition is 1.5:1, or 1:1, or 2:1.

In some embodiments, the ratio of carbonate or the carbonate ion with the calcium or calcium ion in the composition (carbonate:calcium) is greater than 1:1; or greater than 1.5:1; or greater than 2:1; or greater than 2.5:1; or greater than 3:1; or greater than 3.5:1; or greater than 4:1; or greater than 4.5:1; or greater than 5:1; or is in a range of 1:1 to 5:1; or is in a range of 1.5:1 to 5:1; or is in a range of 2:1 to 5:1; or is in a range of 3:1 to 5:1; or is in a range of 4:1 to 5:1; or is in a range of 1:1 to 4:1; or is in a range of 1.5:1 to 4:1; or is in a range of 2:1 to 4:1; or is in a range of 3:1 to 4:1; or is in a range of 1:1 to 3:1; or is in a range of 1.5:1 to 3:1; or is in a range of 2:1 to 3:1; or is in a range of 1:1 to 2:1; or is in a range of 1.5:1 to 2:1; or is in a range of 1.5:1 to 1:1; or is 1:1; or is 1.5:1; or is 2:1; or is 2.5:1; or is 3:1; or is 3.5:1; or is 4:1; or is 4.5:1; or is 5:1. In some embodiments, the ratio of carbonate to calcium (carbonate:calcium) in the composition is 1.5:1, or 1:1, or 2:1.

In some embodiments, the composition of the invention includes a ratio of the carbonate to the hydroxide (carbonate:hydroxide) in a range of 100:1; or 10:1 or 1:1.

In some embodiments, the compositions contain polymorphs of carbonates in combination with bicarbonates, e.g., of divalent cations such as calcium or magnesium; in some cases the composition contains substantially all polymorphs of carbonates, or substantially all bicarbonates, or some ratio of polymorphs of carbonate to bicarbonate. The molar ratio of carbonates to bicarbonates may be any suitable ratio, such as carbonate:bicarbonate ratio of 500/1 to 100/1; 100/1 to 1/100, or 50/1 to 1/50, or 25/1 to 1/25, or 10/1 to 1/10, or 2/1 to 1/2, or about 1/1, or substantially all carbonate or substantially all bicarbonate.

In some embodiments, when the compositions provided herein are derived from a saltwater source, they may include one or more components that are present in the saltwater source which may help in identifying the compositions that come from the saltwater source. These identifying components and the amounts thereof are collectively referred to herein as a saltwater source identifier or "markers". For example, if the saltwater source is sea water, identifying component that may be present in the composition include, but are not limited to: chloride, sodium, sulfur, potassium, bromide, silicon, strontium and the like. Any such source-identifying or marker elements are generally present in small amounts, e.g., in amounts of 20,000 ppm or less, such as amounts of 2000 ppm or less. In certain embodiments, the marker compounds are strontium or magnesium. The saltwater source identifier of the compositions may vary depending on the particular saltwater source employed to produce the saltwater-derived composition. In some embodiments, the composition is characterized by having a water source identifying carbonate to hydroxide compound ratio, where in certain embodiments the carbonate:hydroxide ratio ranges from 100 to 1, such as 10 to 1 and including 1 to 1.

In some embodiments, the compositions provided herein further include nitrogen oxide, sulfur oxide, mercury, metal, derivative of any of nitrogen oxide, sulfur oxide, mercury, and/or metal, or combination thereof. The derivatives of nitrogen oxide and sulfur oxide include, but not limited to, nitrates, nitrites, sulfates, and sulfites, etc. The mercury and/or the metal may be present in their derivatized form, such as, oxides and/or hydroxides, or the mercury and/or the metal may be encapsulated or present in the composition of the invention in un-derivatized form. In some embodiments, the compositions provided herein further includes one or more additional components including, but are not limited to, blast furnace slag, fly ash, diatomaceous earth, and other natural or artificial pozzolans, silica fumes, limestone, gypsum, hydrated lime, air entrainers, retarders, waterproofers and coloring agents. These components may be added to modify the properties of the cement, e.g., to provide desired strength attainment, to provide desired setting times, etc. The amount of such components present in a given composition of the invention may vary, and in certain embodiments the amounts of these components range from 1 to 50% w/w, or 10% w/w to 50% w/w, such as 2 to 10% w/w.

In some embodiments, silica minerals may co-occur with the vaterite compositions of the invention. These compounds may be amorphous in nature or crystalline. In certain embodiments, the silica may be in the form of opal-A, amorphous silica, typically found in chert rocks. Calcium magnesium carbonate silicate amorphous compounds may form, within crystalline regions of the polymorphs listed above. Non-carbonate, silicate minerals may also form. Sepiolite is a clay mineral, a complex magnesium silicate, a typical formula for which is $Mg_4Si_6O_{15}(OH)_2 \cdot 6H_2O$. It can be present in fibrous, fine-particulate, and solid forms. Silcate carbonate minerals may also form. Carletonite, $KNa_4Ca_4(CO_3)_4Si_8O_{18}$ (F, OH).H$_2$O, Hydrated potassium sodium calcium carbonate silicate, can form under these conditions. Like any member of the phyllosilicates subclass, carletonite's structure is layered with alternating silicate sheets and the potassium, sodium and calcium layers. Unlike other phyllosilicates, carletonite's silicate sheets are composed of interconnected four and eight-member rings. The sheets can be thought of as being like chicken wire with alternating octagon and square shaped holes. Both octagons and squares have a four fold symmetry and this is what gives carletonite its tetragonal symmetry; 4/m 2/m 2/m. Only carletonite and other members of the apophyllite group have this unique interconnected four and eight-member ring structure.

In some embodiments, the compositions provided herein further include geopolymers. As used herein, "geopolymers" are conventionally known in the art and include chains or networks of mineral molecules that include alumina silica chains, such as, —Si—O—Si—O— siloxo, poly(siloxo); —Si—O—Al—O— sialate, poly(sialate); —Si—O—Al—O—Si—O— sialate-siloxo, poly(sialate-siloxo); —Si—O—Al—O—Si—O—Si—O— sialate-disiloxo, poly(sialate-disiloxo); —P—O—P—O— phosphate, poly(phosphate); —P—O—Si—O—P—O— phospho-siloxo, poly(phospho-siloxo); —P—O—Si—O—Al—O—P—O-phospho-sialate, poly(phospho-sialate); and —(R)—Si—O—Si—O—(R) organo-siloxo, poly-silicone. Geopolymers include, but are not limited to, water-glass based geopolymer, kaolinite/hydrosodalite-based geopolymer, metakaolin MK-750-based geopolymer, calcium based geopolymer, rock-based geopolymer, silica-based geopolymer, fly-ash based geopolymer, phosphate based geopolymer, and organic mineral geopolymer. In some embodiments, the amount of geopolymer added to the composition of the invention is 1-50% by wt or 1-25% by wt or 1-10% by wt. The geopolymer can be blended into the composition of the invention which can then be used as a hydraulic cement or SCM. The addition of geopolymer to the composition of the invention may decrease the setting time and/or increase the compressive strength of cement when the composition in combination with water sets and hardens into the cement.

In some embodiments, the compositions provided herein further include Portland cement clinker, aggregate, or combination thereof. In some embodiments, the SCM compositions provided herein further include Portland cement clinker, aggregate, other supplementary cementitious material (SCM) (such as conventional SCM), or combination thereof. In some embodiments, the other SCM is slag, fly ash, silica fume, or calcined clay.

Typically, Portland cements are powder compositions produced by grinding Portland cement clinker (more than 90%), a limited amount of calcium sulfate which controls the set time, and up to 5% minor constituents (as allowed by various standards). As defined by the European Standard EN197.1, "Portland cement clinker is a hydraulic material which shall consist of at least two-thirds by mass of calcium silicates (3CaO.SiO$_2$ and 2CaO.SiO$_2$), the remainder consisting of aluminium- and iron-containing clinker phases and other compounds. The ratio of CaO:SiO$_2$ shall not be less than 2.0. The magnesium content (MgO) shall not exceed 5.0% by mass." In certain embodiments, the Portland cement constituent, as provided herein, is any Portland cement that satisfies the ASTM Standards and Specifications of C150 (Types I-VIII) of the American Society for Testing of Materials (ASTM C50-Standard Specification for Portland Cement). ASTM C150 covers eight types of Portland cement, each possessing different properties, and used specifically for those properties.

In some embodiments, the composition provided herein may further include Ordinary Portland Cement (OPC) or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition may include a blend of 75% OPC and 25% composition; or 80% OPC and 20% composition; or 85% OPC and 15% composition; or 90% OPC and 10% composition; or 95% OPC and 5% composition. In some embodiments, such composition of the invention is an SCM.

In certain embodiments, the composition may further include an aggregate. Aggregate may be included in the composition to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof. As such, the term "aggregate" is used broadly to refer to a number of different types of both coarse and fine particulate material, including, but are not limited to, sand, gravel, crushed stone, slag, and recycled concrete. The amount and nature of the aggregate may vary widely. In some embodiments, the amount of aggregate may range from 25 to 80%, such as 40 to 70% and including 50 to 70% w/w of the total composition made up of both the composition and the aggregate.

In some embodiments, the compositions further include a pH regulating agent which may influence the pH of the fluid component of the settable composition produced from the composition or composition mixed with aggregates (to form concrete), upon combination of the composition with water. Such pH regulating agents may provide for an alkaline environment upon combination with water, e.g., where the pH of the hydrated cement is 12 or higher, such as 13 or higher, and including 13.5 or higher. In certain embodiments, the pH regulating (i.e., modulating) agent is an oxide or hydroxide, e.g., calcium oxide, calcium hydroxide, magnesium oxide or magnesium hydroxide. When present, such agents may be present in amounts ranging from 1 to 10% w/w, such as 2 to 5% w/w.

In some embodiments, there is provided a settable composition prepared from the compositions provided herein. Such settable compositions include, but not limited to, cement, concrete, and mortar. Settable compositions may be produced by combining the composition with water or by combining the composition with an aggregate and water. The aggregate can be a fine aggregate to prepare mortar, such as sand, or a combination of fine and coarse aggregate or coarse aggregate alone for concrete. The composition, the aggregate, and the water may all be mixed at the same time or the composition may be pre-combined with the aggregate and the pre-combined mixture is then mixed with water. The coarse aggregate material for concrete mixes using the compositions may have a minimum size of about ⅜ inch and can vary in size from that minimum to up to one inch or larger, including gradations between these limits. Crushed limestone and other rocks, gravel, and the like are some examples of the coarse aggregates. Finely divided aggregate is smaller than ⅜ inch in size and may be graduated in much finer sizes down to 200-sieve size or so. Ground limestone and other rocks, sand, and the like are some examples of the fine aggregates. Fine aggregates may be present in both mortars and concretes of the invention. The weight ratio of the composition to the aggregate may vary, and in certain embodiments ranges from 1:10 to 4:10, such as 2:10 to 5:10 and including from 55:1000 to 70:100.

The aqueous medium, such as, water, with which the dry components are combined to produce the settable composition, may vary from pure water to water that includes one or more solutes, additives, co-solvents, etc., as desired. The ratio of the aqueous medium:dry components or aqueous medium:composition of the invention is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 0.1; or 0.5; or 1; or 2. In some embodiments, the ratio is a weight ratio.

In certain embodiments, the compositions of the invention further include one or more admixtures. Admixtures may be added to concrete to provide it with desirable characteristics or to modify properties of the concrete to make it more readily useable or more suitable for a particular purpose or for cost reduction. As is known in the art, an admixture is any material or composition, other than the composition provided herein, aggregate and water; that is used as a component of the concrete or mortar to enhance some characteristic or lower the cost, thereof. The amount of admixture that is employed may vary depending on the nature of the admixture. In certain embodiments the amounts of these components range from 1 to 50% w/w, such as 2 to 10% w/w. Examples of admixtures are described in U.S. Pat. No. 7,922,809, which is incorporated herein by reference in its entirety.

In one aspect, there is provided a structure or a building material comprising the composition provided herein or the set and hardened form thereof. In some embodiments, the building material is formed from the compositions provided herein. Examples of such structures or the building materials include, but are not limited to, building, driveway, foundation, architectural cement, kitchen slab, furniture, pavement, road, bridges, motorway, overpass, parking structure, brick, block, wall, footing for a gate, fence, or pole, and combination thereof. Since these structures or building materials comprise and/or are produced from the compositions provided herein, they may include markers or components that identify them as being obtained from carbon dioxide of fossil fuel origin and/or being obtained from water having trace amounts of various elements present in the initial salt water source, and/or being obtained from a process employing stabilizers, as described herein. For example, where the mineral component of the cement component of the concrete is one that has been produced from sea water, the set product may contain a seawater marker profile of different elements in identifying amounts, such as magnesium, potassium, sulfur, boron, sodium, and chloride, etc.

In one aspect, there is provided a formed building material or pre-formed building material comprising the composition provided herein or the set and hardened form thereof. In some embodiments, the formed building material is formed from the compositions provided herein. The formed building material may be a pre-cast building material, such as, a pre-cast concrete product. The formed building materials and the methods of making and using the formed building materials are described in U.S. Pat. No. 7,771,684, which is incorporated herein by reference in its entirety. The formed building materials of the invention may vary greatly and include materials shaped (e.g., molded, cast, cut, or otherwise produced) into man-made structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the composition provided herein is employed in making such materials. In some embodiments, the formed building materials made from the composition provided herein have a compressive strength of at least 14 MPa; or between about 14-100 MPa; or between about 14-45 MPa; or the compressive strength of the composition after setting, and hardening, as described herein. In some embodiments, the formed building materials made from the composition have a $\delta^{13}C$ of less than −12‰; or less than −13‰; or less than −14‰; or less than −15‰; or from −15‰ to −80‰; or the $\delta^{13}C$ of the composition, as described herein.

Some examples of the formed building materials include, but not limited to, masonry units, brick, blocks, (e.g., concrete, cement, foundation, etc.), tile, construction panels, cement board, fiber-cement siding, drywall, conduit, basins, beam, column, concrete slab, acoustic barrier, and insulation material. In some embodiments, the formed building material such as pre-cast concrete products include, but are not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utility protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

In some embodiments, there is provided synthetic rock or an aggregate comprising the composition or the set and hardened form thereof. In some embodiments, the aggregate is made from the compositions provided herein. The aggregates and the methods of making and using the aggregates are described in U.S. Pat. No. 7,753,618, which is incorporated herein by reference in its entirety. The aggregate may be formed from hydraulic cement or SCM or self-cementing composition provided herein. In some embodiments, aggregates are formed, in whole or in part, from compositions that have been exposed to freshwater and allowed to harden into stable compounds, which may then be further processed, if necessary, to form particles as appropriate to the type of aggregate desired. In some embodiments, aggregates are formed from compositions provided herein, that are exposed to conditions of temperature and/or pressure that convert them into stable compounds. Further provided herein are structures, such as roadways, buildings, dams, and other man-made structures, containing the synthetic rock or aggregates made from the compositions provided herein.

In some embodiments, some or all the embodiments recited herein for the composition also apply to the aggregates made from the compositions provided herein.

Other products formed from the composition of the invention include, but are not limited to, non-cementitious compositions including paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such compositions have been described in U.S. Pat. No. 7,829,053, issued Nov. 9, 2010, which is incorporated herein by reference in its entirety.

II. Methods and Systems

Aspects of the invention include methods and systems for making the composition provided herein. The method to produce the compositions provided herein includes a source of carbon, a source of water, a source of alkalinity, a source of stabilizer, and a source for alkaline earth metal ions, depending upon the materials used for the process. In one aspect of the invention, there is provided a method for making the composition provided herein, by (a) contacting $CO_2$ from a $CO_2$ source with a proton removing agent to form a solution; and (b) contacting the solution with an alkaline earth-metal and stabilizer containing water under one or more conditions to make the composition provided herein. In another aspect of the invention, there is provided a method for making a composition by (a) contacting $CO_2$ from a $CO_2$ source with a proton removing agent to form a solution; and (b) contacting the solution with an alkaline earth-metal containing water under one or more conditions to make the composition, wherein the composition includes a metastable carbonate and a stabilizer. In some embodiments, the above described method further includes contacting the stabilizer with the solution before step (b). In some embodiments, the above described method further includes contacting the stabilizer with the alkaline earth-metal containing water before step (b). In some embodiments, the above described method further includes contacting the stabilizer with the solution simultaneously at step (b). In some embodiments, the above described method further includes contacting the stabilizer with the solution after step (b). In some embodiments, the above described method further includes contacting the stabilizer with the solution after step (b) but before dewatering.

In some embodiments, there are provided methods to optimize the stability of vaterite in a composition comprising vaterite and stabilizer, by optimizing the concentration of the stabilizer in the composition. In some embodiments, the stabilizer is as described herein. For example, in some embodiments, the stabilizer is sulfate ion such as, but not limited to, sulfate in sea water, alkali metal sulfate such as, sodium sulfate, alkaline earth metal sulfate, lignosulfate, or combination thereof. In some embodiments, there are provided methods to optimize the stability of vaterite in a composition comprising vaterite and stabilizer, by optimizing the concentration of the stabilizer in the composition between 0.1 wt % to 5 wt %. Applicants have unexpectedly and surprisingly found that by optimizing the concentration of the stabilizer during the precipitation process, the concentration of the stabilizer in the vaterite containing precipitate or the composition may be optimized. The optimized concentration of the stabilizer in the precipitate or the composition can then result in optimized stability of the vaterite in the precipitate or the composition.

For example, the precipitate or the composition comprising less than 1.5 wt % stabilizer may produce a reactive vaterite that readily transforms to aragonite when it is combined with water. Such composition may be suitable for formed or preformed building material where it is desired for the composition to readily transform to aragonite in the mold and form the building material (e.g. brick etc.). In some embodiments, the precipitate or the composition comprising between 0.5-2 wt % stabilizer may stabilize the vaterite for some period of time when the vaterite may transform to aragonite or calcite. Such composition may be suitable for cementing purposes where the composition needs to be stable for extended periods but needs to convert to aragonite when combined with water. In some embodiments, the precipitate or the composition comprising more than 1 wt % stabilizer may stabilize the vaterite for extended periods of time when the vaterite may not transform to aragonite or calcite. Such composition may be suitable for SCM purposes where the composition needs to be stable for extended periods of time and need not convert to aragonite when combined with water (may be acting as a filler).

In another aspect of the invention, there is provided a method for making the composition provided herein, by (a) contacting $CO_2$ from a $CO_2$ source with a proton removing agent to form a solution; (b) contacting the solution with an alkaline earth-metal and stabilizer containing water under one or more conditions to make the composition comprising vaterite; and (c) activating vaterite containing composition. The vaterite may be activated by methods described herein, e.g., mechanical activation, such as ball-milling or by chemical or nuclei activation, such as, by adding aragonite seed, inorganic additive or organic additive. The activation of the vaterite facilitates the control of aragonite formation upon addition of water to the composition.

Accordingly, in one aspect of the invention, there is provided a method for making the composition provided herein, by (a) contacting $CO_2$ with a proton removing agent to form a solution; (b) contacting the solution with an alkaline earth-metal and stabilizer containing water under one or more conditions to make a composition comprising vaterite; (c) activating vaterite containing composition; and (d) controlling aragonite formation from the activated vaterite upon addition of water to the composition.

In some embodiments, the vaterite containing composition is activated by nuclei activation, mechanical activation, chemical activation, or combination thereof.

The mechanical activation of the vaterite containing composition includes modifying the surface of the vaterite by creating surface defects on vaterite. Such surface defects may be created by methods such as ball-milling. The ball-milling process may grind the vaterite containing composition in such a way that finer powder of the vaterite is formed. It is contemplated that the energy induced in vaterite by grinding may be harnessed to form aragonite upon reaction of vaterite with water.

The nuclei activation of the vaterite containing composition may be induced by adding an aragonite seed in the vaterite containing composition. The aragonite seed may induce aragonite formation during the dissolution-reprecipitation of the vaterite containing composition. The aragonite seed may also be induced in situ by thermal activation of the vaterite containing composition. For example, the vaterite containing composition may be combined with water and then may be heated for a period of time such that aragonite seed may be formed in the composition. This aragonite seed that is formed in situ may facilitate aragonite formation during cementation.

In some embodiments, the activation of vaterite, as described herein, may induce aragonite formation or may facilitate control of the aragonite formation upon addition of water to the vaterite composition. In some embodiments, the activation of the vaterite in the cementitious composition may affect the morphology, the linkage, and/or the compressive strength of the aragonite after cementation. In some embodiments, the control of the aragonite formation includes, but not limited to, rate of formation of aragonite, morphology of aragonite (e.g. needle shaped), and/or cross-linkage of aragonite. In some embodiments, the aragonite formation may result in one or more of better linkage or bonding, higher tensile strength, or higher impact fracture toughness, after cementation of the cementitious composition.

The chemical activation of the vaterite containing composition may be induced by adding the inorganic additive or organic additive, as described herein in Example 5.

In another aspect, there is provided a method of forming a formed building material, comprising activating a cementitious composition comprising vaterite; mixing water in the cementitious composition for cementation; pouring the cementitious composition in a mold; controlling aragonite formation upon cementation of the cementitious composition; and allowing the composition to set and harden in the mold to form a formed building material. The formed building material that can be formed by this method, are described herein.

As described herein, the method to produce the compositions provided herein includes carbon, water, alkalinity, and alkaline earth metal ions, depending upon the materials used for the process. Below is provided the description of the elements and their sources used in the methods and systems described herein.

Source of Carbon or $CO_2$

The $CO_2$ source may be a liquid, solid (e.g., dry ice) or gaseous $CO_2$ source. In certain embodiments, the $CO_2$ source is a gaseous $CO_2$ source. This gaseous $CO_2$ is, in certain instances, a waste stream or product from an industrial plant. The nature of the industrial plant may vary in these embodiments, where industrial plants of interest includes, but is not limited to, power plants (e.g., as described in further detail in International Application No. PCT/US08/88318, titled, "Methods of Sequestring $CO_2$," filed 24 Dec. 2008, the disclosure of which is herein incorporated by reference), chemical processing plants, steel mills, paper mills, cement plants (e.g., as described in further detail in U.S. Provisional Application Ser. No. 61/088,340, the disclosure of which is herein incorporated by reference), and other industrial plants that produce $CO_2$ as a byproduct. By waste stream is meant a stream of gas (or analogous stream) that is produced as a byproduct of an active process of the industrial plant. The gaseous stream may be substantially pure $CO_2$ or a multi-component gaseous stream that includes $CO_2$ and one or more additional gases. Multi-component gaseous streams (containing $CO_2$) that may be employed as a $CO_2$ source in embodiments of the subject methods include both reducing, e.g., syngas, shifted syngas, natural gas, and hydrogen and the like, and oxidizing condition streams, e.g., flue gases from combustion. Exhaust gases containing NOx, SOx, VOCs, particulates and Hg would incorporate these compounds along with the carbonate in the precipitated product. Particular multi-component gaseous streams of interest include, but not limited to, oxygen containing combustion power plant flue gas, turbo charged boiler product gas, coal gasification product gas, shifted coal gasification product gas, anaerobic digester product gas, wellhead natural gas stream, reformed natural gas or methane hydrates, and the like.

Thus, the waste streams may be produced from a variety of different types of industrial plants. Suitable waste streams include waste streams, such as, flue gas, produced by industrial plants that combust fossil fuels (e.g., coal, oil, natural gas) or anthropogenic fuel products of naturally occurring organic fuel deposits (e.g., tar sands, heavy oil, oil shale, etc.). In some embodiments, a waste stream suitable for systems and methods provided herein is sourced from a coal-fired power plant, such as a pulverized coal power plant, a super-critical coal power plant, a mass burn coal power plant, a fluidized bed coal power plant. In some embodiments, the waste stream is sourced from gas or oil-fired boiler and steam turbine power plants, gas or oil-fired boiler simple cycle gas turbine power plants, or gas or oil-fired boiler combined cycle gas turbine power plants. In some embodiments, waste streams produced by power plants that combust syngas (i.e., gas that is produced by the gasification of organic matter, for example, coal, biomass, etc.) are used. In some embodiments, waste streams from integrated gasification combined cycle (IGCC) plants are used. In some embodiments, waste streams produced by Heat Recovery Steam Generator (HRSG) plants are used to produce compositions in accordance with systems and methods provided herein.

Waste streams produced by cement plants are also suitable for systems and methods provided herein. Cement plant waste streams include waste streams from both wet process and dry process plants, which plants may employ shaft kilns or rotary kilns, and may include pre-calciners. These industrial plants may each burn a single fuel, or may burn two or more fuels sequentially or simultaneously.

In some embodiments, the source of carbon may be synthetic or naturally occurring carbonate, such as sodium carbonate, or limestone.

Source of Water

As reviewed above, "saltwater" is employed in its conventional sense to include a number of different types of aqueous fluids other than fresh water, where the term "saltwater" includes brackish water, sea water and brine (including man-made brines, e.g., geothermal plant wastewaters, desalination waste waters, etc), as well as other salines having a salinity that is greater than that of freshwater. Brine is water saturated or nearly saturated with salt and has a salinity that is 50 ppt (parts per thousand) or greater. Brackish water is water that is saltier than fresh water, but not as salty as seawater, having a salinity ranging from 0.5 to 35 ppt. Seawater is water from a sea or ocean and has a salinity ranging from 35 to 50 ppt.

The saltwater source from which the composition is derived may be a naturally occurring source, such as a sea, ocean, lake, swamp, estuary, lagoon, etc., or a man-made source. The compositions provided herein may be produced by precipitation from alkaline-earth-metal-containing water, such as, a saltwater, or a freshwater with added alkaline earth metal ions. The saltwater employed in methods may vary.

In some embodiments, the water employed in the invention may be a mineral rich, e.g., calcium and/or magnesium rich, freshwater source. In some embodiments, calcium rich waters may be combined with magnesium silicate minerals, such as olivine or serpentine. The acidity in the solution, due to the addition of carbon dioxide to form carbonic acid, may dissolve the magnesium silicate, leading to the formation of calcium magnesium silicate carbonate compounds.

In some embodiments, the compositions are obtained from saltwater, e.g., by treating a volume of a saltwater in a manner sufficient to produce the desired composition from the initial volume of saltwater. In certain embodiments, the compositions provided herein are derived from saltwater by precipitating them from the saltwater. In certain embodiments, the compositions provided herein are separated in a solid form from the saltwater. In some embodiments, the compositions provided herein may be more stable in saltwater than in freshwater, such that they may be viewed as saltwater metastable compositions.

In some embodiments, the water may be obtained from the power plant that is also providing the gaseous waste stream. For example, in water cooled power plants, such as seawater cooled power plants, water that has been employed by the power plant may then be sent to the precipitation system and employed as the water in the precipitation reaction. In certain of these embodiments, the water may be cooled prior to entering the precipitation reactor.

Source of Alkalinity

In some embodiments, the $CO_2$ from the source of $CO_2$ is contacted with a proton removing agent. The contact may result in a solution containing carbonic acid, bicarbonate, carbonate, hydronium, etc. The proton removing agent may facilitate removal of protons from carbonic acid to form various species, e.g. bicarbonate, carbonate, hydronium, etc. in the solution. The terms "source of alkalinity" or "proton removing agents" or "pH raising or elevating agent," or "base," are used interchangeably herein. As protons are removed, more $CO_2$ goes into solution. In some embodiments, the solution, obtained after contacting the $CO_2$ with the proton removing agent, is then contacted with the alkaline-earth metal ions to cause precipitation of the carbonate precipitate. In some embodiments, proton-removing agents and/or methods are used while contacting a divalent cation-containing aqueous solution with $CO_2$ to increase $CO_2$ absorption in one phase of the precipitation reaction, wherein the pH may remain constant, increase, or even decrease, followed by a rapid removal of protons (e.g., by addition of a base) to cause rapid precipitation of carbonate-containing precipitation material. Protons may be removed from the various species (e.g. carbonic acid, bicarbonate, hydronium, etc.) by any suitable approach, including, but not limited to, use of naturally occurring proton-removing agents, use of microorganisms and fungi, use of synthetic chemical proton-removing agents, recovery of man-made waste streams, and using electrochemical means.

Naturally occurring proton-removing agents encompass any proton-removing agents that can be found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks including such minerals are well known in the art.

Many minerals provide sources of divalent cations and, in addition, some minerals are sources of base. Mafic and ultramafic minerals such as olivine, serpentine, and any other suitable mineral may be dissolved using any convenient protocol. Dissolution may be accelerated by increasing surface area, such as by milling by conventional means or by, e.g., jet milling, as well as by use of, e.g., ultrasonic techniques. In addition, mineral dissolution may be accelerated by exposure to acid or base. Metal silicates (e.g., magnesium silicates) and other minerals including cations of interest may be dissolved, e.g., in acid (e.g., HCl such as HCl from an electrochemical process) to produce, for example, magnesium and other metal cations for use in precipitation material, and, subsequently, compositions of the invention. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use in aggregate by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% and from 70% to 20% water. Advantageously, metal silicates and the like digested with aqueous alkali hydroxide may be used directly to produce precipitation material, and, subsequently, aggregate from a waste gas stream. In addition, base value from the precipitation reaction mixture may be recovered and reused to digest additional metal silicates and the like.

Some embodiments provide for using naturally alkaline bodies of water as naturally occurring proton-removing agents. Examples of naturally alkaline bodies of water include, but not limited to, surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley.

In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions including proton-removing agents (e.g., ammonia, ammonium hydroxide). In some embodiments, organisms are cultured separately from the precipitation reaction mixture, wherein proton-removing agents or solution including proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution.

Chemical agents for effecting proton removal generally refer to synthetic chemical agents that are produced in large quantities and are commercially available. For example, chemical agents for removing protons include, but not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide (Ca(OH)$_2$), or magnesium hydroxide (Mg(OH)$_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phophazene is used to remove protons from various species (e.g., carbonic acid, bicarbonate, hydronium, etc.) for precipitation of precipitation material. In some embodiments, ammonia is used to raise pH to a level sufficient to precipitate precipitation material from a solution of divalent cations and an industrial waste stream. Super bases suitable for use as proton-removing agents include sodium ethoxide, sodium amide (NaNH$_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to including cations of interest and other suitable metal forms, waste streams from various industrial processes may provide proton-removing agents. Such waste streams include, but are not limited to, mining wastes; fossil fuel burning ash (e.g., combustion ash such as fly ash, bottom ash, boiler slag); slag (e.g. iron slag, phosphorous slag); cement kiln waste; oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from sea water (e.g., Mg(OH)$_2$ such as that found in Moss Landing, Calif.); and wastes from mining processes involving leaching. For example, red mud may be used to modify pH as described in U.S. Provisional Patent Application No. 61/161,369, titled, "Neutralizing Industrial Wastes Utilizing CO$_2$ And a Divalent Cation Solution", filed 18 Mar. 2009, which is hereby incorporated by reference in its entirety. Fossil fuel burning ash, cement kiln dust, and slag, collectively waste sources of metal oxides, further described in U.S. patent application Ser. No. 12/486,692, titled, "Methods And Systems For Utilizing Waste Sources Of Metal Oxides," filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia (NH$_3$) or both. As such, agricultural waste may be used in some embodiments provided herein as a proton-removing agent. This agricultural waste is often collected in ponds, but it may also percolate down into aquifers, where it can be accessed and used.

Where desired, the pH of the water is raised using any convenient and/or suitable approach. In certain embodiments, a pH raising agent may be employed, where examples of such agents include oxides, hydroxides (e.g., sodium hydroxide, potassium hydroxide, brucite), carbonates (e.g. sodium carbonate), coal ash, naturally occurring mineral, and the like. The amount of pH elevating agent that is added to the saltwater source will depend on the particular nature of the agent and the volume of saltwater being modified, and will be sufficient to raise the pH of the salt water source to the desired value. Alternatively, the pH of the saltwater source can be raised to the desired level by electrolysis of the water.

One such approach can be to use the coal ash from a coal-fired power plant, which contains many oxides, to elevate the pH of sea water. Other coal processes, like the gasification of coal, to produce syngas, also produce hydrogen gas and carbon monoxide, and may serve as a source of hydroxide as well. Some naturally occurring minerals, such as, serpentine contain hydroxide, and can be dissolved, yielding a hydroxide source. The amount of pH elevating agent that is added to the water may depend on the particular nature of the agent and the volume of saltwater being modified, and may be sufficient to raise the pH of the water to the desired value. Alternatively, the pH of the saltwater source can be raised to the desired level by electrolysis of the water. Where electrolysis is employed, a variety of different protocols may be taken, such as use of the Mercury cell process (also called the Castner-Kellner process); the Diaphragm cell process and the membrane cell process. Where desired, byproducts of the hydrolysis product, e.g., H$_2$, sodium metal, etc. may be harvested and employed for other purposes, as desired.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from CO$_2$ dissolution matches or exceeds electrochemical proton removal from solute molecules. In some embodiments, low-voltage electrochemical methods are used to remove protons, for example, as CO$_2$ is dissolved in the precipitation reaction mixture or a precursor solution to the precipitation reaction mixture (i.e., a solution that may or may not contain divalent cations).

In some embodiments, CO$_2$ dissolved in an aqueous solution that does not contain divalent cations is treated by a low-voltage electrochemical method to remove protons from carbonic acid, bicarbonate, hydronium, or any species or combination thereof resulting from the dissolution of CO$_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage electrochemical methods generate hydrogen gas at the cathode and transport it to the anode where the hydrogen gas is converted to protons. Electrochemical methods that do not generate hydrogen gas may also be convenient. In some embodiments, electrochemical processes to remove protons do not generate a gas at the anode. In some instances, electrochemical methods to remove protons do not generate any gaseous by-byproduct.

Electrochemical methods for effecting proton removal are further described in U.S. Pat. Nos. 7,887,694; 7,790,012; International Patent Application No. PCT/US08/088,242, titled, "LOW ENERGY ELECTROMECHANICAL HYDROXIDE SYSTEM AND METHOD," filed 23 Dec. 2008; International Patent Application No. PCT/US09/32301, titled, "LOW-ENERGY ELECTROCHEMICAL BICARBONATE ION SOLUTION," filed 28 Jan. 2009; International Patent Application No. PCT/US09/48511, titled, "LOW-ENERGY 4-CELL ELECTROCHEMICAL SYSTEM WITH CARBON DIOXIDE GAS," filed 24 Jun. 2009, and U.S. Provisional Patent Application No. 61/617,390, filed Mar. 29, 2012, each of which are incorporated herein by reference in their entireties.

Low voltage electrochemical processes may produce hydroxide at the cathode and protons at the anode or hydroxide at the cathode and oxidized metal ions at the anode, such as in U.S. Provisional Patent Application No. 61/617,390, filed Mar. 29, 2012, where such processes utilize a salt containing chloride, e.g. NaCl, a product of the process will be NaOH. In some embodiments, electrochemical methods may be used to produce caustic molecules (e.g., hydroxide) through, for example, the chlor-alkali process, or modification thereof. Electrodes (i.e., cathodes and anodes) may be present in the apparatus containing the divalent cation-containing aqueous solution or gaseous waste stream-charged (e.g., $CO_2$-charged) solution, and a selective barrier, such as a membrane, may separate the electrodes. Electrochemical systems and methods for removing protons may produce byproducts (e.g., hydrogen) that may be harvested and used for other purposes. Additional electrochemical approaches that may be used in systems and methods of the invention include, but are not limited to, those described in U.S. patent application Ser. No. 12/503,557, titled, "$CO_2$ UTILIZATION IN ELECTROCHEMICAL SYSTEMS," filed 15 Jul. 2009, the disclosures of which are herein incorporated by reference in their entirety.

Combinations of the above mentioned sources of proton removal may be employed. One such combination is the use of a microorganisms and electrochemical systems. Combinations of microorganisms and electrochemical systems include microbial electrolysis cells, including microbial fuel cells, and bio-electrochemically assisted microbial reactors. In such microbial electrochemical systems, microorganisms (e.g. bacteria) are grown on or very near an electrode and in the course of the metabolism of material (e.g. organic material) electrons are generated that are taken up by the electrode.

Additives other than pH elevating agents may also be introduced into the water in order to influence the nature of the precipitate that is produced. As such, certain embodiments of the methods include providing an additive in water before or during the time when the water is subjected to the precipitation conditions. Certain calcium carbonate polymorphs can be favored by trace amounts of certain additives, such as, but are not limited to, lanthanum as lanthanum chloride, transition metals, iron, nickel, and the like. For instance, iron may favor the formation of disordered dolomite (protodolomite).

In some embodiments, the source of alkalinity is bicarbonate, carbonate, or a mixture of NaOH and carbon dioxide, and the alkaline solution is a "high carbonate" alkaline solution. By "high carbonate" alkaline solution is meant an aqueous composition which possesses carbonate in a sufficient amount so as to remove one or more protons from proton-containing species in solution such that carbonic acid is converted to bicarbonate. As such, the amount of carbonate present in alkaline solutions of the invention may be 5,000 ppm or greater, such as 10,000 ppm greater, such as 25,000 ppm or greater, such as 50,000 ppm or greater, such as 75,000 ppm or greater, including 100,000 ppm or greater.

Source of Cations, Such as, Alkaline Earth Metals

The source of cations, such as sodium, potassium, or alkaline earth metal ions etc., is any aqueous medium containing alkaline earth metals, such as, but are not limited to, calcium, magnesium, strontium, barium, etc. or combination thereof. In some embodiments, the alkaline earth metal is calcium, magnesium, or combination thereof and the source of alkaline earth metal is any aqueous medium containing calcium, magnesium or combination thereof. In some embodiments, alkaline earth metal source is also the source of water and/or source of alkalinity, as described herein. For example, the aqueous solution of alkaline earth metal ions may comprise cations derived from freshwater, brackish water, seawater, or brine (e.g., naturally occurring subterranean brines or anthropogenic subterranean brines such as geothermal plant wastewaters, desalination plant waste waters), as well as other salines having a salinity that is greater than that of freshwater, any of which may be naturally occurring or anthropogenic.

Divalent cations (e.g., alkaline earth metal cations such as $Ca^{2+}$ and $Mg^{2+}$), which are useful for producing precipitation material of the invention, may be found in industrial wastes, seawater, brines, hard water, minerals, and many other suitable sources.

In some locations, industrial waste streams from various industrial processes provide for convenient sources of cations (as well as in some cases other materials useful in the process, e.g., metal hydroxide). Such waste streams include, but are not limited to, mining wastes; fossil fuel burning ash (e.g., fly ash, bottom ash, boiler slag); slag (e.g., iron slag, phosphorous slag); cement kiln waste (e.g., cement kiln dust); oil refinery/petrochemical refinery waste (e.g., oil field and methane seam brines); coal seam wastes (e.g., gas production brines and coal seam brine); paper processing waste; water softening waste brine (e.g., ion exchange effluent); silicon processing wastes; agricultural waste; metal finishing waste; high pH textile waste; and caustic sludge.

In some locations, a convenient source of cations for use in systems and methods provided herein is water (e.g., an aqueous solution including cations such as seawater or subterranean brine), which may vary depending upon the particular location at which the invention is practiced. Suitable aqueous solutions of cations that may be used include solutions including one or more divalent cations, e.g., alkaline earth metal cations such as $Ca^{2+}$ and $Mg^{2+}$. In some embodiments, the aqueous source of cations comprises alkaline earth metal cations. In some embodiments, the alkaline earth metal cations include calcium, magnesium, or a mixture thereof. In some embodiments, the aqueous solution of cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm, or 10,000 to 50,000 ppm, or 20,000 to 50,000 ppm, or 20,000 to 30,000 ppm.

In some embodiments, mineral rich freshwater may be a convenient source of cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of cations such as alkaline earth metal cations (e.g., $Ca^{2+}$, $Mg^{2+}$, etc.) to produce a mineral-rich water that is suitable for methods and systems described herein. Cations or precursors thereof (e.g., salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from $Na^+$ and $K^+$ are added to freshwater. In some embodiments, freshwater including $Ca^{2+}$ is combined with magnesium silicates (e.g., olivine or serpentine), or products or processed forms thereof, yielding a solution including calcium and magnesium cations.

Many minerals provide sources of cations and, in addition, some minerals are sources of base. Divalent cation-containing minerals include mafic and ultramafic minerals such as olivine, serpentine, and other suitable minerals, which may be dissolved using any convenient protocol. In one embodiment, cations such as calcium may be provided for methods and compositions of this invention from feldspars such as anorthite. Cations may be obtained directly from mineral sources or from subterranean brines, high in calcium or other divalent cations. Other minerals such as wollastonite may also be used. Dissolution may be accelerated by increasing surface area, such as by milling by conventional means or by, for example, jet milling, as well as by use of, for example, ultrasonic techniques. In addition, mineral dissolution may be accelerated by exposure to acid or base.

Metal silicates (e.g., magnesium silicates) and other minerals including cations of interest may be dissolved, for example, in an acid such as HCl (optionally from an electrochemical process) to produce, for example, magnesium and other metal cations for use in compositions provided herein. In some embodiments, magnesium silicates and other minerals may be digested or dissolved in an aqueous solution that has become acidic due to the addition of carbon dioxide and other components of waste gas (e.g., combustion gas). Alternatively, other metal species such as metal hydroxide (e.g., $Mg(OH)_2$, $Ca(OH)_2$) may be made available for use by dissolution of one or more metal silicates (e.g., olivine and serpentine) with aqueous alkali hydroxide (e.g., NaOH) or any other suitable caustic material. Any suitable concentration of aqueous alkali hydroxide or other caustic material may be used to decompose metal silicates, including highly concentrated and very dilute solutions. The concentration (by weight) of an alkali hydroxide (e.g., NaOH) in solution may be, for example, from 30% to 80% (w/w).

Brines

As used herein, "brines" includes synthetic brines or naturally occurring brines, such as, but are not limited to subterranean brines. The brines may provide the source of water, the source of alkaline earth metal ions, the source of carbon or carbonate, the source of alkalinity, or combinations thereof.

In some embodiments the subterranean brines of this invention may be a convenient source for divalent cations, monovalent cations, proton removing agents, or any combination thereof. The subterranean brine that is employed in embodiments of the invention may be from any convenient subterranean brine source. "Subterranean brine" is employed in its conventional sense to include naturally occurring or anthropogenic, saline compositions obtained from a geological location. The geological location of the subterranean brine can be found below ground (subterranean geological location), on the surface, or subsurface of the lakes. Concentrated aqueous saline composition includes an aqueous solution which has a salinity of 10,000 ppm total dissolved solids (TDS) or greater, such as 20,000 ppm TDS or greater and including 50,000 ppm TDS or greater. Subterranean geological location includes a geological location which is located below ground level, such as, a solid-fluid interface of the Earth's surface, such as a solid-gas interface as found on dry land where dry land meets the Earth's atmosphere, as well as a liquid-solid interface as found beneath a body of surface water (e.g., lack, ocean, stream, etc) where solid ground meets the body of water (where examples of this interface include lake beds, ocean floors, etc). For example, the subterranean location can be a location beneath land or a location beneath a body of water (e.g., oceanic ridge). For example, a subterranean location may be a deep geological alkaline aquifer or an underground well located in the sedimentary basins of a petroleum field, a subterranean metal ore, a geothermal field, or an oceanic ridge, among other underground locations.

Brines may be concentrated waste streams from wastewater treatment plants. In some embodiments, brines of this invention may be water resulting from dissolution of mineral sources (e.g., oil and gas exploration or extraction) that has been concentrated or otherwise treated. The waste streams from underground sources such as gas or petroleum mining may contain hydrocarbons, carbonates, cations or anions. Treatment of these waste streams to reduce hydrocarbons and the water volume may result in an aqueous mixture rich in carbonates, salinity, alkalinity or any combination thereof. This aqueous mixture may be used to sequester carbon dioxide or may be used to precipitate hydrated carbon species such as carbonic acid, bicarbonate, or carbonates. Subterranean brines may include, but are not limited to, oil-field brines, basinal brines, basinal water, pore water, formation water, and deep sea hypersaline waters, among others.

Subterranean brines of the invention may be subterranean aqueous saline compositions and in some embodiments, may have circulated through crustal rocks and become enriched in substances leached from the surrounding mineral. As such, the composition of subterranean brines may vary. In some embodiments, the subterranean brines provide a source of cations. The cations may be monovalent cations, such as $Na^+$, $K^+$, etc. The cations may also be divalent cations, such as $Ca^{2+}$, $Mg^{2+}$, $Sr^{2+}$, $Ba^{2+}$, $Mn^{2+}$, $Zn^{2+}$, $Fe^{2+}$ etc. In some instances, the divalent cations of the subterranean brine are alkaline earth metal cations, e.g., $Ca^{2+}$, $Mg^{2+}$. Subterranean brines of interest may have $Ca^{2+}$ present in amounts that vary, ranging from 50 to 100,000 ppm, such as 100 to 75,000 ppm, including 500 to 50,000 ppm, for example 1000 to 25,000 ppm. Subterranean brines of interest may have $Mg^{2+}$ present in amounts that vary, ranging from 50 to 25,000 ppm, such as 100 to 15,000 ppm, including 500 to 10,000 ppm, for example 1000 to 5,000 ppm. In brines where both $Ca^{2+}$ and $Mg^{2+}$ are present, the molar ratio of $Ca^{2+}$ to $Mg^{2+}$ (i.e., $Ca^{2+}:Mg^{2+}$) in the subterranean brine may vary, and in one embodiment may range between 1:1 and 100:1. In some instance the $Ca^{2+}:Mg^{2+}$ may be between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, the molar ratio of $Ca^{2+}$ to $Mg^{2+}$ in subterranean brines of interest may range between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the subterranean brine ranges between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, the ratio of $Mg^{2+}$ to $Ca^{2+}$ in the subterranean brines of interest may range between 1:1 and 1:10; 1:5 and 1:25;

1:10 and 1:50; 1:25 and 1:100; 1:50 and 1:500; or 1:100 and 1:1000. In particular embodiments the $Mg^{2+}$:$Ca^{2+}$ of a brine may be lower than 1:1, such as 1:2, 1:4, 1:10, 1:100 or lower.

In some embodiments, subterranean brines provide a source of alkalinity and contain proton-removing agents. As used herein, "proton removing agent" includes a substance or compound which possesses sufficient alkalinity or basicity to remove one or more protons from a proton-containing species in solution. In some embodiments, the amount of proton-removing agent is an amount such that the subterranean brine possesses a neutral pH (i.e., pH=7). In these embodiments, the stoichiometric sum of proton-removing agents is equal to the stoichiometric sum of proton-containing agents in the subterranean brine. The stoichiometric sum of proton-removing agents is the sum of all substances or compounds (e.g., halides, oxyanions, organic bases, etc.) which can remove one or more protons from a proton-containing species in solution. In other embodiments, the amount of proton-removing agents in the subterranean brine is an amount such that the subterranean brine is alkaline. In some instances, the alkaline subterranean brine has a pH that is above neutral pH (i.e., pH>7), e.g., the brine has a pH ranging from 7.1 to 12, such as 8 to 12, such as 8 to 11, and including 9 to 11. Proton-removing agents present in subterranean brines of the invention may vary. In some embodiments, the proton-removing agents may be anions. Anions may be halides, such as $Cl^-$, $F^-$, $I^-$ and $Br^-$, among others and oxyanions, e.g., sulfate, carbonate, borate and nitrate, among others.

In some embodiments, the proton-removing agent is borate. Borates present in subterranean brines of the invention may be any oxyanion of boron, e.g., $BO_3^{3-}$, $B_2O_5^{4-}$, $B_3O_7^{5-}$, and $B_4O_9^{6-}$, among others. The amount of borate present in subterranean brines of the invention may vary. In some instances, the amount of borate present ranges from 50 to 100,000 ppm, such as 100 to 75,000 ppm, including 500 to 50,000 ppm, for example 1000 to 25,000 ppm. As such, in some embodiments, the proton removing agents present in the subterranean brines may comprise 5% or more of borates, such about 10% or more of borates, including about 25% or more of borates, for instance about 50% or more of borates, such as about 75% or more of borates, including about 90% or more of borates. Where both carbonate and borate are present, the molar ratio of carbonate to borate (i.e., carbonate:borate) in the subterranean brines may be between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, the molar ratio of carbonate to borate in subterranean brines of the invention may be between 1:1 and 1:10; 1:5 and 1:25; 1:10 and 1:50; 1:25 and 1:100; 1:50 and 1:500; or 1:100 and 1:1000. In other embodiments, the ratio of carbonate to borate (i.e., carbonate:borate) in the subterranean brine may be between 1:1 and 2.5:1; 2.5:1 and 5:1; 5:1 and 10:1; 10:1 and 25:1; 25:1 and 50:1; 50:1 and 100:1; 100:1 and 150:1; 150:1 and 200:1; 200:1 and 250:1; 250:1 and 500:1; 500:1 and 1000:1, or a range thereof. For example, the ratio of carbonate to borate in the subterranean brines of the invention may be between 1:1 and 10:1; 5:1 and 25:1; 10:1 and 50:1; 25:1 and 100:1; 50:1 and 500:1; or 100:1 and 1000:1.

In some embodiments, proton-removing agents present in subterranean brines may be an organic base. In some instances, the organic base may be a monocarboxylic acid anion, e.g., formate, acetate, propionate, butyrate, and valerate, among others. In other instances, the organic base may be a dicarboxylic acid anion, e.g., oxalate, malonate, succinate, and glutarate, among others. In other instances, the organic base may be phenolic compounds, e.g., phenol, methylphenol, ethylphenol, and dimethylphenol, among others. In some embodiments, the organic base may be a nitrogenous base, e.g., primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. The amount of organic base present in subterranean brines of the invention may vary. In some instances, the amount of organic base present in the brine ranges from 1 to 200 mmol/liter, such as 1 to 175 mmol/liter, such as 1 to 100 mmol/liter, such as 10 to 100 mmol/liter, including 10 to 75 mmol/liter. Thus, in certain embodiments, proton removing agents present in the subterranean brines may make up 5% or more of organic base, such about 10% or more of organic base, including about 25% or more of organic base, for instance about 50% or more of organic base, such as about 75% or more of organic base, including about 90% or more of organic base.

In some embodiments, subterranean brines of the invention may have a composition which includes one or more identifying components which distinguish each subterranean brine from other subterranean brines. As such, the composition of each subterranean brine may be distinct from one another. In some embodiments, subterranean brines may be distinguished from one another by the amount and type of elements, ions or other substances present in the subterranean brine (e.g., trace metal ions, Hg, Se, As, etc). In other embodiments, subterranean brines may be distinguished from one another by the molar ratio of carbonates present in the subterranean brine. In other embodiments, subterranean brines may be distinguished from one another by the amount and type of different isotopes present in the subterranean brine (e.g., $\delta^{13}C$, $\delta^{18}O$ etc.). In other embodiments, subterranean brines may be distinguished from one another by the isotopic ratio of particular elements present in the subterranean brine (e.g., $^{87}Sr/^{86}Sr$).

Methods

A variety of different methods may be employed to prepare the $CO_2$ sequestering calcium carbonates of the compositions provided herein. The $CO_2$ sequestration protocols of interest include, but are not limited to, those disclosed in U.S. Pat. Nos. 7,735,274, 7,744,761, 7,754,169, and 7,749,476; and U.S. patent application Ser. No. 12/557,492, titled "$CO_2$ COMMODITY TRADING SYSTEM AND METHOD," filed 10 Sep. 2009; International Application No. PCT/US08/88318, titled, "METHODS OF SEQUESTERING $CO_2$," filed 24 Dec. 2008; and International Application No. PCT/US09/45722, titled "ROCK AND AGGREGATE, AND METHODS OF MAKING AND USING THE SAME," filed 29 May 2009; as well as U.S. Provisional Patent Application Ser. Nos. 61/081,299; 61/082,766; 61/088,347; 61/088,340; and 61/101,631; the disclosures of which are herein incorporated by reference in their entireties.

Figure 2:
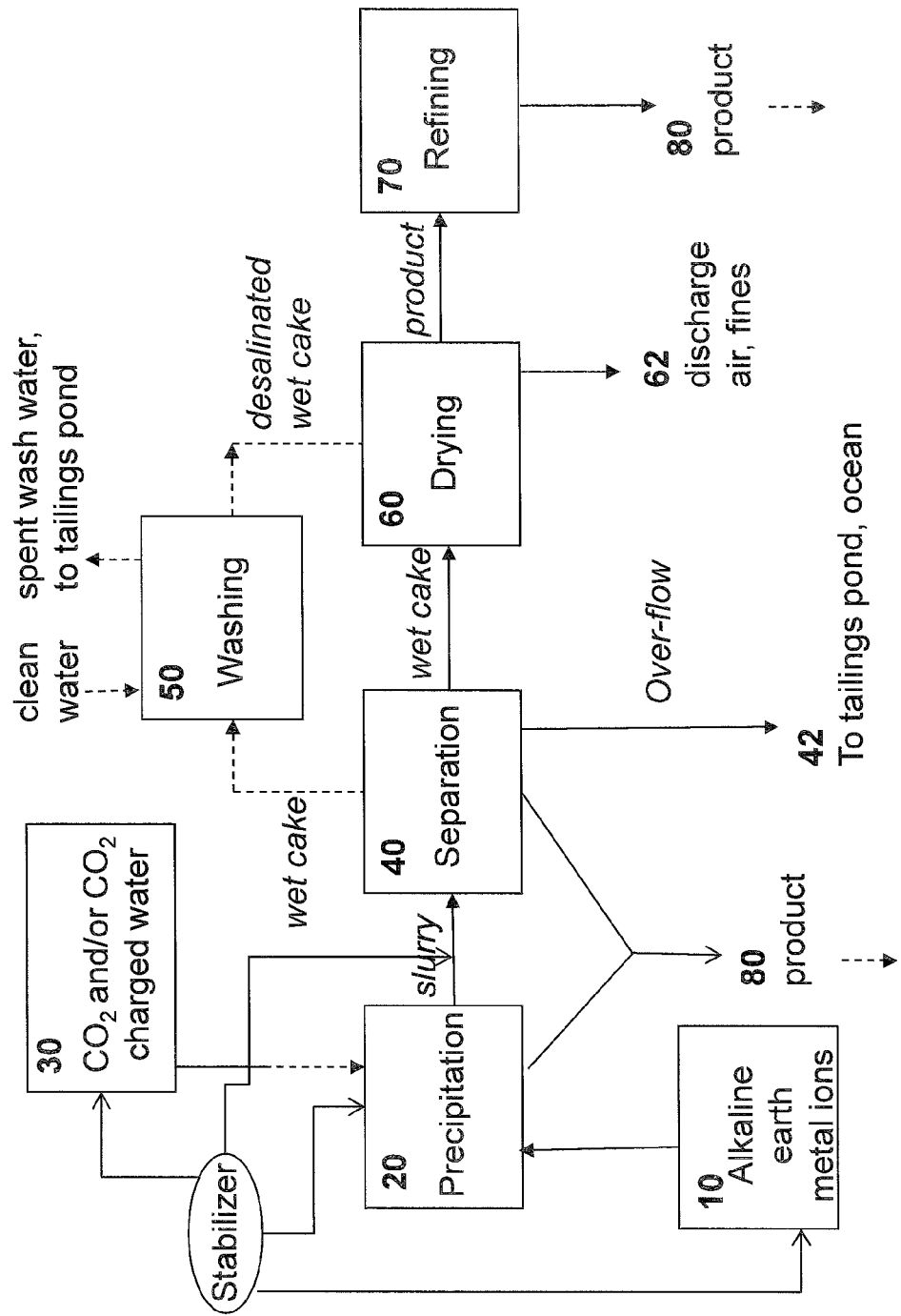
FIG. 2 illustrates a flow diagram of a precipitation process according to some embodiments provided herein.

FIG. 2 provides an illustrative schematic flow diagram of a carbonate precipitation process according to some embodiments of the invention. In FIG. 2, any source of water, such as, for example only, saltwater from salt water source containing alkaline earth metal ions or an alkaline earth metal ion containing water 10 is subjected to one or more conditions at precipitation step 20. In some embodiments, the water from saltwater source or the alkaline earth-metal containing water 10 is contacted with a solution charged with the partially or fully dissolved $CO_2$, which $CO_2$ is then subjected to one or more carbonate compound precipitation conditions. As depicted in FIG. 2, the $CO_2$ 30 includes a gaseous stream or the solution containing the $CO_2$ where the $CO_2$ has been contacted with the proton removing agent.

In some embodiments, the solution charged with the partially or fully dissolved $CO_2$ is made by parging or diffusing the $CO_2$ gaseous stream through a solution to make a $CO_2$ charged water. In some embodiments, the solution with $CO_2$ includes a proton removing agent. In some embodiments, the $CO_2$ gas is bubbled or parged through a solution containing a proton removing agent, such as sodium or potassium hydroxide, in an absorber. In some embodiments, the absorber may include a bubble chamber where the $CO_2$ gas is bubbled through the solution containing the proton removing agent. In some embodiments, the absorber may include a spray tower where the solution containing the proton removing agent is sprayed or circulated through the $CO_2$ gas. In some embodiments, the absorber may include a pack bed to increase the surface area of contact between the $CO_2$ gas and the solution containing the proton removing agent. In some embodiments, a typical absorber fluid temperature is 32-37° C. The absorber for absorbing $CO_2$ in the solution is described in U.S. application Ser. No. 12/721,549, filed on Mar. 10, 2010, which is incorporated herein by reference in its entirety.

In some embodiments, the water from saltwater source or an alkaline earth-metal containing water 10 is contacted with a gaseous stream of $CO_2$ or the $CO_2$ charged water from the source of $CO_2$ 30. By $CO_2$ charged water is meant water that has had $CO_2$ gas contacted with it and/or where $CO_2$ molecules have combined with water molecules to produce, e.g., carbonic acid, bicarbonate and carbonate ion. Charging water in this step results in an increase in the $CO_2$ content of the water, e.g., in the form of carbonic acid, bicarbonate and carbonate ion, and a concomitant decrease in the $pCO_2$ of the waste stream that is contacted with the water. The $CO_2$ charged water may be acidic, having a pH of 6 or less, such as 5 or less and including 4 or less. In certain embodiments, the concentration of $CO_2$ gas that is used to charge the water is 10% or higher, 25% or higher, including 50% or higher, such as 75% or even higher.

In some embodiments, an order for the addition of the $CO_2$ and the alkaline earth metal containing water to the reactor for the precipitation, may be varied. In some embodiments, the $CO_2$ gaseous stream or the solution containing the partially or fully dissolved $CO_2$ or the affluent from the absorber containing an alkaline solution of $CO_2$ is added to the reactor containing the alkaline earth-metal containing water for precipitation of the carbonate precipitate in the precipitation step 20. In some embodiments, the alkaline earth-metal containing water is added to the reactor containing the $CO_2$ gaseous stream or the solution containing the partially or fully dissolved $CO_2$ or the affluent from the absorber containing an alkaline solution of $CO_2$ for precipitation of the carbonate precipitate in the precipitation step 20. In some embodiments, the alkaline earth-metal containing water is added to the reactor containing less than 20%, or less than 15%, or less than 10%, or less than 5% of the $CO_2$ gaseous stream or the solution containing the partially or fully dissolved $CO_2$ or the affluent from the absorber containing an alkaline solution of $CO_2$ for precipitation of the carbonate precipitate in the precipitation step 20.

As shown in FIG. 2, in some embodiments, the stabilizer is added to the solution containing $CO_2$ or $CO_2$ charged water 30 which is then contacted with the alkaline earth metal ions in the precipitation step 20. In some embodiments, the stabilizer is added to the alkaline earth metal ions 10 which is then contacted with the solution containing $CO_2$ in the precipitation step 20. In such embodiments, the stabilizer may be dissolved in the alkaline earth metal containing solution before it is added to the solution containing $CO_2$. In some embodiments, the stabilizer is added to the precipitation step 20 in the reactor before both the alkaline earth metal ions and the solution of $CO_2$ are added. In some embodiments, the stabilizer is added to the precipitation step 20 simultaneously when both the alkaline earth metal ions and the solution of $CO_2$ are added for the precipitation. In some embodiments, the stabilizer is added to the precipitation step 20 after both the alkaline earth metal ions and the solution of $CO_2$ are added for the precipitation. In some embodiments, the stabilizer is added to the slurry containing the carbonate precipitate that is taken out from the precipitation step 20.

By way of example only, in some embodiments, about 1-50 lbs of sodium sulfate salt may be added to about 100-200 gallons of water in a tank, and may be dissolved by mixing with both impeller and recirculation pumps. This solution may be transferred to a larger tank, containing an additional about 2000-4000 gallons of water, which may be mixed by recirculation pumps. About 200-400 gallons of concentrated calcium chloride solution may be added to this tank. The solution may be mixed by recirculation for 1-4 hours. Additional sodium sulfate salt, calcium chloride concentrate and/or water may be added to perform fine adjustments to concentrations. This resulting solution is then mixed with $CO_2$ charged water to form the precipitate.

Contact protocols include, but are not limited to, direct contacting protocols, e.g., bubbling the gas through the volume of water; concurrent contacting means, e.g., contact between unidirectionally flowing gaseous and liquid phase streams; and countercurrent means, e.g., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient. In some embodiments, the contact is by spray. In some embodiments, the contact is through packed column.

In some embodiments, the methods include contacting the volume of water that is subjected to the mineral precipitation conditions with a source of $CO_2$. The contacting of the water with the source of $CO_2$ may occur before and/or during the time when the water is subject to $CO_2$ in one or more conditions or one or more precipitation conditions. Accordingly, embodiments of the invention include methods in which the volume of water is contacted with a source of $CO_2$ prior to subjecting the volume of saltwater to mineral precipitation conditions. Embodiments of the invention include methods in which the volume of salt water is contacted with a source of $CO_2$ while the volume of saltwater is being subjected to mineral precipitation conditions. Embodiments of the invention include methods in which the volume of water is contacted with a source of a $CO_2$ both prior to subjecting the volume of water to mineral precipitation conditions and while the volume of water is being subjected to carbonate compound precipitation conditions. In some embodiments, the same water may be cycled more than once, wherein a first cycle of precipitation removes primarily calcium carbonate and magnesium carbonate minerals, and leaves remaining alkaline water to which other alkaline earth ion sources may be added, that can have more carbon dioxide or the solution of carbon dioxide cycled through it, precipitating more carbonate compounds.

The $CO_2$ charging and carbonate compound precipitation may occur in a continuous process or at separate steps. As such, charging and precipitation may occur in the same reactor of a system, e.g., as illustrated in FIG. 2 at step 20, according to some embodiments of the invention. In yet other embodiments, these two steps may occur in separate reactors, such that the water containing proton removing agent is first charged with $CO_2$ in a charging reactor and the resultant $CO_2$ charged water or the solution is then subjected to precipitation conditions in a separate reactor or in a precipitator.

In methods provided herein, a volume of water is subjected to one or more conditions or precipitation conditions sufficient to produce a precipitated carbonate compound composition and mother liquor (i.e., the part of the water that is left over after precipitation of the carbonate compound(s) from water). At precipitation step 20, carbonate compounds, which may be amorphous or crystalline, are precipitated. This precipitate may be the self-cementing composition product 80 and may be stored as is or may be further processed to make the cement products. Alternatively, the precipitate may be subjected to further processing to give the hydraulic cement or the SCM compositions of the invention.

The one or more conditions or one or more precipitation conditions of interest include those that change the physical environment of the water to produce the desired precipitate product. The one or more conditions or precipitation conditions include, but are not limited to, one or more of temperature, pressure, pH, precipitation, residence time of the precipitate, flow rate of the solutions, concentration, dewatering or separation of the precipitate, drying, milling, and storage. For example, the temperature of the water may be within a suitable range for the precipitation of the desired composition to occur. For example, the temperature of the water may be raised to an amount suitable for precipitation of the desired carbonate compound(s) to occur. In such embodiments, the temperature of the water may be from 5 to 70° C., such as from 20 to 50° C., and including from 25 to 45° C. As such, while a given set of precipitation conditions may have a temperature ranging from 0 to 100° C., the temperature may be raised in certain embodiments to produce the desired precipitate. In certain embodiments, the temperature is raised using energy generated from low or zero carbon dioxide emission sources, e.g., solar energy source, wind energy source, hydroelectric energy source, etc.

The residence time of the precipitate in the reactor before the precipitate is removed from the solution, may vary. In some embodiments, the residence time of the precipitate in the solution is more than 5 seconds, or between 5 seconds-1 hour, or between 5 seconds-1 minute, or between 5 seconds to 20 seconds, or between 5 seconds to 30 seconds, or between 5 seconds to 40 seconds. Without being limited by any theory, it is contemplated that the residence time of the precipitate may affect the size of the particle. For example, a shorter residence time may give smaller size particles or more disperse particles whereas longer residence time may give agglomerated or larger size particles. In some embodiments, the residence time in the process of the invention may be used to make small size as well as large size particles in a single or multiple batches which may be separated or may remain mixed for later steps of the process. In some embodiments, the finely disperse particles may be processed further to give the SCM composition of the invention. In some embodiments, the large or agglomerated particles may be processed to give the hydraulic cement composition and/or the self-cementing composition of the invention. The particle size and/or agglomeration of the particles may also be affected by the stabilizer added during the precipitation reaction or shortly thereafter.

While the pH of the water may range from 7 to 14 during a given precipitation process, in some embodiments, the pH is raised to alkaline levels in order to drive the precipitation of carbonate compound as desired. In some embodiments, the pH is raised to a level which minimizes if not eliminates $CO_2$ gas generation production during precipitation. In these embodiments, the pH may be raised to 10 or higher, such as 11 or higher. In some embodiments, the one or more conditions or the precipitation conditions include contacting the proton removing agent with $CO_2$ to form a solution which is then contacted with the solution containing alkaline earth metal ions. In some embodiments, the one or more conditions or the precipitation conditions include contacting the saltwater or the alkaline-earth metal containing water with a proton removing agent. The proton removing agent may be any proton removing agent, as described herein, for example, but not limited to, oxide, hydroxide, such as sodium hydroxide, carbonate, coal ash, naturally occurring mineral, and combination thereof. In some embodiments, the one or more conditions or the precipitation conditions include contacting the saltwater or the alkaline-earth metal containing water to electrochemical conditions. Such electrochemical conditions have been described herein. The nature of the precipitate may be affected by the pH of the precipitation process. In some embodiments, high pH may lead to rapid precipitation and agglomeration of the particles whereas lower pH or slow raise in the pH may lead to finer particles.

The nature of the precipitate may also be influenced by selection of appropriate major ion ratios. Major ion ratios may have influence on polymorph formation. For example, magnesium may stabilize the vaterite and/or amorphous calcium carbonate in the precipitate.

Rate of precipitation may also influence compound polymorphic phase formation and may be controlled in a manner sufficient to produce a desired precipitate product. The most rapid precipitation can be achieved by seeding the solution with a desired phase. Without seeding, rapid precipitation can be achieved by rapidly increasing the pH of the sea water. The higher the pH is, the more rapid the precipitation may be.

In some embodiments, a set of conditions to produce the desired precipitate from the water include, but not limited to, the water's temperature and pH, and in some instances the concentrations of additives and ionic species in the water. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare carbonate compound precipitates according to the invention may be batch or continuous protocols. It will be appreciated that precipitation conditions may be different to produce a given precipitate in a continuous flow system compared to a batch system. The one or more of the precipitation conditions, as described herein, may be modulated to obtain a precipitate with a desired particle size, reactivity, and zeta potential. This may further affect the compressive strength of the cement formed when the composition is combined with fresh water, set and hardenend.

Following production of the carbonate compound precipitate from the water, the resultant precipitated carbonate compound composition may be separated from the mother liquor or dewatered to produce the precipitate product, as illustrated at step 40 of FIG. 1. Alternatively, the precipitate is left as is in the mother liquor or mother suprenate. The precipitate contains vaterite and the stabilizer.

Separation of the precipitate can be achieved using any convenient approach, including a mechanical approach, e.g., where bulk excess water is drained from the precipitated, e.g., either by gravity alone or with the addition of vacuum, mechanical pressing, by filtering the precipitate from the mother liquor to produce a filtrate, or using centrifugation techniques, etc. Separation of bulk water produces a wet, dewatered precipitate.

The above protocol results in the production of slurry of a $CO_2$ sequestering precipitate and mother liquor. This precipitate in the mother liquor and/or in the slurry may give the self-cementing composition 80. In some embodiments, a portion or whole of the dewatered precipitate or the slurry is further processed to make the hydraulic cement or the SCM compositions of the invention.

Where desired, the compositions made up of the precipitate and the mother liquor may be stored for a period of time following precipitation and prior to further processing. For example, the composition may be stored for a period of time ranging from 1 to 1000 days or longer, such as 1 to 10 days or longer, at a temperature ranging from 1 to 40° C., such as 20 to 25° C.

The slurry components are then separated. Embodiments may include treatment of the mother liquor, where the mother liquor may or may not be present in the same composition as the product. For example, where the mother liquor is to be returned to the ocean, the mother liquor may be contacted with a gaseous source of $CO_2$ in a manner sufficient to increase the concentration of carbonate ion present in the mother liquor. Contact may be conducted using any convenient protocol, such as those described above. In certain embodiments, the mother liquor has an alkaline pH, and contact with the $CO_2$ source is carried out in a manner sufficient to reduce the pH to a range between 5 and 9, e.g., 6 and 8.5, including 7.5 to 8.2. In certain embodiments, the treated brine may be contacted with a source of $CO_2$, e.g., as described above, to sequester further $CO_2$.

The resultant mother liquor of the reaction may be disposed of using any convenient protocol. In certain embodiments, it may be sent to a tailings pond for disposal 42. In certain embodiments, it may be disposed of in a naturally occurring body of water, e.g., ocean, sea, lake or river. In certain embodiments, the mother liquor is returned to the source of feedwater for the methods of invention, e.g., an ocean or sea. Alternatively, the mother liquor may be further processed, e.g., subjected to desalination protocols, as described further in U.S. Pat. No. 7,744,761, the disclosure of which is herein incorporated by reference in its entirety.

In some embodiments, the stability of the vaterite in the precipitate can be optionally optimized by rinsing the precipitate with chemical activators. In one aspect, there are provided methods for making a composition, comprising (a) contacting $CO_2$ from a $CO_2$ source with a proton removing agent to form a solution; (b) contacting the solution with water comprising alkaline earth-metal and a stabilizer under one or more conditions to make a precipiate comprising vaterite and the stabilizer; and (c) rinsing the precipitate with solution comprising chemical activators that activate the vaterite in the precipitate. In some embodiments, the method further comprises drying the precipitate to form the composition of the invention. In some embodiments, the method further comprises combining the composition with water and facilitating vaterite transformation to aragonite when the composition sets and hardens to form cement wherein the facilitation is provided by the chemical activators.

In some embodiments of the above described aspect, the stability of the precipitate containing vaterite and stabilizer may be further optimized by rinsing the precipitate with chemical additives or activators. For example, in some embodiments, it may be desired to stabilize the vaterite precipitate only during the precipitation process. In such embodiments, the stabilizer may be added during the precipitation process and is partially or fully removed after the precipitation by rinsing the precipitate with solution containing chemical activators. In some embodiments, the precipitate may have been obtained by separating the solid from the slurry and filter pressing the settled solid. Such rinsing may remove the stabilizer from the precipitate thereby activating the vaterite or making the vaterite less stable and more reactive. In some embodiments, it may be desired to stabilize the vaterite precipitate not only during the precipitation process but also during the drying process (as described herein). In such embodiments, the dried composition may be kept in storage and is rinsed with chemical activators at the time of use to generate a reactive vaterite. In some embodiments, the vaterite precipitate may get over stabilized by the stabilizer and it may be desired to destabilize the vaterite precipitate. In such embodiments, the precipitate or the dried composition is rinsed with chemical activators to generate a reactive or destabilized vaterite. As described herein, the stability of the vaterite is related to the optimized activation of the vaterite such that when the composition is combined with water, the vaterite transforms to aragonite resulting in cementation.

In some embodiments, the chemical activators are solutions comprising carbonate ions and/or magnesium ions. In such embodiments, the above described rinsing comprises rinsing the precipitate or the dried composition with a first solution comprising carbonate ions and then a second solution comprising magnesium ions. In some embodiments, the precipitate or the dried composition may be rinsed with a solution comprising magnesium carbonate such that the solution provides both the magnesium ions as well as carbonate ions. It is contemplated that the rinsing with the first solution comprising carbonate ions modifies the surface chemistry of the precipitate in such a way that the sulfate ions in the precipitate are partially or fully replaced by the carbonate ions making the overall surface charge negative. It is further contemplated that the rinsing with the second solution comprising magnesium ions partially or fully replaces the carbonate ions with the magnesium ions such that the overall surface charge is positive. The reduction in the sulfate content of the precipitate and subsequent rinsing with magnesium ions may activate vaterite and facilitate transformation of vaterite to aragonite when the composition is combined with water. The examples of such rinsing are described herein in Example 9.

The resultant dewatered precipitate is then dried to produce the composition of the invention, as illustrated at step 60 of FIG. 1. Drying can be achieved by air drying, spray drying, vacuum drying, and/or oven drying the precipitate. Where the precipitate is air dried, air drying may be at a temperature ranging from −70 to 120° C., as desired. In certain embodiments, drying is achieved by freeze-drying (i.e., lyophilization), where the precipitate is frozen, the surrounding pressure is reduced and enough heat is added to allow the frozen water in the material to sublime directly from the frozen precipitate phase to gas. In yet another embodiment, the precipitate is spray dried to dry the precipitate, where the liquid containing the precipitate is dried by feeding it through a hot gas (such as the gaseous waste stream from the power plant), e.g., where the liquid feed is pumped through an atomizer into a main drying chamber and a hot gas is passed as a co-current or counter-current to the atomizer direction. Depending on the particular drying protocol of the system, the drying station may include a filtration element, freeze drying structure, spray drying structure, etc. The drying of the precipitate may include temperature between 150-180° C. or between 150-250° C., or between 150-200° C. The discharged air may include finer particles 62.

In some embodiments, the step of spray drying may include separation of different sized particles of the precipitate. For example, a first batch of larger sized particles may be collected from the spray dryer followed by the collection of the smaller sized particles. In some embodiments, a single batch may give one or more, such as, for example only, two, three, four, or five different sizes of the particles (e.g., micron and sub-micron particles as defined herein) which may be separated for later use or which different sized particle may be mixed together to make the composition of the invention.

In some embodiments, the particles with different morphologies, such as fine or agglomerated, and/or the particles with different sizes may be mixed to make the compositions of the invention. For example, a composition of the invention may include a mix of fine disperse particles with larger agglomerated particles or the composition of the invention may include a mix of particles with different sizes, e.g., particles with sizes ranging between 0.1 micron to 100 micron. In some embodiments, the composition of the invention may be modulated by mixing the particles with different particle size, surface area, zeta potential, and/or morphologies.

Where desired, the dewatered precipitate product from the separation reactor 40 may be washed before drying, as illustrated at step 50 of FIG. 1. The precipitate may be washed with freshwater, e.g., to remove salts (such as NaCl) from the dewatered precipitate. The water used for washing may contain metals, such as, iron, nickel, etc. In some embodiments, the precipitate may be rinsed with fresh water to remove halite or the chloride content from the precipitate. The chloride may be undesirable in some applications, for example, in aggregates intended for use in concrete since the chloride has a tendency to corrode rebar. In some embodiments, the precipitate may be washed with a solution having a low chloride concentration but high concentration of divalent cations (such as, calcium, magnesium, etc.). The stabilization of the metastable carbonate forms in the precipitate due to the presence of the stabilizer may prevent the dissolution of the precipitate, thereby reducing the yield loss and the conversion to cemented material. Used wash water may be disposed of as convenient, e.g., by disposing of it in a tailings pond, etc.

At step 70, the dried precipitate is the vaterite containing composition. The vaterite containing composition may be optionally activated by refining, milling, aging, and/or curing, e.g., to provide for desired physical characteristics, such as activation, particle size, surface area, zeta potential, etc. The vaterite containing composition may also be activated by adding an aragonite seed, inorganic additive or organic additive, as described herein. Further, one or more components may be added to the composition, such as admixtures, aggregate, supplementary cementitious materials, etc., to produce a final composition of the invention 80. Refinement may include a variety of different protocols. In certain embodiments, the product is subjected to mechanical refinement, e.g., grinding, in order to obtain a product with desired physical properties, e.g., particle size, etc. The dried precipitate may be milled or ground to obtain a desired particle size.

Systems

Aspects and embodiments provided herein further include systems, e.g., processing plants or factories, for producing the carbonate compound compositions, e.g., saltwater derived carbonate and hydroxide mineral compositions, and cements, as well as concretes and mortars that include the cements provided herein. Systems provided herein may have any configuration which enables practice of the particular production method of interest.

In one aspect, there is provided a system for making the composition of the invention, including (a) an input for an alkaline earth-metal containing water; (b) an input for a flue gas from an industrial plant including carbon of a fossil fuel origin; (c) an input for a stabilizer; and (d) a reactor connected to the inputs of (a), (b), and (c) that is configured to make the composition of the invention. In another aspect, there is provided a system for making a composition, including (a) an input for an alkaline earth-metal containing water; (b) an input for a $CO_2$ source; (c) an input for a stabilizer; and (d) a reactor connected to the inputs of (a), (b), and (c) that is configured to make a composition. The composition in such embodiments includes metastable carbonate and a stabilizer.

In another aspect, there are provided systems for making the composition of the invention, including (a) an input for an alkaline earth-metal containing water; (b) an input for a flue gas from an industrial plant including carbon of a fossil fuel origin; (c) an input for a stabilizer; (d) a reactor connected to the inputs of (a), (b), and (c) that is configured to make the composition comprising vaterite; and (e) an activation station to activate vaterite containing composition. In another aspect, there is provided a system for making a composition, including (a) an input for an alkaline earth-metal containing water; (b) an input for a $CO_2$ source; (c) an input for a stabilizer; (d) a reactor connected to the inputs of (a), (b), and (c) that is configured to make the composition; and (e) an activation station to activate vaterite containing composition.

Figure 3:
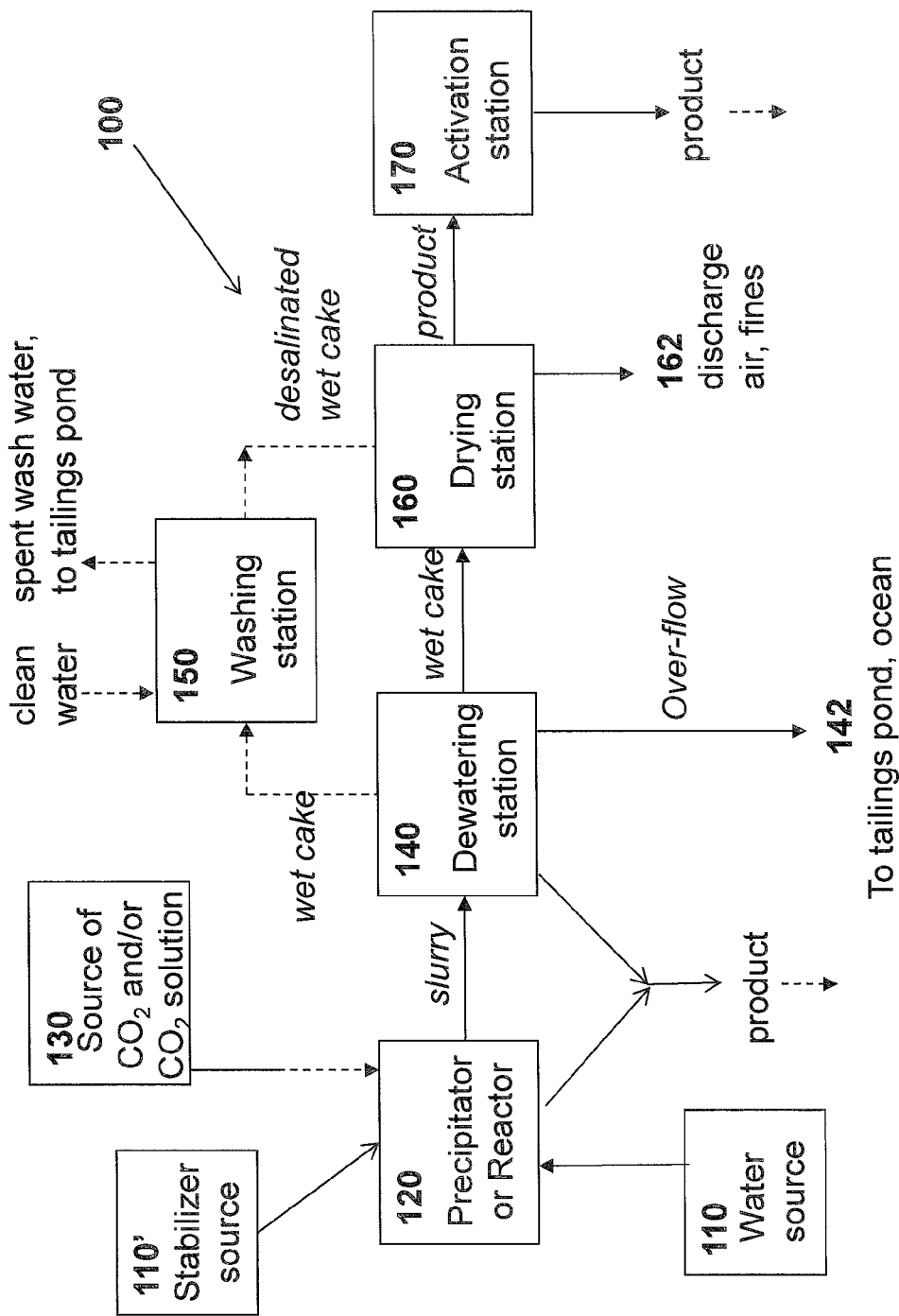
FIG. 3 illustrates a schematic of a system according to some embodiments provided herein.

FIG. 3 provides an illustrative schematic of a system to conduct the methods of some embodiments of the invention. In FIG. 3, system 100 includes water source 110, such as, alkaline earth-metal containing water. In some embodiments, water source 110 includes a structure having an input for salt water, such as a pipe or conduit from an ocean, etc. Where the salt water source is seawater, the input is in fluid communication with a source of sea water. For example, the input is a pipe line or feed from ocean water to a land based system or an inlet port in the hull of ship, e.g., where the system is part of a ship, e.g., in an ocean based system. Water may be removed and sent to the systems provided herein by any convenient protocol, such as, but not limited to, turbine motor pump, rotary lobe pump, hydraulic pump, fluid transfer pump, geothermal well pump, a water-submersible vacuum pump, among other protocols.

The methods and systems provided herein may also include one or more detectors configured for monitoring the source of water or the source of carbon dioxide (not illustrated in FIG. 1 or FIG. 2). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors for monitoring the subterranean brine may also include a computer interface which is configured to provide a user with the collected data about the water or the carbon dioxide gas. For example, a detector may determine the internal pressure of the water or the carbon dioxide gas and the computer interface may provide a summary of the changes in the internal pressure within the water or the carbon dioxide gas over time. In some embodiments, the summary may be stored as a computer readable data file or may be printed out as a user readable document.

In some embodiments, the detector may be a monitoring device such that it can collect real-time data (e.g., internal pressure, temperature, etc.) about the water or the carbon dioxide gas. In other embodiments, the detector may be one or more detectors configured to determine the parameters of the water or the carbon dioxide gas at regular intervals, e.g., determining the composition every 1 minute, every 5 minutes, every 10 minutes, every 30 minutes, every 60 minutes, every 100 minutes, every 200 minutes, every 500 minutes, or some other interval.

FIG. 3 also shows a stabilizer source 110'. This source may vary, as described above. In some embodiments, the stabilizer source 110' includes a structure having an input for the stabilizer, such as a pipe or conduit. FIG. 3 also shows a $CO_2$ source 130. This source may vary, as described above. In some embodiments, the $CO_2$ source 130 includes a structure having an input for $CO_2$, such as a pipe or conduit. Where the $CO_2$ source is flue gas from the power plant, the input is in gaseous communication with the source of $CO_2$ in the plant. For example, the input is a pipe line or feed from power plant to the system. Alternatively, the $CO_2$ source may be a cylinder or series of cylinders connected to the input for the $CO_2$ source. In some embodiments, the $CO_2$ source is a solution containing $CO_2$ obtained after contacting $CO_2$ from a source of $CO_2$ with a solution containing proton removing agent.

The inputs for the water source, alkaline earth metal ion source, the stabilizer source and the $CO_2$ source are connected to the $CO_2$ charger and precipitator reactor 120. The precipitation reactor 120 is connected to the inputs and is configured to make the carbonate precipitate. The charger and precipitation reactor 120 may be configured to include any number of different elements, such as temperature regulators (e.g., configured to heat the water to a desired temperature), chemical additive elements, e.g., for introducing chemical pH elevating agents (such as NaOH) into the water, electrolysis elements e.g., cathodes/anodes, etc. This reactor 120 may operate as a batch process or a continuous process. It is to be understood that system in FIG. 3 is for illustration purposes only and that the system may be modified to achieve the same result. For example, the system may have more than one reactor, and/or more than one source of alkaline earth metal ions, and/or more than one source of stabilizer; and/or more than one source of $CO_2$ interconnected in the system. The charger and/or reactor can be a continuous stir tank reactor (CSTR), plug flow reactor (PFR), a tank, a batch reactor, or combination thereof. Such reactors, such as, CSTR, PFR, etc. are well known in the art. In some embodiments, the reactor is PFR. The PFR may have pipes optionally with inline mixing elements to mix the solutions. In some embodiments, the turbulence in the pipe mixes the solutions without the need for mixing elements. In some embodiments, static inline mixing elements may be present inside the pipes to mix the solutions. The length and the diameter of the pipes may be modulated that may affect the mixing of the solutions, the residence time of the precipitate, the morphology of the precipitate, the particle size of the precipitate, etc. In some embodiments, the inside of the pipes in the PFR may be coated with a material that resists the build up of the precipitate inside the pipes. Such coating can be Teflon or any other material. An average flow of the solution containing the partially or fully dissolved $CO_2$ or the affluent from the absorber containing an alkaline solution of $CO_2$ to the reactor may be 4-6 GPM (gallons per minute), or 5-6 GPM, or 4-5 GPM, or 3-8 GPM. An average flow of the alkaline earth metal ion containing water to the reactor may be 8-10 GPM (gallons per minute), or 8-9 GPM, or 9-10 GPM, or 5-15 GPM.

The product of the precipitation reaction, e.g., the slurry may be removed from the reactor and used to make the self-cementing product described herein. Alternatively, the product of the precipitation reaction, e.g., the slurry is then processed at a bulk dewatering station 140, as illustrated in FIG. 3. The dewatering station 140 may use a variety of different water removal processes, including processes such as continuous centrifugation, centrifugation, filter centrifugation, gravitational settling, and the like. The slurry obtained after bulk dewatering but still wetted in a mother supernate can be used to make the self-cementing composition provided herein. The dewatering station 140 may be any number of dewatering stations connected to each other to dewater the slurry (e.g., parallel, in series, or combination thereof).

In some embodiments, systems may also include a desalination station (not illustrated in FIG. 3). The desalination station may be in fluid communication with the liquid-solid separator 140 such that the liquid product may be conveyed from the liquid-solid separator to the desalination station directly. The systems may include a conveyance (e.g., pipe) where the output depleted brine may be directly pumped into the desalination station or may flow to desalination station by gravity. Desalination stations of the invention may employ any convenient protocol for desalination, and may include, but are not limited to distillers, vapor compressors, filtration devices, electrodialyzers, ion-exchange membranes, nano-filtration membranes, reverse osmosis desalination membranes, multiple effect evaporators or a combination thereof.

The system shown in FIG. 3 may also include a drying station 160 or a series of drying stations for drying the dewatered precipitate produced at station 140. Depending on the particular drying protocol of the system, the drying station 160 may include a filtration element, freeze drying structure, oven drying, spray drying structure, etc., as described above.

Also shown in FIG. 3, is an optional washing station 150, where bulk dewatered precipitate from separation station 140 is washed, e.g., to remove salts and other solutes from the precipitate, prior to drying at the drying station 160. Dried precipitate from station 160 is then sent to activation station 170, where the precipitate may be mechanically processed and/or one or more components may be added to the precipitate (e.g., as described above) to produce the compositions containing vaterite, as provided herein. The activation station 170 may have grinders, millers, crushers, compressors, blender, etc. in order to obtain desired physical properties in the composition of the invention.

The system may further include outlet conveyers, e.g., conveyer belt, slurry pump, that allow for the removal of precipitate from one or more of the following: the contacting reactor, precipitation reactor, drying station, or from the refining station. In certain embodiments, the system may further include a station for preparing a building material, such as cement, from the precipitate. This station can be configured to produce a variety of cements, aggregates, or cementitious materials from the precipitate, such as described herein.

In some embodiments, the system includes a processing station that may include a compressor configured to pressurize the flue gas or the source of carbon dioxide, the source of alkaline earth metal ions, the reaction mixture in the reactor, the precipitate, the dewatered precipitate and/or the dried precipitate, as desired. Compressors of the invention may employ any convenient compression protocol, and may include, but not limited to, positive displacement pumps (e.g., piston or gear pumps), static or dynamic fluid compression pumps, radial flow centrifugal-type compressors, helical blade-type compressors, rotary compressors, reciprocating compressors, liquid-ring compressors, among other devices for fluid compression. In some embodiments, the compressor may be configured to pressurize to a pressure of 5 atm or greater, such as 10 atm or greater, such as 25 atm or greater, including 50 atm or greater.

In some embodiments, the systems may include a control station, configured to control the amount of the carbon dioxide or the carbon dioxide solution and/or the amount of alkaline earth metal ions and/or the amount of the stabilizer conveyed to the precipitator or the charger; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

As indicated above, the system may be present on land or sea. For example, the system may be a land based system that is in a coastal region, e.g., close to a source of sea water, or even an interior location, where water is piped into the system from a salt water source, e.g., ocean. Alternatively, the system may be a water based system, e.g., a system that is present on or in water. Such a system may be present on a boat, ocean based platform etc., as desired.

It is to be understood that the methods and the systems depicted in the figures are in no way limiting to the scope of the invention. One or more the steps in the methods may be skipped or the order of the steps may be altered to make the products and compositions of the invention. Similarly, one or more of the components in the systems may be avoided to make the products and compositions of the invention. For example, the source of cation may already be present in the reactor when the $CO_2$ source is added to the reactor, or vice versa.

III. Methods and Systems of Making a Product

Aspects of the invention also provide methods and systems for making a cement product from the compositions provided herein. The compositions provided herein may be used to make cement products such as building materials or pre-cast or formed building materials, and/or aggregates.

In one aspect, there is provided a method for making a cement product from the composition provided herein, including (a) combining the composition of the invention with an aqueous medium under one or more suitable conditions; and (b) allowing the composition to set and harden into a cement product.

In some embodiments, there is provided a method of making a product, comprising (a) contacting $CO_2$ from a $CO_2$ source with a proton removing agent to form a solution; (b) contacting the solution with an alkaline earth-metal and stabilizer containing water under one or more conditions to make a composition comprising a metastable carbonate and stabilizer; (c) combining the composition with an aqueous medium; and (d) allowing the composition to set and harden into a cement product. In some embodiments, there is provided a method of making a product, comprising (a) contacting $CO_2$ from a $CO_2$ source with a proton removing agent to form a solution; (b) contacting the solution with an alkaline earth-metal and stabilizer containing water under one or more conditions to make a composition comprising vaterite and stabilizer; (c) activating the composition comprising vaterite; (d) combining the composition with an aqueous medium; and (e) allowing the composition to set and harden into a cement product. In some embodiments, the composition after setting and hardening transforms vaterite to aragonite. In some embodiments, the methods include addition of Portland cement clinker, aggregate, SCM, or a combination thereof to the composition, before combining the composition with the aqueous medium.

In one aspect, there is provided a method for making formed building material from the compositions provided herein, such as, the hydraulic cement composition, the SCM composition, or the self-cementing composition, by combining the composition with an aqueous medium under one or more suitable conditions; and allowing the composition to set and harden into the formed building material. In some embodiments, the composition is poured into molds before or after combining the composition with water. In some embodiments, the mold is for the formed building material. In some embodiments, the aqueous medium includes fresh water.

In some embodiments, there is provided a method of producing a cement product from the composition provided herein by obtaining the composition; and producing a cement product. In some embodiments the obtaining step comprises precipitating the composition from a divalent cation-containing water, e.g., an alkaline-earth-metal-ion containing water such as salt water, e.g., sea water. The obtaining step may further comprise contacting the divalent cation-containing water, e.g., alkaline-earth-metal-ion containing water, to an industrial gaseous waste stream including $CO_2$ or a solution containing $CO_2$ prior to, and/or during, the precipitating step. The industrial gaseous waste stream may be any stream as described herein, such as from a power plant, foundry, cement plant, refinery, or smelter, e.g. a flue gas. In some embodiments the obtaining step further comprises raising the pH of the alkaline-earth-metal-ion containing water to 10 or higher prior to or during the precipitating step. The producing step may include allowing the composition to form a solid product, such as by mixing the composition with an aqueous medium including, but not limited to, one or more of fresh water, Portland cement, fly ash, lime and a binder, and optionally mechanically refining the solid product, such as by molding, extruding, pelletizing or crushing. The producing step may include contacting the composition with fresh water to convert the polymorphs in the composition to a freshwater stable product. In some embodiments, this may be done by spreading the composition in an open area; and contacting the spread composition with fresh water.

In some embodiments, the aggregate producer comprises a refining station to mechanically refine the aggregate made from the composition provided herein.

In some embodiments, the composition provided herein after mixing in the water is poured into the molds designed to make one or more of the pre-formed building material. The composition is then allowed to set and harden into the pre-formed or pre-cast material.

In some embodiments, the composition provided herein, as prepared by the methods described above, is treated with the aqueous medium under one or more suitable conditions. The aqueous medium includes, but is not limited to, fresh water optionally containing sodium chloride, calcium chloride, magnesium chloride, or combination thereof or aqueous medium may be brine. In some embodiments, aqueous medium is fresh water.

In some embodiments, the one or more suitable conditions include, but are not limited to, temperature, pH, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

In some embodiments, the ratio of the aqueous medium to the dry components or to the composition of the invention (aqueous medium:dry components or aqueous medium:composition of the invention) is 0.1-10; or 0.1-8; or 0.1-6; or 0.1-4; or 0.1-2; or 0.1-1; or 0.2-10; or 0.2-8; or 0.2-6; or 0.2-4; or 0.2-2; or 0.2-1; or 0.3-10; or 0.3-8; or 0.3-6; or 0.3-4; or 0.3-2; or 0.3-1; or 0.4-10; or 0.4-8; or 0.4-6; or 0.4-4; or 0.4-2; or 0.4-1; or 0.5-10; or 0.5-8; or 0.5-6; or 0.5-4; or 0.5-2; or 0.5-1; or 0.6-10; or 0.6-8; or 0.6-6; or 0.6-4; or 0.6-2; or 0.6-1; or 0.8-10; or 0.8-8; or 0.8-6; or 0.8-4; or 0.8-2; or 0.8-1; or 1-10; or 1-8; or 1-6; or 1-4; or 1-2; or 1:1; or 2:1; or 3:1.

In some embodiments, the precipitate may be rinsed with fresh water to remove halite or the chloride content from the precipitate. The chloride may be undesirable in some applications, for example, in aggregates intended for use in concrete since the chloride has a tendency to corrode rebar.

In some embodiments, such rinsing may not be desirable as it may reduce the yield of the composition. In such embodiments, the precipitate may be washed with a solution having a low chloride concentration but high concentration of divalent cations (such as, calcium, magnesium, etc.). Such high concentration of the divalent ion may prevent the dissolution of the precipitate, thereby reducing the yield loss and the conversion to cemented material.

During the mixing of the composition with the aqueous medium, the precipitate may be subjected to high shear mixer. After mixing, the precipitate may be dewatered again and placed in pre-formed molds to make formed building materials. Alternatively, the precipitate may be mixed with water and is allowed to set. The precipitate sets over a period of days and is then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The precipitate is then subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

The cement product produced by the methods described above may be an aggregate or building material or a pre-cast material or a formed building material. These materials have been described herein.

In yet another aspect, there is provided a system for making the cement product from the composition provided herein including (a) an input for the composition provided herein; (b) an input for an aqueous medium; and (c) a reactor connected to the inputs of step (a) and step (b) configured to mix the composition provided herein with the aqueous medium under one or more of suitable conditions to make a cement product. In some embodiments, the system further comprises a filtration element to filter the composition after the mixing step (c). In still some embodiments, the system further comprises a drying step to dry the filtered composition to make the cement product.

Figure 4:
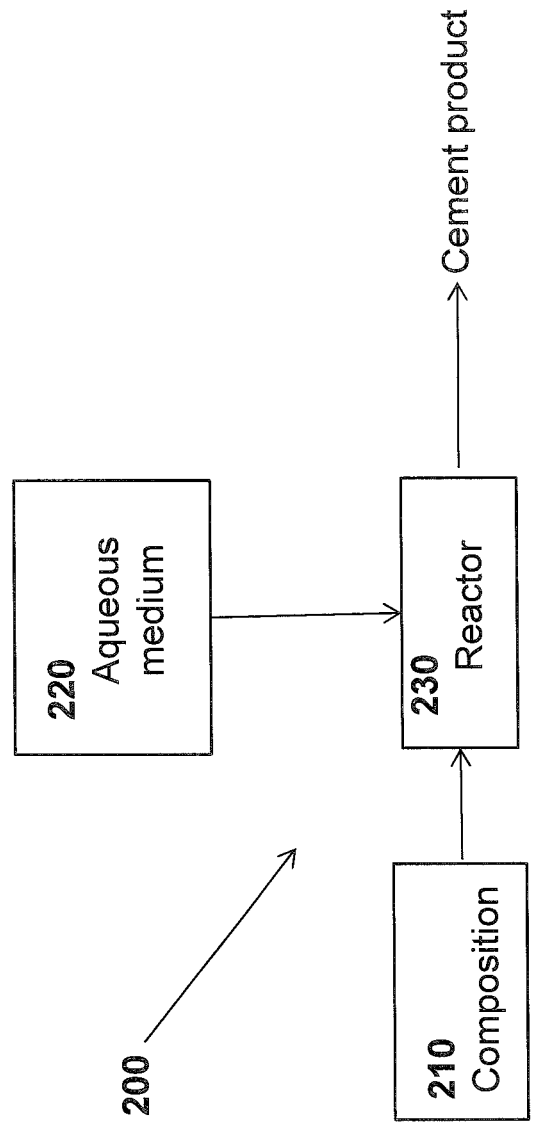
FIG. 4 illustrates a schematic of a system according to some embodiments provided herein.

FIG. 4 shows an illustrative system embodiment 200 to make the cement product from the composition provided herein. In some embodiments, system 200 includes a source for the composition provided herein 210. In some embodiments, the source for the composition includes a structure having an input for the composition. Such structure having an input includes, but is not limited to, a funnel, a tube, a pipe or a conduit, etc. Any input that can facilitate the administration of the composition to the reactor 230 is within the scope of the invention. It is well understood that in some embodiments, no such source for the composition or the structure with an input for the composition is needed, when the composition is already present in the reactor 230. In some embodiments, there is provided a source for aqueous medium 220 such as, water optionally containing sodium chloride, calcium chloride, magnesium chloride, or combination thereof or brine. In some embodiments, the source for the aqueous medium 220 contains an input for the aqueous medium, such as, but not limited to, a funnel, a tube, a pipe or a conduit, etc. Any input that can facilitate the administration of the aqueous medium to the reactor 230 is within the scope of the invention. It is well understood that in some embodiments, no such source for the aqueous medium or the structure with an input for the aqueous medium is needed, when the aqueous medium is already present in the reactor 230.

The reactor 230 is connected to the two inputs and is configured to mix the composition with the aqueous medium under one or more of suitable conditions to make a cement product. The one or more suitable conditions have been defined above. The reactor 230 may be configured to include any number of different elements, such as temperature regulators (e.g., configured to heat the water to a desired temperature), chemical additive elements, e.g., for introducing chemical pH elevating agents (such as NaOH) into the water. This reactor 230 may operate as a batch process or a continuous process. The system may optionally contain a filtration element to filter the composition after wetting (not shown in FIG. 4).

After the addition of water to the composition in the reactor, the composition sets and hardens into the cement product. The cement product may optionally be dried and cured.

In one aspect, there is provided a method to make a cementitious composition with desired stability of the metastable carbonate, including a) contacting $CO_2$ with a proton removing agent to form a solution; b) contacting the solution with alkaline earth metal ions to form a carbonate precipitate; and c) contacting a stabilizer at one or more steps selected from the group consisting of contacting with the solution before step b), contacting with the alkaline earth metal ions before contacting with the solution; contacting with the alkaline earth metal ions after contacting with the solution; and contacting with the carbonate precipitate. In some embodiments, the amount of stabilizer is between 0.1-5% w/w. In some embodiments, the optimization of the amount of the stabilizer result sin the optimization of the stability of the metastable carbonate. In some embodiments, the optimization of the amount of the stabilizer results in the optimization of the stability of the metastable carbonate. In some embodiments, the optimization of the step at which the stabilizer is added results in the optimization of the stability of the metastable carbonate.

IV. Packages

In one aspect, there is provided a package including the composition provided herein. In some embodiments, there is provided a package including a pre-cast or a formed building material formed from the composition provided herein. These pre-cast or formed building materials are as described herein. The package further includes a packaging material that is adapted to contain the composition. The package may contain one or more of such packaging materials. The packaging material includes, but is not limited to, metal container; sacks; bags such as, but not limited to, paper bags or plastic bags; boxes; silo such as, but not limited to, tower silo, bunker silo, bag silo, low level mobile silo, or static upright cement silo; and bins. It is understood that any container that can be used for carrying or storing the composition provided herein is well within the scope of the invention.

In some embodiments, these packages are portable. In some embodiments, these packages and/or packaging materials are disposable or recyclable.

The packaging material are further adapted to store and/or preserve the composition provided herein for longer than few months to few years. In some embodiments, the packaging materials are further adapted to store and/or preserve the composition of the invention for longer than 1 week, or longer than 1 month, or longer than 2 months, or longer than 5 months, or longer than 1 year, or longer than 2 years, or longer than 5 years, or longer than 10 years, or between 1 week to 1 year, or between 1 month to 1 year, or between 1 month to 5 years, or between 1 week to 10 years.

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

EXAMPLES

Example 1

Stabilizing the Composition in the Presence of Stabilizer

This example is related to the study of the stability of the composition in the presence of a stabilizer, such as, sulfate. In this study, four samples of the cementitious composition were taken, sample A, sample B, sample C, and sample D. All the samples were prepared using a carbon dioxide solution formed by passing a gaseous stream of carbon dioxide in a solution containing a proton removing agent, such as sodium hydroxide. The carbon dioxide charged solution was then contacted with the solution containing alkaline earth metal ions. Sample A was prepared from sea water with added calcium chloride to it. Sample B was prepared from municipal water with added calcium chloride to it. Sample C was prepared from water containing calcium chloride and sodium sulfate where the sulfate ions were 1000 ppm, calcium ions were 8000 ppm and magnesium ions were 70 ppm. Sample D was prepared from water containing calcium chloride and sodium sulfate where the sulfate ions were 800 ppm, calcium ions were 15,000 ppm and magnesium ions were 15 ppm. Sample A was found to be reactive; sample B was found to be stable; sample C was found to be super stable; and sample D was found to be semi-stable. The stability of the samples was determined based on preliminary screening results including testing for phase transformation and scanning electron microscopy (SEM) images.

Figure 5:
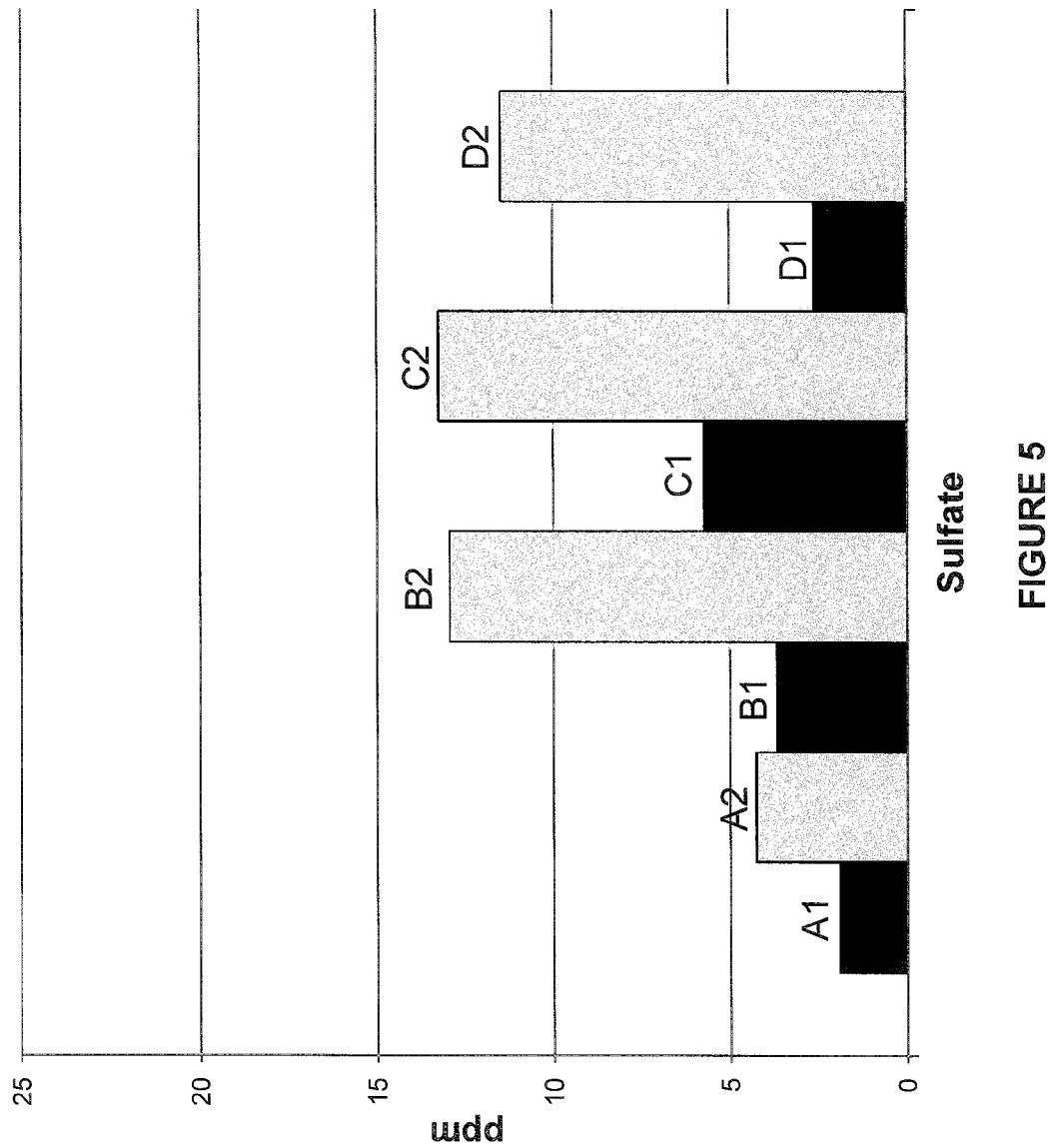
FIG. 5 illustrates data obtained in an experiment described in Example 1.

Experiment 1: In this experiment, the four samples were subjected to leaching as well as digestion experiments. In the leaching process, 100 mg of the sample was mixed with 100 mL of DI water. The suspension was shaken for 10 mins. The solid was then filtered with 0.2 μm paper and the filtrate was analyzed with IC (ion chromatography) for sulfate content. In the digestion process, 100 mg of the sample was mixed with 1.5 mL of methane sulfonic acid (MSA). The solution was brought to 100 mL with DI water. The solid was then filtered with 0.2 μm paper and the filtrate was analyzed with IC (ion chromatography) for sulfate content. FIG. 5 illustrates the amount of sulfate found in the filtrate after the leaching (A1 for sample A; B1 for sample B; C1 for sample C; and D1 for sample D) and the digestion process (A2 for sample A; B2 for sample B; C2 for sample C; and D2 for sample D) for all the four samples. Sample A which was a reactive sample was found to have minimum amount of sulfate content in the filtrate (A1 and A2). Sample B (stable), sample C (super stable) and sample D (semi-stable) were found to have higher content of sulfate in the filtrate with the super stable sample C being the highest (C1 and C2). This study shows that there is a correlation between the content of the sulfate in the sample and the stability of the sample.

Figure 6:
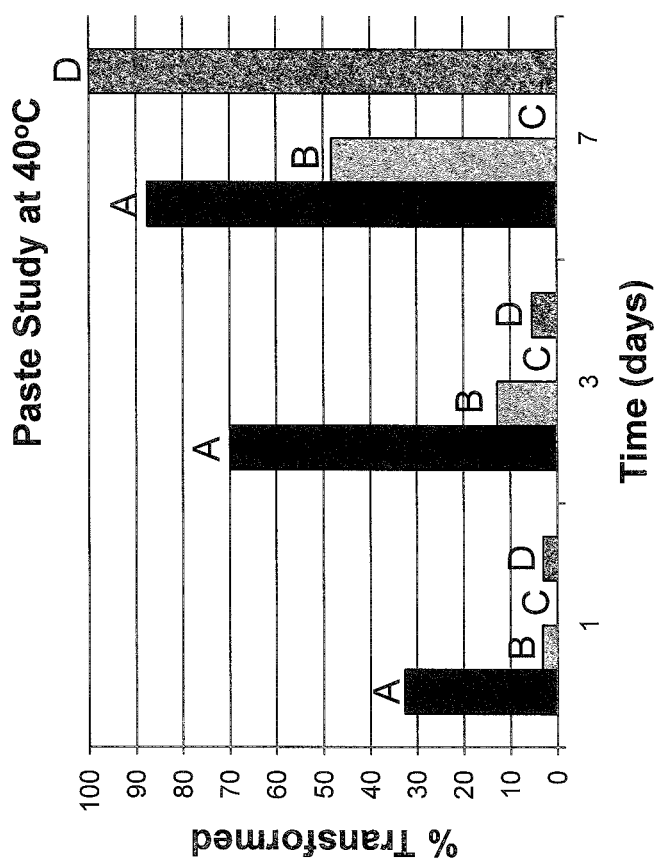
FIG. 6 illustrates data obtained in an experiment described in Example 1.

Experiment 2: In this experiment, all the four samples were mixed with water and were kept at 40° C. for 7 days. All the four samples were analyzed for phase transformation at 1 day, 3 days, and 7 days period. FIG. 6 illustrates that the sample C which was the super stable sample showed no transformation, whereas the reactive sample A consistently transformed during 7 day period. Sample D, however, transformed to calcite. This study shows that the sample with highest sulfate content (as shown in Experiment 1) shows super stability with no transformation and the sample with lowest sulfate content shows maximum transformation. Therefore, the amount of the stabilizer present in the composition affects the degree of stability of the metastable form in the composition.

Figure 7:
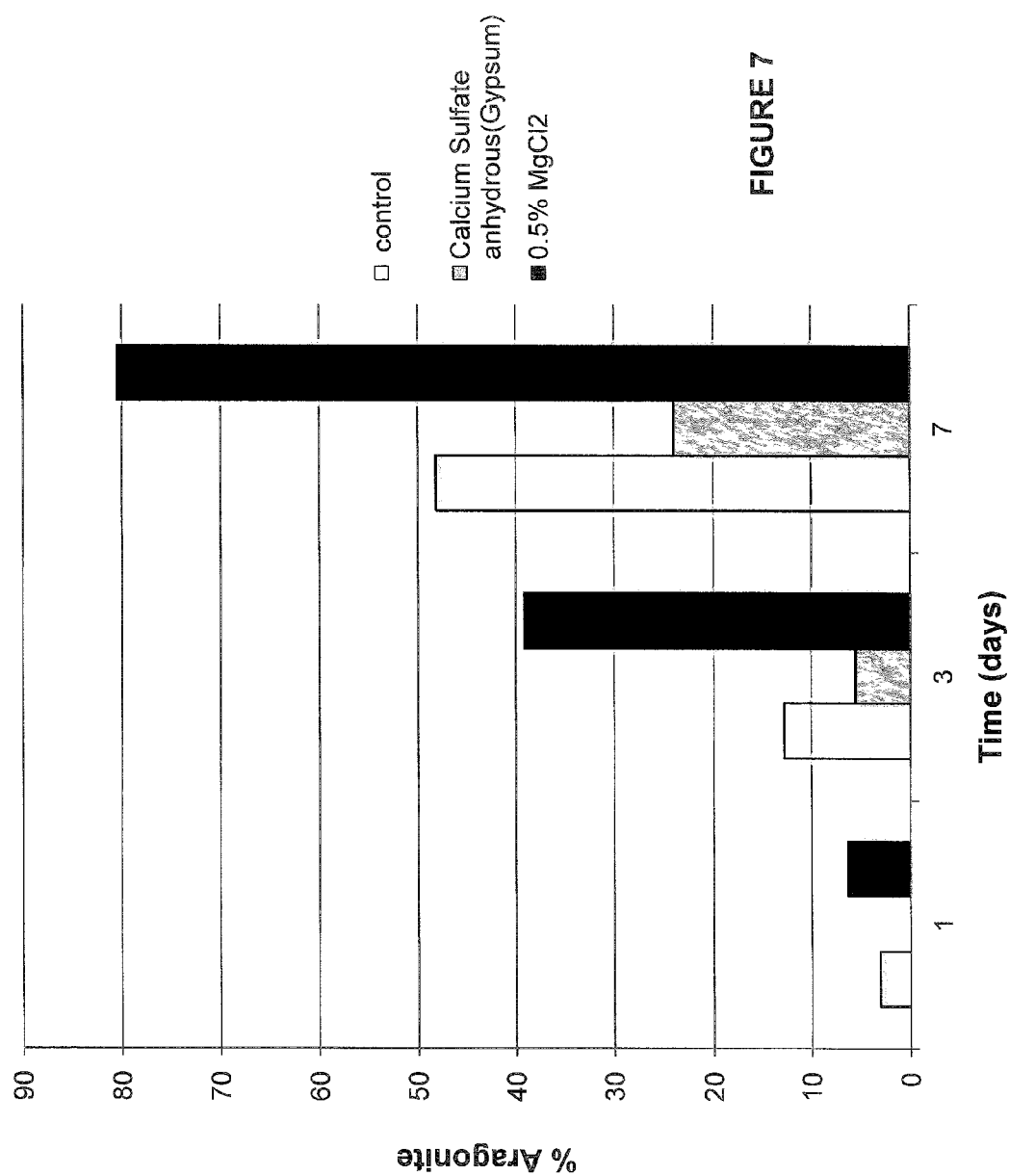
FIG. 7 illustrates data obtained in an experiment described in Example 1.

Experiment 3: In this experiment, sample B was treated with 0.5% gypsum ($CaSO_4$) which acts as a stabilizer and with 0.5% magnesium chloride ($MgCl_2$). FIG. 7 illustrates the effect of the stabilizer on the phase transformation of sample B over a period of 7 days. The white bar is the control sample B without gypsum or $MgCl_2$ added to it. FIG. 7 shows that gypsum (i.e. sulfate ions) prevents the phase transformation in sample B as compared to magnesium chloride. Therefore, the study shows that the stabilizer can affect the stability of the metastable form in the composition.

Figure 8:
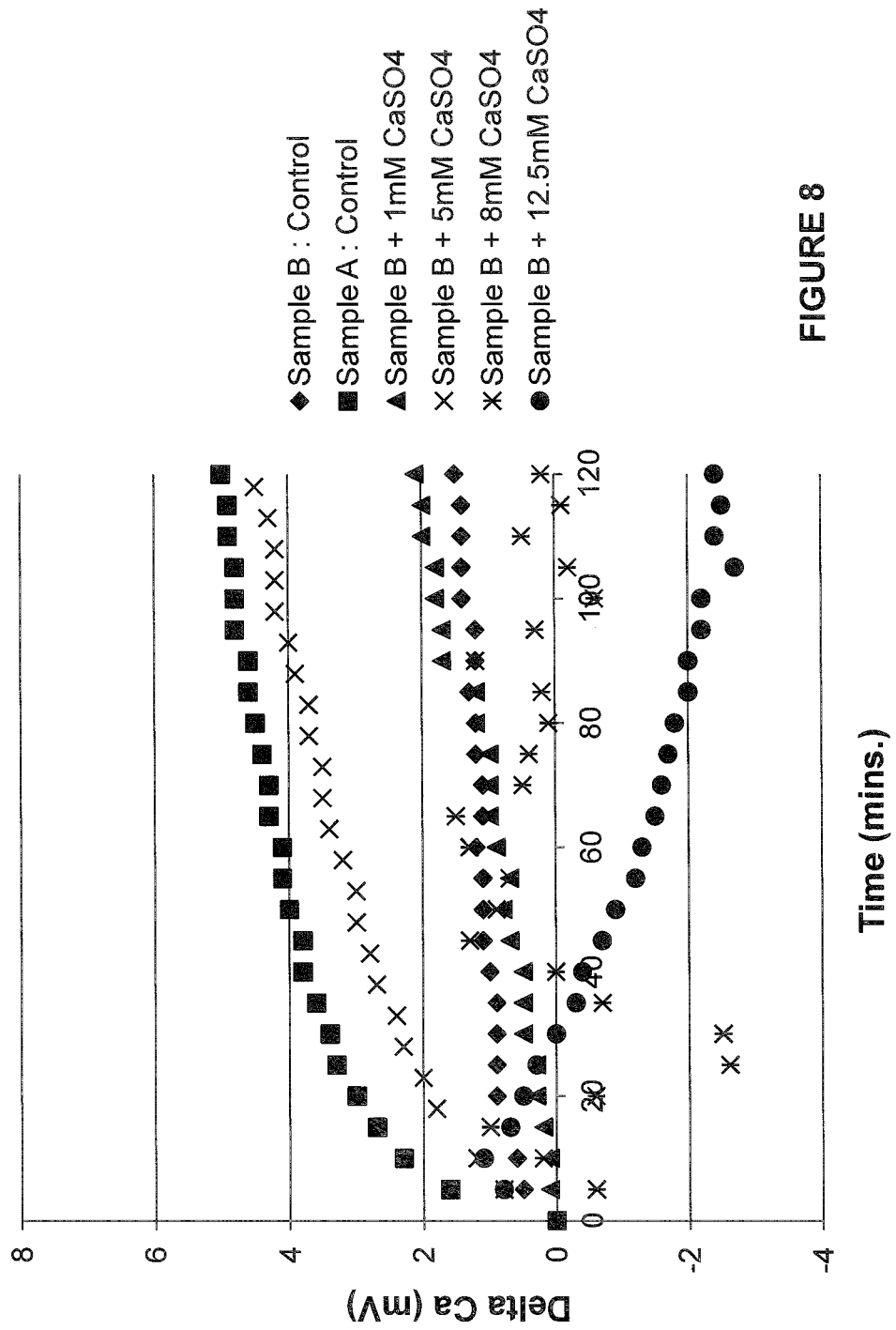
FIG. 8 illustrates data obtained in an experiment described in Example 1.

Experiment 4: In this experiment, sample B was treated with varying amounts of calcium sulfate ($CaSO_4$) to study the dissolution of calcium carbonate at room temperature. As described herein, the dissolution of calcium carbonate and re-precipitation leads to phase transformation. FIG. 8 shows that as the amount of calcium sulfate was increased, the dissolution of calcium carbonate decreased. This study further demonstrates that the stabilizer and the amount of the stabilizer can affect the stability of the polymorphic form of the carbonate in the composition.

Example 2

Effect of Ca:CO$_3$ Ratio on the Stabilizer

This example is related to the study of the effect of Ca:CO$_3$ ratio on the stabilizer for stabilizing the metastable carbonate in the composition. In this experiment, various concentrations of calcium compound and carbonate compound were used to from calcium carbonate precipitate with varying Ca:CO$_3$ ratio. The amount of sodium sulfate was also varied to study the effect of sulfate on the stability of vaterite formed in the composition. In addition, 10 mM magnesium was added in all the experiments. The precipitate was vacuum filtered and dried at 60° C. The precipitate was analyzed using XRD, SEM etc. Table II illustrates parameters for such experiments and the % of vaterite formed. The results demonstrate that in general, as the molar ratio of Ca:CO$_3$ increased and as the amount of stabilizer increased, the amount of metastable phase, i.e. vaterite, in the precipitate also increased.

TABLE II

| Ca:CO$_3$ (molar ratio) | SO$_4$ conc. (mM) | % V |
|---|---|---|
| 1.1 | 2 | 59.8 |
| 1.3 | 2 | 66.8 |
| 1.6 | 2 | 82.5 |
| 1.1 | 4 | 47.9 |
| 1.3 | 4 | 92.8 |
| 1.6 | 4 | 91.6 |
| 1.1 | 8 | 99.7 |
| 1.3 | 8 | 60.7 |
| 1.6 | 8 | 89.7 |
| 1.1 | 16 | 97.7 |
| 1.3 | 16 | 99.2 |
| 1.6 | 16 | 77.7 |

Figure 9:
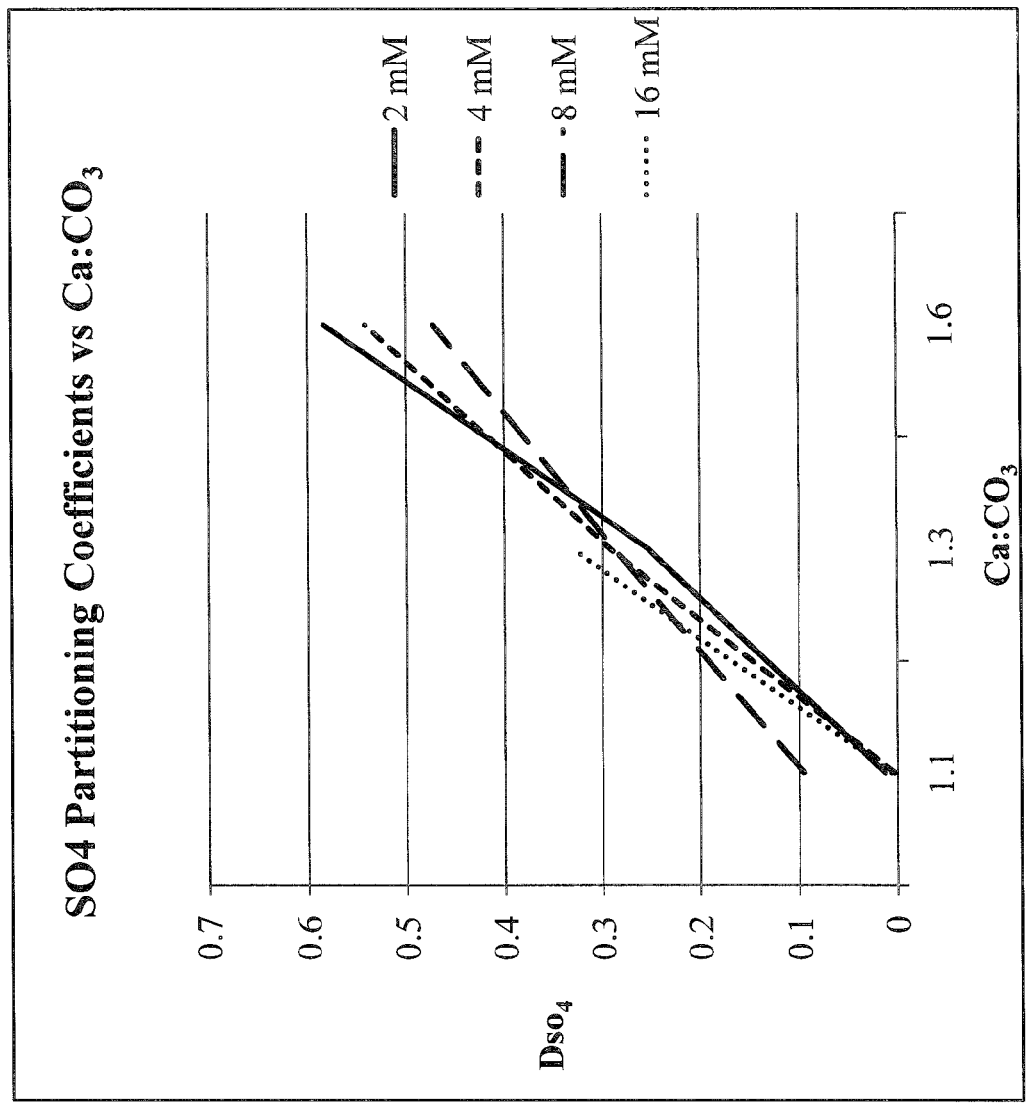
FIG. 9 illustrates data obtained in an experiment described in Example 2.

It was also found that the molar ratio of calcium to carbonate may influence the partitioning of sulfate into the bulk solid or into the cementitious composition. FIG. 9 illustrates that while sulfate concentration itself does not have a strong influence on the partitioning coefficient of sulfate, the variation in Ca:CO$_3$ does influence partitioning coefficient of sulfate. The partition coefficient (D$_{SO4}$) was found to positively correlate with the excess of calcium in the precipitations.

Example 3

Nuclei Activation of Vaterite by Seeding

In this experiment, two samples of vaterite were used as controls as well as for nuclei activation, such as seeding of vaterite with aragonite. Sample "reactive" vaterite contained about 85% vaterite and the remaining as calcite. The sample "reactive" was prepared from sea water and the carbon dioxide solution (absorbing flue gas in sodium hydroxide solution). Sample "stable" vaterite contained about 85% vaterite and the remaining as calcite. The sample "stable" vaterite was prepared from process water and the carbon dioxide solution (absorbing flue gas in sodium hydroxide solution). The "reactive vaterite" transformed readily to aragonite upon dissolution-reprecipitation process whereas the "stable vaterite" did not significantly transform to aragonite upon dissolution-reprecipitation in water. The "stable" and the "reactive" samples were used as controls.

The "stable" vaterite sample was mixed with 3% aragonite from three different sources. In one case, the aragonite was obtained from reef sand containing about 60-70% aragonite. In second case, the aragonite was obtained by mixing sodium carbonate with calcium chloride at 40-50° C. that resulted in aragonite precipitate ("precipitated aragonite" in FIG. 10). In the third case, the aragonite was obtained by grounding the aragonite mass formed by transformation of vaterite ("aragonite from reactive" in FIG. 10).

Figure 10:
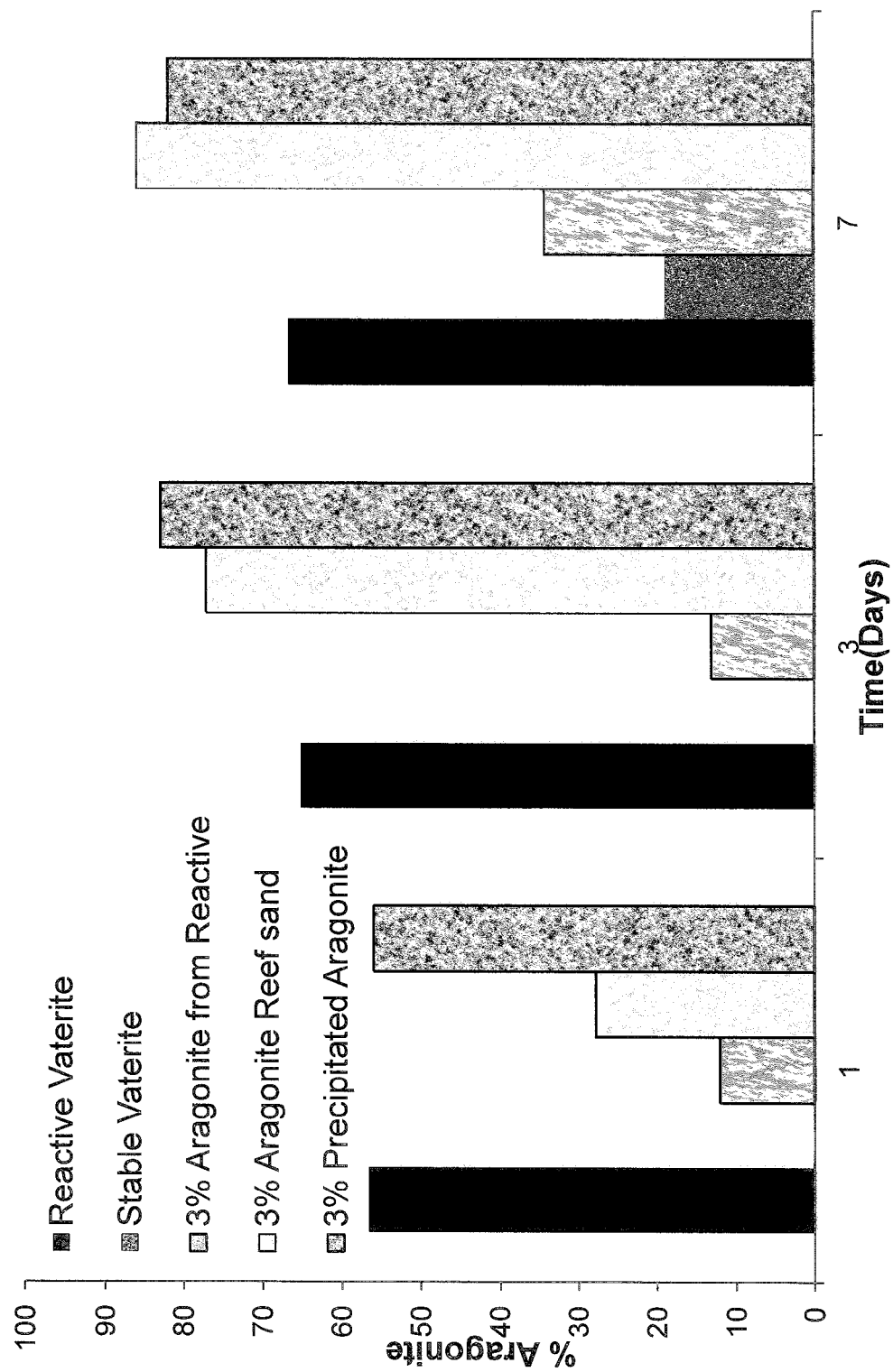
FIG. 10 illustrates data obtained in an experiment described in Example 3.

To the "stable" sample with aragonite from three different sources, was added water in 0.6 water/solid (w/s) ratio. The paste was cured at 40° C. FIG. 10 illustrates the transformation of "reactive" vaterite; "stable" vaterite; and "stable" vaterite mixed with three different aragonitic seeds, to aragonite over a period of 1-7 days. FIG. 10 shows that while the control "stable" vaterite did not show significant transformation to aragonite over a period of 7 days, the "stable" vaterite when seeded with "precipitated aragonite" or "aragonite from reactive" or "aragonite from reef sand", transformed to aragonite after dissolution-reprecipitation process (comparable to "reactive" vaterite sample alone).

Example 4

Thermal Activation of Vaterite

Figure 11:
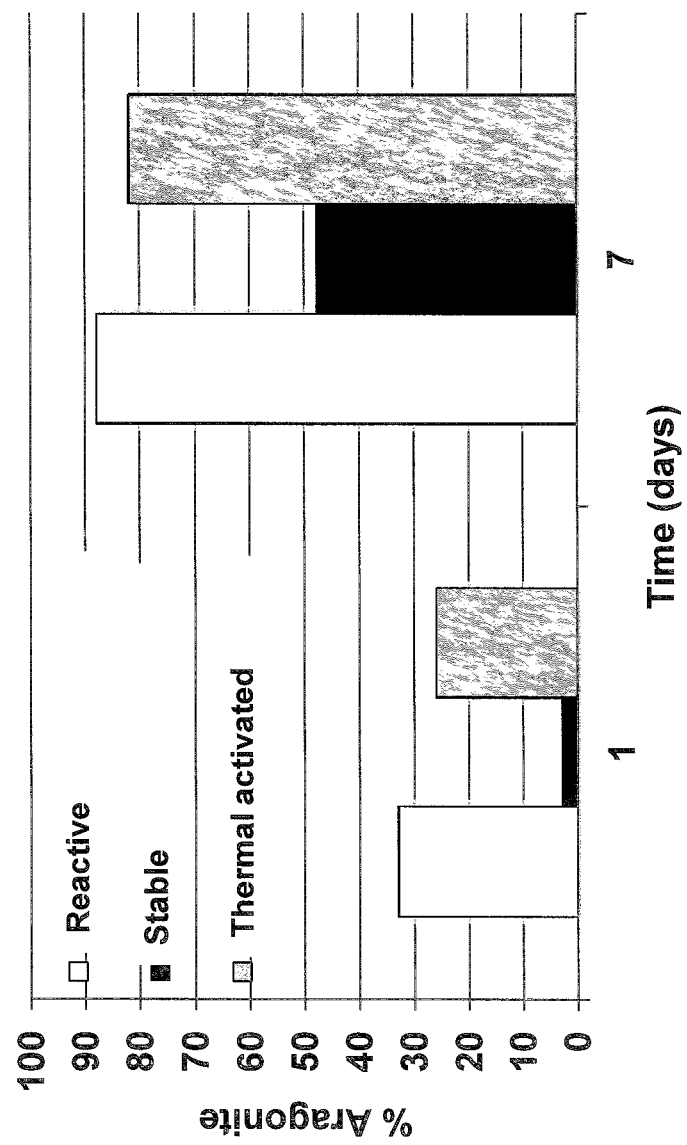
FIG. 11 illustrates data obtained in an experiment described in Example 4.

In this experiment, the "stable" and "reactive" vaterite samples of Example 3 were used as controls in the experiment for conducting a thermal activation of the vaterite sample. The "stable" vaterite sample was mixed with water at 0.6 w/s ratio and was immediately kept in oven at 110° C. for 1 hr. After 1 hr the sample was kept at 40° C. for 7 days. The control samples, "stable" and "reactive" vaterite samples, were mixed with water in the same ratio and were kept at 40° C. for the same time period. FIG. 11 illustrates the transformation of the two control samples and the heat activated "stable" vaterite sample. FIG. 11 shows that the heat activated "stable" vaterite sample showed accelerated transformation to aragonite as compared to control "stable" vaterite sample. It is contemplated that high temperature may result in aragonite seeding in the paste which may lead to accelerated aragonite formation upon cementation.

Example 5

Chemical Activation of Vaterite

Figure 12:
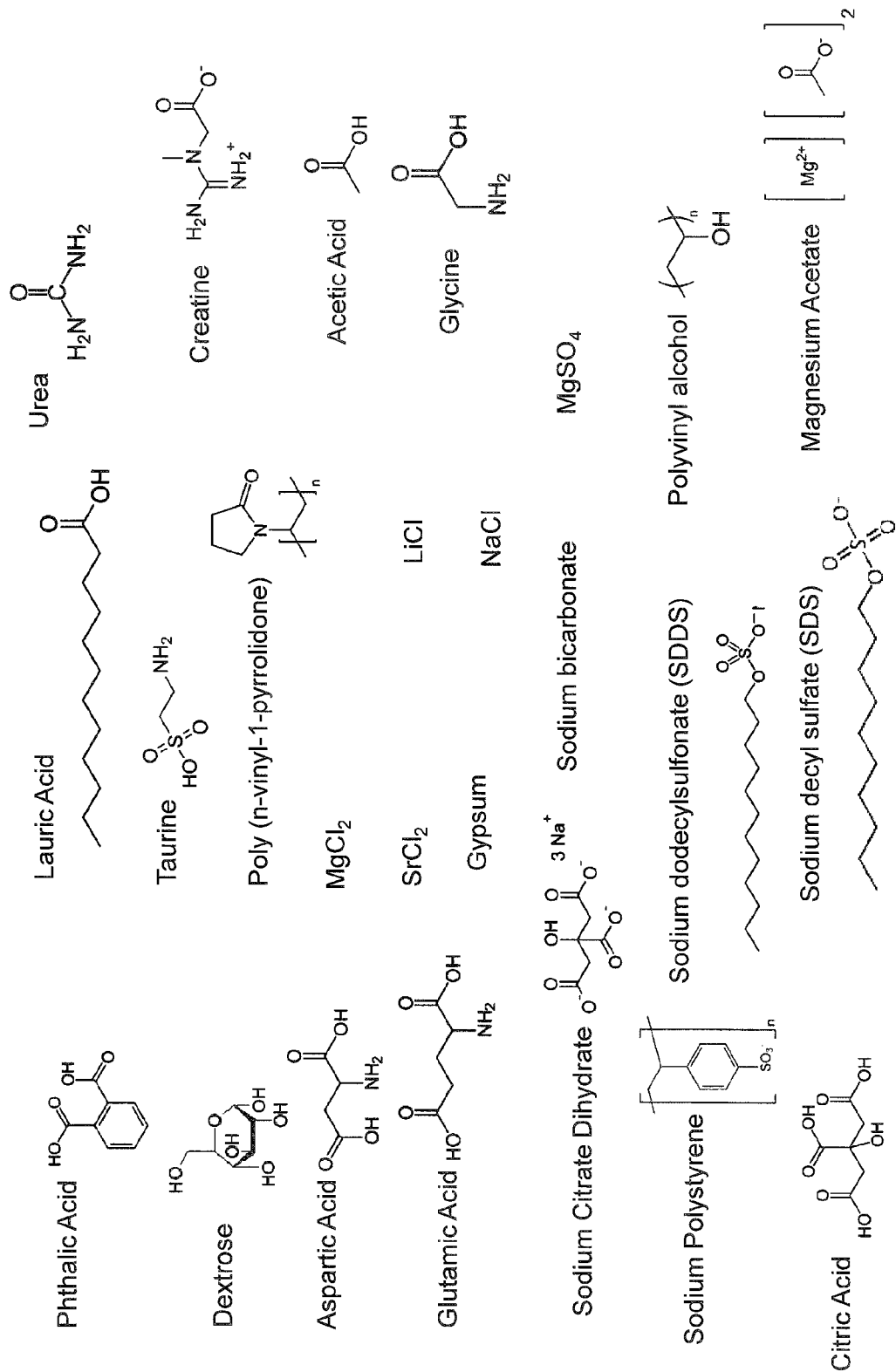
FIG. 12 illustrates data obtained in an experiment described in Example 5.
Figure 13:
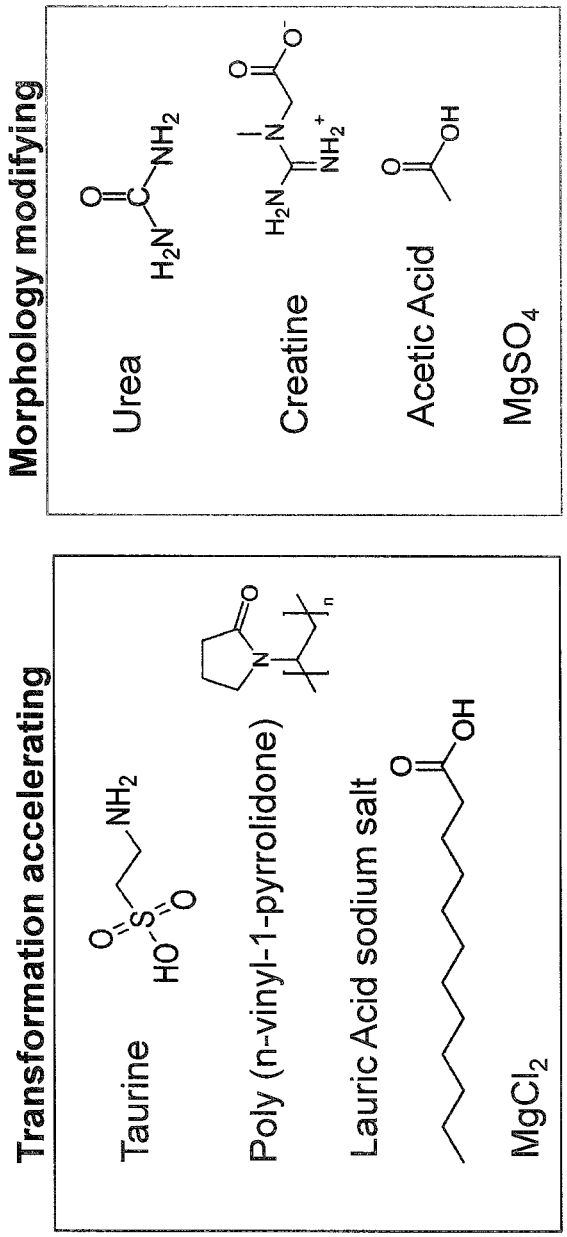
FIG. 13 illustrates data obtained in an experiment described in Example 5.

In this experiment, the "stable" vaterite sample of Example 3 was screened with chemicals shown in FIG. 12. The chemical added to the "stable" vaterite sample was in 0.0005-0.5% by weight. The sample mixed with the chemical was then mixed with water in 1:1 w/s ratio. The paste was allowed to cure at 60° C., 100% RH chamber and tested at 1, 3, and 7 days for phase composition using X-Ray diffraction and microstructure development using scanning electron microscopy. The results were compared to the results of the vaterite material mixed with ultra-pure water. FIG. 13 shows that some chemicals (shown in two boxes) resulted in accelerated transformation of vaterite to aragonite and morphology modification such as thinner needle aspect ratio of aragonite crystals (leading to better cross linking and compressive strength). Table III shows that phthalic acid (>0.5 wt %), L-aspartic acid (>0.5 wt %), L-glutamic acid (>0.5 wt %), and citric acid (>0.05 wt %) acted as stabilizers and stabilized and inhibited the vaterite material (V) from transforming to aragonite (A). The calcite is shown as C in the table. Table IV shows that $MgCl_2$ (>0.05 wt %) and PVP (>0.0005 wt %) acted as activators and accelerated the transformation of vaterite to aragonite, forming more aragonite (20-40% at 3 days) at early-age compared to ultra-pure water (~15% at 3 days).

TABLE III

| Mix solution | 1-Day | | | 3-Day | | | 7-Day | | |
|---|---|---|---|---|---|---|---|---|---|
| | % V | % A | % C | % V | % A | % C | % V | % A | % C |
| Baseline (Ultra-Pure Water) | 80 | 3.1 | 16.9 | 68.9 | 12.8 | 18.4 | 32.5 | 48.2 | 19.3 |
| Phthalic Acid (0.05% in DI) | 84.9 | 0 | 15.1 | 74.4 | 8.5 | 17.1 | 48.7 | 33.2 | 18.2 |
| Phthalic Acid (0.5% in DI) | 87.5 | 0 | 12.5 | 87.7 | 0 | 12.3 | 86.5 | 2.1 | 11.4 |
| Phthalic Acid (3% in DI) | 87.9 | 0 | 12.1 | 87.7 | 0 | 12.3 | 87 | 0 | 13 |
| L-Aspartic Acid (0.05% in DI) | 83.6 | 1.9 | 14.5 | 76.7 | 6.4 | 16.9 | N/A | N/A | N/A |
| L-Aspartic Acid (0.5% in DI) | 87.7 | 0 | 12.3 | 86.9 | 0 | 13.1 | N/A | N/A | N/A |
| L-Aspartic Acid (3% in DI) | 88.4 | 0 | 11.6 | 87 | 0 | 13 | N/A | N/A | N/A |
| L-Glutamic Acid (0.05% in DI) | 85.1 | 0 | 14.9 | 80.4 | 0 | 19.6 | 71.8 | 9.1 | 19.1 |
| L-Glutamic Acid (0.5% in DI) | 87.7 | 0 | 12.3 | 86.3 | 0 | 13.7 | 86 | 0 | 14 |
| L-Glutamic Acid (3% in DI) | 87.3 | 0 | 12.7 | 85.4 | 0 | 14.6 | 87.9 | 0 | 12.1 |
| Citric Acid (0.0005% in DI) | 81.9 | 2.3 | 15.8 | 64.2 | 16.1 | 19.8 | 16.4 | 60.8 | 22.8 |
| Citric Acid (0.005% in DI) | 82.8 | 0 | 17.2 | 71.9 | 6.7 | 21.4 | 49.8 | 27.6 | 22.6 |
| Citric Acid (0.05% in DI) | 83.1 | 1.4 | 15.5 | 77.5 | 0 | 22.5 | 71.7 | 0 | 28.3 |
| Citric Acid (0.5% in DI) | 86.5 | 0 | 13.5 | 86.7 | 0.5 | 12.8 | 85.6 | 0 | 14.4 |

TABLE IV

| | 1-Day | | | 3-Day | | | 7-Day | | |
|---|---|---|---|---|---|---|---|---|---|
| | % V | % A | % C | % V | % A | % C | % V | % A | % C |
| Baseline (Ultra-Pure Water) | 80 | 3.1 | 16.9 | 68.9 | 12.8 | 18.4 | 32.5 | 48.2 | 19.3 |
| MgCl2 (0.0005% in DI) | 79.8 | 3.6 | 16.6 | 66 | 15.9 | 18.1 | 15.9 | 61.2 | 21.6 |
| MgCl2 (0.005% in DI) | 80.2 | 3.9 | 15.9 | 67.2 | 15.1 | 17.8 | 20.2 | 58.5 | 20.7 |
| MgCl2 (0.05% in DI) | 81.7 | 3.6 | 14.6 | 62.9 | 21.5 | 15.5 | 4.5 | 76.2 | 18.5 |
| MgCl2 (0.5% in DI) | 80.2 | 6.3 | 13.5 | 47 | 39.2 | 13.8 | 2.4 | 80.5 | 15.7 |
| Poly (N-vinyl-1-pyrrolidine) (0.0005% in DI) | 78.6 | 5.4 | 16 | 55.9 | 27.5 | 16.5 | 3.6 | 76.8 | 19.6 |
| Poly (N-vinyl-1-pyrrolidine) (0.005% in DI) | 78.4 | 7 | 14.6 | 52.8 | 32.9 | 14.3 | 2.8 | 79.2 | 18 |
| Poly (N-vinyl-1-pyrrolidine) (0.05% in DI) | 80.5 | 3.5 | 16.1 | 64.5 | 18.2 | 17.3 | 14.6 | 64.8 | 20.6 |
| Poly (N-vinyl-1-pyrrolidine) (0.5% in DI) | 79.1 | 4.9 | 16 | 57.3 | 27 | 15.7 | 5 | 76.7 | 18.4 |

Example 6

Mechanical Activation of Vaterite

Figure 14:
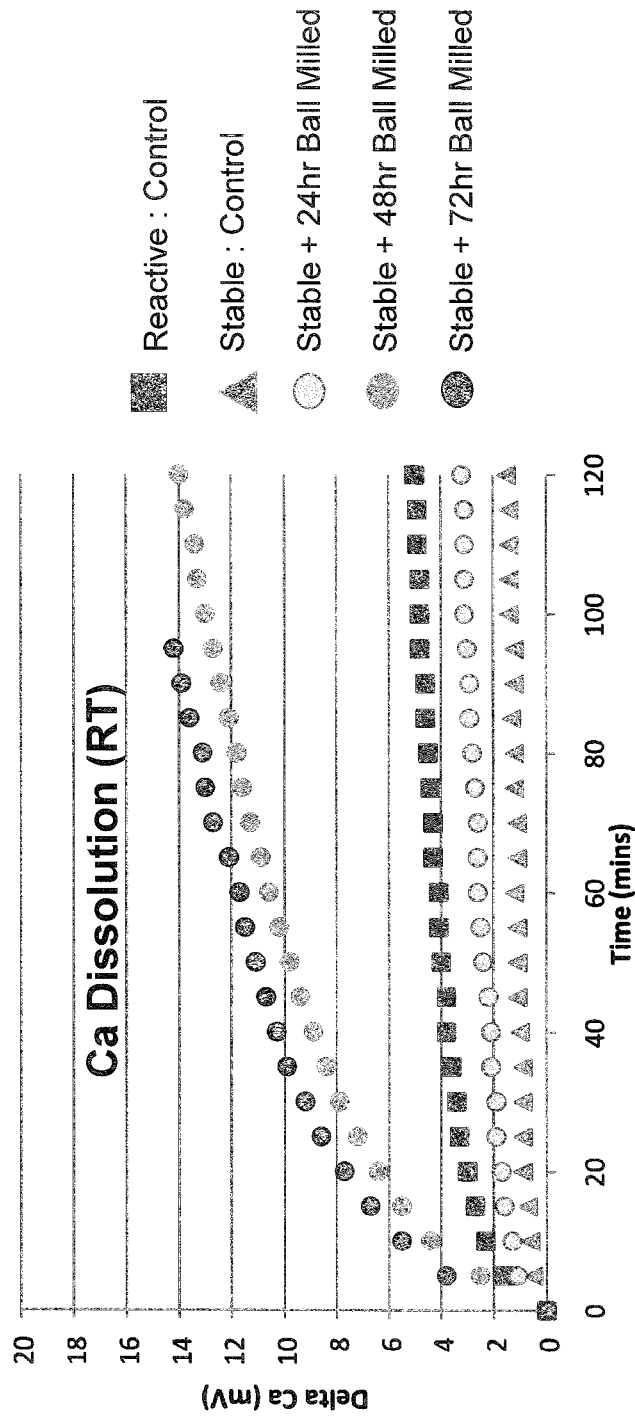
FIG. 14 illustrates data obtained in an experiment described in Example 6.
Figure 15:
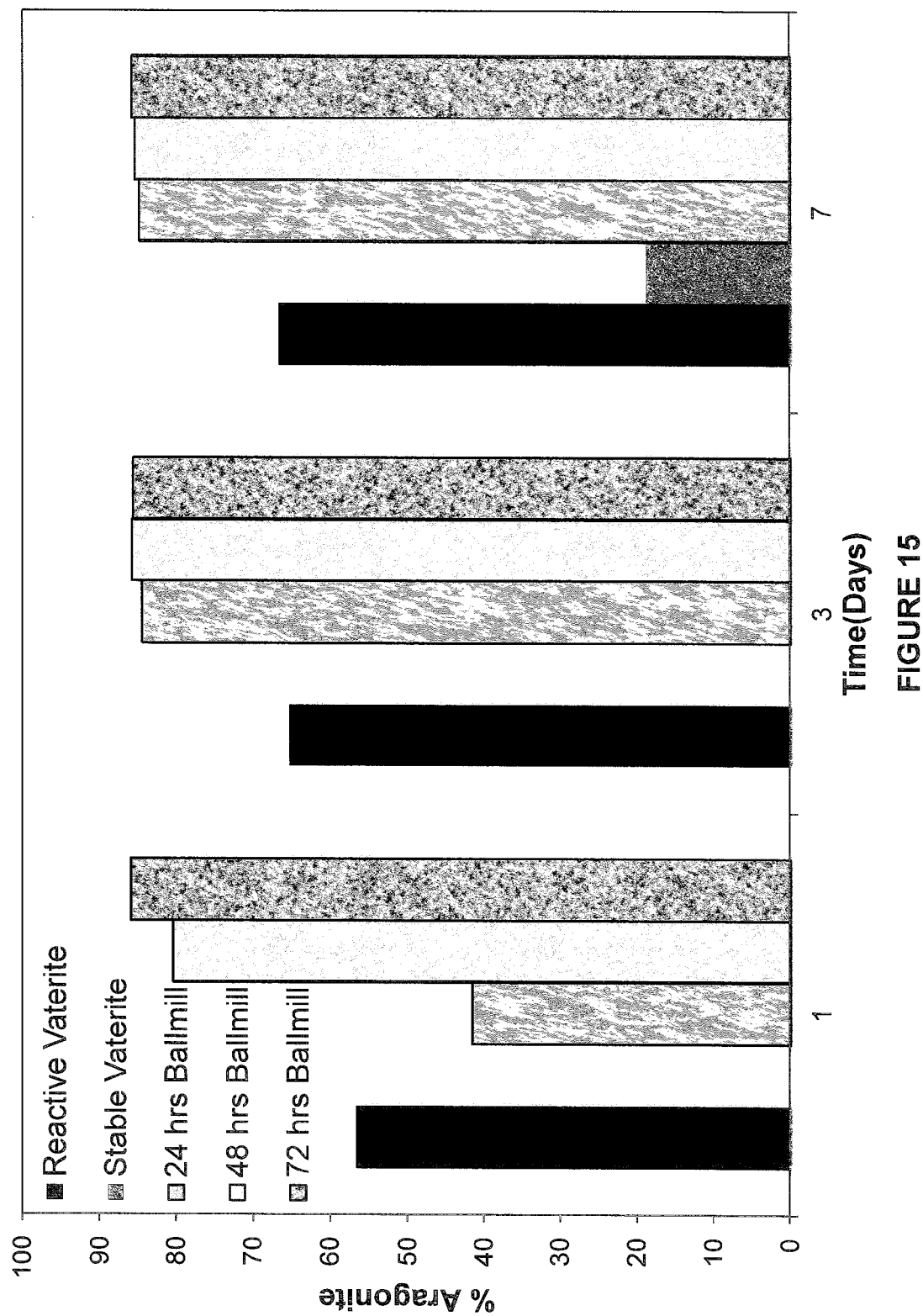
FIG. 15 illustrates data obtained in an experiment described in Example 6.

In this experiment, the "stable" and "reactive" vaterite samples, as described in Example 3, were used as controls and three "stable" samples were ball-milled for different periods of time to study the effect of mechanical activation, such as ball-milling. The samples were mixed with water at 0.6 w/s ratio and were kept at 40° C. FIG. 14 illustrates the calcium dissolution study of the samples where the "stable" sample that was ball-milled for maximum period of time, i.e. 72 hr, showed maximum dissolution of calcium. FIG. 15 shows that the ball-milled samples transformed to aragonite readily (even better than "reactive" sample) whereas the "stable" sample that was not ball-milled didn't show any significant aragonite formation.

Example 7

Measurement of $\delta^{13}C$ Value for Precipitation Material

In this experiment, carbonate-containing precipitation material is prepared using a mixture of bottled sulfur dioxide ($SO_2$) and bottled carbon dioxide ($CO_2$) gases, NaOH as a source of alkalinity, and calcium chloride as a source of divalent cations. The procedure is conducted in a closed container. The starting materials are a mixture of commercially available bottled $SO_2$ and $CO_2$ gas ($SO_2/CO_2$ gas or "simulated flue gas"). A container is filled with de-ionized water. Sodium hydroxide and calcium chloride are added to it providing a pH (alkaline) and divalent cation concentration suitable for precipitation of carbonate-containing precipitation material containing vaterite without releasing $CO_2$ into the atmosphere. $SO_2/CO_2$ gas is sparged at a rate and time suitable to precipitate precipitation material from the alkaline solution. Sufficient time is allowed for interaction of the components of the reaction, after which the precipitation material is separated from the remaining solution ("precipitation reaction mixture"), resulting in wet precipitation material and supernatant.

$\delta^{13}C$ values for the process starting materials, precipitation material, and supernatant are measured. The analytical system used is manufactured by Los Gatos Research and uses direct absorption spectroscopy to provide $\delta^{13}C$ and concentration data for dry gases ranging from 2% to 20% $CO_2$. The instrument is calibrated using standard 5% $CO_2$ gases with known isotopic composition, and measurements of $CO_2$ evolved from samples of travertine and IAEA marble #20 digested in 2M perchloric acid yield values that are within acceptable measurement error of the values found in literature. The $CO_2$ source gas is sampled using a syringe. The $CO_2$ gas is passed through a gas dryer (Perma Pure MD Gas Dryer, Model MD-110-48F-4 made of Nafion® polymer), then into the bench-top commercially available carbon isotope analytical system. Solid samples are first digested with heated perchloric acid (2M $HClO_4$). $CO_2$ gas is evolved from the closed digestion system, and then passed into the gas dryer. From there, the gas is collected and injected into the analysis system, resulting in $\delta^{13}C$ data. Similarly, the supernatant is digested to evolve $CO_2$ gas that is then dried and passed to the analysis instrument resulting in $\delta^{13}C$ data.

The $\delta^{13}C$ values for the precipitation material are found to be less than −15‰. This Example illustrates that $\delta^{13}C$ values can be used to confirm the primary source of carbon in a carbonate-containing precipitation material.

Example 8

Vaterite Stabilization with Sulfate Addition

A hard brine solution was prepared by diluting concentrated $CaCl_2$ to 0.355 mol/L and subsequently $Na_2SO_4$ was dissolved to a concentration of 0.0061 mol/L in the hard brine solution. An alkaline brine was prepared by absorbing $CO_2$ into a 1.382 mol/L NaOH solution, until the pH is between 10-11. The two solutions were mixed flowed into a mixed tank at rates of 8.17 gpm of hard brine solution and 3.88 gpm of alkaline solution. The precipitated slurry was pumped out of the bottom of the tank at a rate that maintained a constant volume of 70 gallons in the tank (average liquid residence time in the tank was 5.8 min). The slurry was allowed to gravity settle, while continuously decanting. The concentrated slurry was then filter pressed and subsequently dried in a swirl fluidized dryer. The dry composition showed particle size distribution of 18.124 μm mean diameter (standard deviation of 6.178 μm) determined by a static light scattering technique. The mineralogy analysis of the composition showed 86.8% vaterite, 0.6 wt % sulfate, and 13.2% calcite determined by powder x-ray diffraction, and quantified using Rietveld refinement.

The dry vaterite composition was mixed with water to form a paste. Three mixes, namely, 100% composition; mortar (27% composition and 73% quartz sand), and concrete (20% composition and 80% quartz sand and rocks) were mixed with an ionic solution at a water-to-cement ratio of 0.4 in a Hobart mixer for 5 mins. The mixed materials were then cast into 2-in cube molds and cured in a 60° C., 100% RH chamber for 1 day. At 1 day of reaction, the test cubes were demolded and placed in a ionic solution bath at 60° C. for 6 days. At 7 day of reaction, the test cubes were dried in a 100° C. oven for 6 hours then tested for compression strength. The three mixes achieved a compressive strength of 4600 psi in paste with 100% composition, 3700 psi in mortar, and 4200 psi in concrete.

Example 9

Rinsing with Chemical Additives

Figure 16:
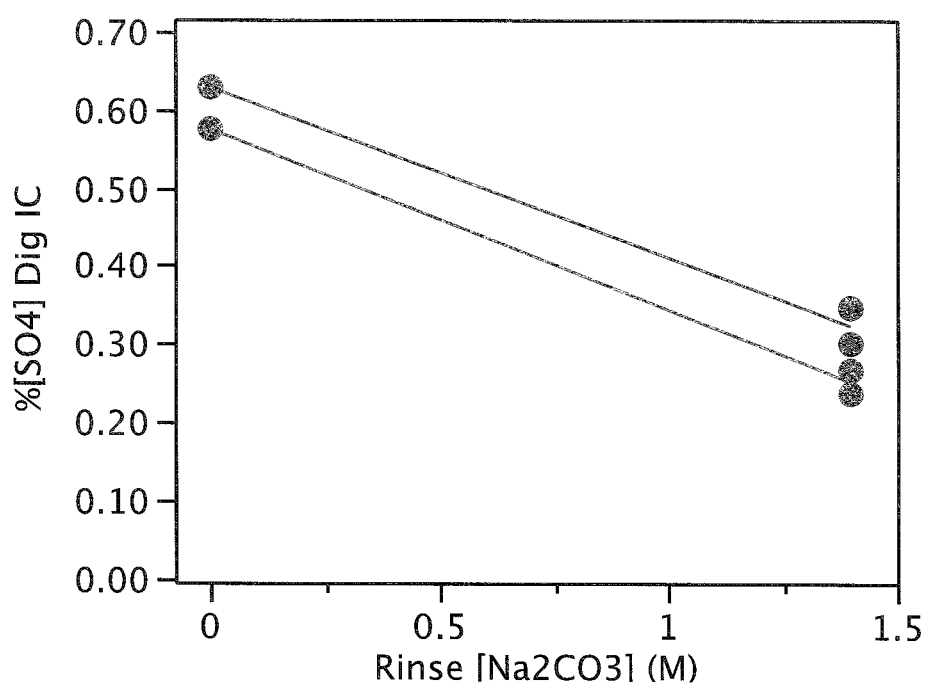
FIG. 16 illustrates data obtained in an experiment described in Example 9.

In this experiment, the filter pressed cake obtained by the process described in Example 8, was rinsed with 1.5M sodium carbonate solution. FIG. 16 illustrates the % sulfate content in the two of the digested samples of the filter pressed cake without sodium carbonate rinse and with 1.5M sodium carbonate rinse. The sulfate content in both the samples of the cake was found to be reduced by about 50% after rinsing with sodium carbonate. It is contemplated that the carbonate-sulfate ion exchange may be taking place at the surface of the vaterite particles.

Figure 17A:
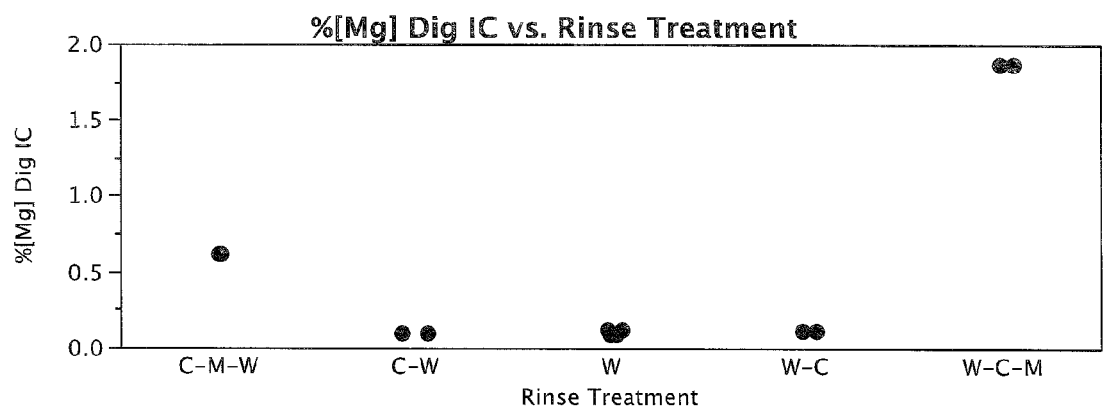
FIG. 17A and FIG. 17B illustrates data obtained in an experiment described in Example 9.

In a second experiment, the filter pressed cake obtained by the process described in Example 8, was rinsed with 1.5M sodium carbonate solution and 1.4M magnesium chloride solution in sequence. Five samples of the filter pressed cakes were subjected to five different sequences. The sequence C-M-W was carbonate rinse, followed by magnesium chloride rinse, followed by water rinse. The sequence C-W was carbonate rinse followed by water rinse. The sequence W was just water rinse. The sequence W-C was water rinse followed by carbonate rinse. The sequence W-C-M was water rinse, followed by carbonate rinse, followed by magnesium chloride rinse. As illustrated in FIG. 17A, while the sequences C-W, W, and W-C showed small % of magnesium in the digested sample (may be due to magnesium present in raw materials or water during precipitation process), the sequences C-M-W and W-C-M showed higher amount of magnesium uptake by the precipitate. It is contemplated that the highest amount of magnesium in W-C-M sequence could be due to last rinsing with magnesium chloride solution with no subsequent water rinsing.

Figure 17B:
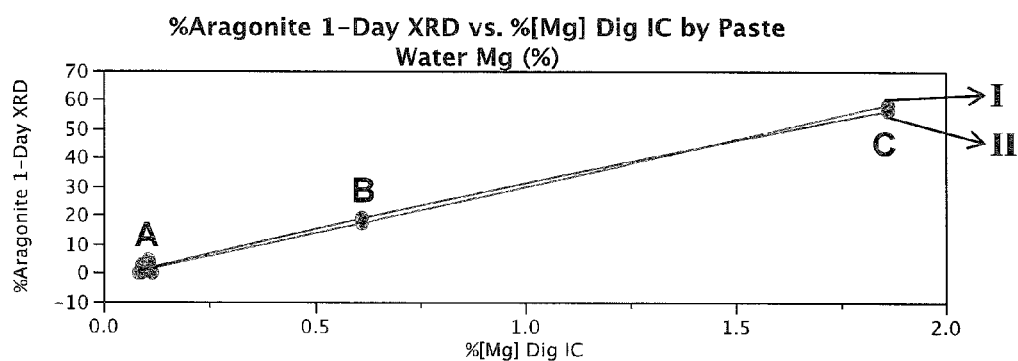

All the five sample precipitates were subsequently dried. The dried samples were subjected to paste formation with DI water (0% $MgCl_2$ shown as I in FIG. 17B) or with water containing 0.5% $MgCl_2$ (shown as II in FIG. 17B). FIG. 17B illustrates the 1-day % aragonite conversion of the vaterite in the paste made from five samples described in FIG. 17A. The precipitate rinsed with sequences C-W, W, and W-C showed minimal conversion of vaterite to aragonite (illustrated as A for both I and II in FIG. 17B). The precipitate rinsed with sequence C-M-W showed moderate conversion of vaterite to aragonite (illustrated as B for both I and II in FIG. 17B). The precipitate rinsed with sequence W-C-M showed highest conversion of vaterite to aragonite (illustrated as C for both I and II in FIG. 17B). The results showed similar conversion in the pastes made with DI water (0% $MgCl_2$) or with water containing 0.5% $MgCl_2$. The results show that the aragonite development in paste screening was dependent on the magnesium ion concentration in the vaterite particles or on the surface of the vaterite particles and was relatively independent of the paste water composition (% $MgCl_2$ in paste water).

What is claimed is:

1. A composition, comprising at least 50% w/w activated vaterite and between 0.1-0.6 wt % stabilizer wherein the stabilizer comprises the stabilizer incorporated in crystal lattice of the activated vaterite and wherein the stabilizer is sulfate.

2. The composition of claim 1, wherein the composition further comprises amorphous calcium carbonate, a precursor phase of vaterite, a precursor phase of aragonite, or combination thereof.

3. The composition of claim 1, wherein the composition comprises at least 90% w/w activated vaterite.

4. The composition of claim 1, wherein the composition further comprises 50-20,000 ppm magnesium and/or 1-50,000 ppm strontium.

5. The composition of claim 1, wherein the sulfate is sulfate in sea water, an alkali metal sulfate, alkaline earth metal sulfate, lignosulfate, or combination thereof.

6. The composition of claim 1, wherein the composition after combination with water, setting and hardening has a compressive strength in a range of 14-40 MPa.

7. The composition of claim 1, wherein the composition has a carbon isotopic fractionation value ($\delta^{13}C$) of less than −12‰.

8. The composition of claim 1, further comprising Portland cement clinker, aggregate, other supplementary cementitious material (SCM), or combination thereof.

9. The composition of claim 1, wherein the stabilizer is an alkali metal sulfate.

10. The composition of claim 9, wherein more than 90% of the sulfate in the composition is from the stabilizer.

11. A method for making a composition, comprising:
contacting $CO_2$ from a $CO_2$ source with a solution comprising proton removing agent, alkaline earth-metal ions and a stabilizer to make a composition comprising at least 50% w/w activated vaterite and between 0.1-0.6 wt % stabilizer wherein the stabilizer comprises the stabilizer incorporated in crystal lattice of the activated vaterite in the composition and wherein the stabilizer is sulfate.

12. The method of claim 11, wherein the contacting is under one or more conditions selected from the group consisting of mixing, stirring, temperature, pH, precipitation, residence time of the precipitate, dewatering of precipitate, washing precipitate with water, ion ratio, concentration of additives, drying, milling, grinding, storing, aging, and curing.

13. The method of claim 11, comprising activating the composition by nuclei activation, thermal activation, mechanical activation, chemical activation, or combination thereof.

14. The method of claim 13, wherein the activation comprises adding one or more of aragonite seed, inorganic additive or organic additive.

15. The method of claim 11, further comprising combining the composition with water and facilitating vaterite transformation to aragonite when the compostion sets and hardens to form cement.

16. The method of claim 15, wherein the facilitating the aragonite formation results in one or more of better linkage or bonding, higher tensile strength, or higher impact fracture toughness, after cementation of the composition.

17. A composition formed by a method, comprising contacting $CO_2$ from a $CO_2$ source with a solution comprising proton removing agent, alkaline earth-metal ions and a stabilizer to make a composition comprising at least 50% w/w activated vaterite and between 0.1-0.6 wt % stabilizer wherein the stabilizer comprises the stabilizer incorporated in crystal lattice of the activated vaterite and wherein the stabilizer is sulfate.

18. The method of claim 11, wherein the contacting is under condition comprising having ratio of calcium to carbonate during formation of vaterite to be between 1:1 to 1.5:1.

19. The composition of claim 1, wherein the composition further comprises one or more of aragonite seed, inorganic additive or organic additive.

20. The composition of claim 19, wherein the inorganic additive or organic additive are selected from the group consisting of sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combinations thereof.

21. The composition of claim 20, wherein the composition comprises between 0.1-5% w/w inorganic additive or organic additive.

22. The composition of claim 1, wherein the composition is a precipitate, slurry, or a dry powder.

23. The composition of claim 1, wherein the composition has a particle size of between 0.1-100 microns.

24. The method of claim 11, wherein the composition has a particle size of between 0.1-100 microns.

* * * * *